(12) United States Patent
Shaheen et al.

(10) Patent No.: US 10,897,753 B2
(45) Date of Patent: Jan. 19, 2021

(54) SYSTEMS AND METHODS FOR SUPPORTING MULTIPLE ALLOCATIONS IN UL/DL GRANT FOR A 5G NR UE AND GNB

(71) Applicants: Sharp Kabushiki Kaisha, Sakai (JP); FG Innovation Company Limited, Hong Kong (CN)

(72) Inventors: Kamel M. Shaheen, Camas, WA (US); Tatsushi Aiba, Vancouver, WA (US)

(73) Assignees: Sharp Kabushiki Kaisha, Osaka (JP); FG Innovation Comnany Limited, Hong Kong (CN)

( * ) Notice: Subject to any disclaimer, the term of this patent is extended or adjusted under 35 U.S.C. 154(b) by 203 days.

(21) Appl. No.: 15/969,026

(22) Filed: May 2, 2018

(65) Prior Publication Data

US 2018/0324768 A1    Nov. 8, 2018

Related U.S. Application Data

(63) Continuation of application No. PCT/US2018/030421, filed on May 1, 2018.

(60) Provisional application No. 62/501,356, filed on May 4, 2017.

(51) Int. Cl.
*H04W 72/04* (2009.01)
*H04L 5/00* (2006.01)

(52) U.S. Cl.
CPC ............. *H04W 72/042* (2013.01); *H04L 5/00* (2013.01); *H04W 72/0446* (2013.01)

(58) Field of Classification Search
CPC ....... H04L 5/00; H04L 5/0053; H04L 5/0092; H04W 72/042; H04W 72/0446
See application file for complete search history.

(56) References Cited

U.S. PATENT DOCUMENTS

| 8,401,542 | B2 * | 3/2013 | Chung | H04L 5/0053 |
| | | | | 455/423 |
| 9,144,070 | B2 * | 9/2015 | Yang | H04L 5/0007 |
| 2010/0254329 | A1 * | 10/2010 | Pan | H04L 5/001 |
| | | | | 370/329 |

(Continued)

OTHER PUBLICATIONS

NTT Docomo, Inc., "Search space configuration", 3GPP TSG RAN WG1 Meeting #88bis, Spokane, USA, R1-1705737, Apr. 7, 2017.

(Continued)

*Primary Examiner* — Dung B Huynh
(74) *Attorney, Agent, or Firm* — Austin Rapp

(57) ABSTRACT

A user equipment (UE) is described. The UE includes a receiving circuitry configured to receive a radio resource control message including first information used for determining a monitoring occasion where the UE monitors a physical downlink control channel (PDCCH) in a search space. The receiving circuitry is also configured to receive a radio resource control message including second information used for determining downlink control information (DCI) formats which accordingly the UE monitors the PDCCH in the search space. The search space is a UE-specific search space. The monitoring occasion comprises a slot and/or a symbol. The DCI formats include a DCI format used for scheduling of a physical uplink shared channel (PUSCH) and/or a DCI format used for scheduling of a physical downlink shared channel (PDSCH).

4 Claims, 25 Drawing Sheets

(56) References Cited

U.S. PATENT DOCUMENTS

| | | | |
|---|---|---|---|
| 2011/0075624 A1* | 3/2011 | Papasakellariou | H04W 8/26 370/329 |
| 2012/0009923 A1* | 1/2012 | Chen | H04L 5/0091 455/434 |
| 2012/0093112 A1* | 4/2012 | Qu | H04L 5/001 370/329 |
| 2013/0003672 A1* | 1/2013 | Dinan | H04L 5/0053 370/329 |
| 2013/0058240 A1* | 3/2013 | Kim | H04L 5/0007 370/252 |
| 2013/0058306 A1* | 3/2013 | Noh | H04L 1/1671 370/329 |
| 2013/0114563 A1* | 5/2013 | Oizumi | H04L 5/001 370/329 |
| 2013/0121295 A1* | 5/2013 | Saito | H04L 5/001 370/329 |
| 2013/0163571 A1* | 6/2013 | Ouchi | H04W 72/042 370/336 |
| 2013/0194931 A1* | 8/2013 | Lee | H04L 5/0053 370/241 |
| 2014/0029565 A1* | 1/2014 | Kim | H04L 5/001 370/329 |
| 2014/0071918 A1 | 3/2014 | Park et al. | |
| 2014/0105154 A1* | 4/2014 | Yang | H04L 5/0053 370/329 |
| 2014/0105164 A1* | 4/2014 | Moulsley | H04W 72/042 370/329 |
| 2014/0153539 A1* | 6/2014 | Seo | H04L 5/0091 370/330 |
| 2014/0286275 A1* | 9/2014 | Park | H04L 5/0053 370/329 |
| 2014/0286277 A1* | 9/2014 | Jang | H04L 5/0048 370/329 |
| 2014/0293946 A1 | 10/2014 | Suzuki et al. | |
| 2014/0328295 A1* | 11/2014 | Ko | H04L 5/0053 370/329 |
| 2014/0341143 A1* | 11/2014 | Yang | H04L 5/001 370/329 |
| 2014/0348092 A1* | 11/2014 | Ihm | H04J 11/0079 370/329 |
| 2014/0376422 A1* | 12/2014 | Dai | H04L 5/0053 370/280 |
| 2015/0003360 A1* | 1/2015 | Liu | H04W 72/1278 370/329 |
| 2015/0098381 A1* | 4/2015 | Cucala García | H04W 52/02 370/311 |
| 2015/0131605 A1* | 5/2015 | Nogami | H04L 5/0053 370/330 |
| 2015/0189629 A1* | 7/2015 | Seo | H04L 5/001 370/329 |
| 2015/0289144 A1* | 10/2015 | Yi | H04W 72/042 370/252 |
| 2016/0095093 A1* | 3/2016 | Yi | H04L 5/14 370/280 |
| 2016/0192433 A1* | 6/2016 | Deenoo | H04W 72/046 370/329 |
| 2016/0226637 A1* | 8/2016 | Nory | H04L 5/0053 |
| 2016/0249337 A1* | 8/2016 | Liang | H04W 72/042 |
| 2016/0380742 A1* | 12/2016 | Suzuki | H04L 5/14 370/280 |
| 2017/0290046 A1* | 10/2017 | Sun | H04W 74/006 |
| 2017/0303220 A1* | 10/2017 | Sadeghi | H04W 56/00 |
| 2017/0311342 A1* | 10/2017 | You | H04B 7/088 |
| 2018/0007543 A1* | 1/2018 | Lee | H04L 5/0053 |
| 2018/0049166 A1* | 2/2018 | Sun | H04L 5/0092 |
| 2018/0110045 A1* | 4/2018 | You | H04L 1/0046 |
| 2018/0110084 A1* | 4/2018 | Dinan | H04W 76/28 |
| 2018/0110085 A1* | 4/2018 | Tseng | H04W 76/28 |
| 2018/0124815 A1* | 5/2018 | Papasakellariou | H04L 5/0053 |
| 2018/0191454 A1* | 7/2018 | Furuskog | H04L 5/0053 |
| 2018/0192354 A1* | 7/2018 | Yi | H04L 5/0094 |
| 2018/0206214 A1* | 7/2018 | Bendlin | H04W 72/042 |
| 2018/0227074 A1* | 8/2018 | Sun | H04L 1/0046 |
| 2018/0227156 A1* | 8/2018 | Papasakellariou | H04B 7/12 |
| 2018/0242296 A1* | 8/2018 | Li | H04L 5/0053 |
| 2018/0279268 A1* | 9/2018 | You | H04W 72/042 |
| 2018/0279273 A1* | 9/2018 | Yang | H04W 72/0446 |
| 2018/0279305 A1* | 9/2018 | Bagheri | H04W 72/0446 |
| 2018/0288746 A1* | 10/2018 | Zhang | H04L 1/0031 |
| 2018/0324816 A1* | 11/2018 | Islam | H04W 72/042 |
| 2018/0352500 A1* | 12/2018 | Baldemair | H04L 5/005 |
| 2018/0359745 A1* | 12/2018 | Yeo | H04L 1/18 |
| 2019/0045487 A1* | 2/2019 | You | H04L 5/0053 |
| 2019/0068338 A1* | 2/2019 | Ashraf | H04W 4/70 |
| 2019/0150073 A1* | 5/2019 | Tiirola | H04W 72/10 455/434 |
| 2019/0207796 A1* | 7/2019 | Hwang | H04W 72/12 |
| 2019/0223176 A1* | 7/2019 | Liu | H04W 48/12 |
| 2019/0306847 A1* | 10/2019 | Seo | H04L 25/022 |
| 2019/0349925 A1* | 11/2019 | Tang | H04W 72/042 |
| 2019/0357184 A1* | 11/2019 | Tang | H04W 72/042 |
| 2020/0007295 A1* | 1/2020 | Kwak | H04L 5/0007 |
| 2020/0008216 A1* | 1/2020 | Iyer | H04W 72/1242 |
| 2020/0015228 A1* | 1/2020 | Kang | H04W 16/28 |
| 2020/0028651 A1* | 1/2020 | Xu | H04W 72/0453 |
| 2020/0037187 A1* | 1/2020 | Parkvall | H04W 72/0446 |
| 2020/0045706 A1* | 2/2020 | Shin | H04L 1/1812 |
| 2020/0100275 A1* | 3/2020 | Tang | H04W 72/04 |
| 2020/0145950 A1* | 5/2020 | Harada | H04W 48/10 |
| 2020/0162212 A1* | 5/2020 | Liu | H04W 72/0453 |

OTHER PUBLICATIONS

Huawei, HiSilicon, "LCP with Multiple Numerologies", 3GPP TSG-RAN WG2 #97bis, Spokane, Washington, R2-1702602, Apr. 7, 2017.

Ericsson, "Uplink dynamic scheduling in NR", 3GPP TSG-RAN WG2 #97, Athens, Greece, Tdoc R2-1700838, Feb. 17, 2017.

Intel Corporation, "Enhancements of SR/BSR in NR", 3GPP TSG RAN WG2 Meeting #97, Athens, Greece, R2-1701723, Feb. 17, 2017.

Ericsson, "Summary of RAN2 solutions for URLLC", 3GPP TSG RAN WG2 Meeting #97, Athens, Greece, Tdoc R2-1700905, Feb. 17, 2017.

3GPP TS 36.212. v13.0.0, Evolved Universal Terrestrial Radio Access (E-UTRA); Multiplexing and channel coding (Release 13), Dec. 2015.

3GPP TS 36.213 V14.1.0, Evolved Universal Terrestrial Radio Access (E-UTRA); Physical layer procedures (Release 14) Dec. 2016.

3GPP TS 36.321, V14.1.0, Evolved Universal Terrestrial Radio Access (E-UTRA); Medium Access Control (MAC); Protocol specification (Release 14) Dec. 2016.

3GPP TS 36.300 V13.4.0, Evolved Universal Terrestrial Radio Access (E-UTRA) and Evolved Universal Terrestrial Radio Access Network (E-UTRAN); Overall description; Stage 2, (Release 13) Jun. 2016.

3GPP TS 36.331, V14.1.0, Evolved Universal Terrestrial Radio Access (E-UTRA); Radio Resource Control (RRC); Protocol specification (Release 14) Dec. 2016.

3GPP TS 36.304, V14.0.0, Evolved Universal Terrestrial Radio Access (E-UTRA); User Equipment (UE) procedures in idle mode (Release 14) Sep. 2016.

Intel Corporation, "General aspects for NR search space", 3GPP TSG RAN WG1 Meeting #88bis, Spokane, USA, R1-1704746, Apr. 7, 2017.

International Search Report and Written Opinion issued for PCT Application No. PCT/US2018/030421 dated Aug. 6, 2018.

* cited by examiner (a) R/F2/E/LCID/F/L sub-header with 7-bits L field (b) R/F2/E/LCID/F/L sub-header with 15-bits L field (c) R/F2/E/LCID/L sub-header with 16-bits L field (d) R/F2/E/LCID sub-header

FIG. 13

SYSTEMS AND METHODS FOR SUPPORTING MULTIPLE ALLOCATIONS IN UL/DL GRANT FOR A 5G NR UE AND GNB

RELATED APPLICATIONS

This application is related to and claims priority from U.S. Provisional Patent Application No. 62/501,356, entitled "SYSTEMS AND METHODS FOR SUPPORTING MULTIPLE NUMEROLOGIES IN A SINGLE UL/DL GRANT FOR A 5G NR UE," filed on May 4, 2017, which is hereby incorporated by reference herein, in its entirety.

TECHNICAL FIELD

The present disclosure relates generally to communication systems. More specifically, the present disclosure relates to systems and methods for supporting multiple allocations in Uplink (UL)/Downlink (DL) grant for a fifth generation (5G) New Radio (NR) user equipment (UE) and Base Station (gNB).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 13 illustrates examples of MAC PDU subheaders;

DETAILED DESCRIPTION

Figure 1:
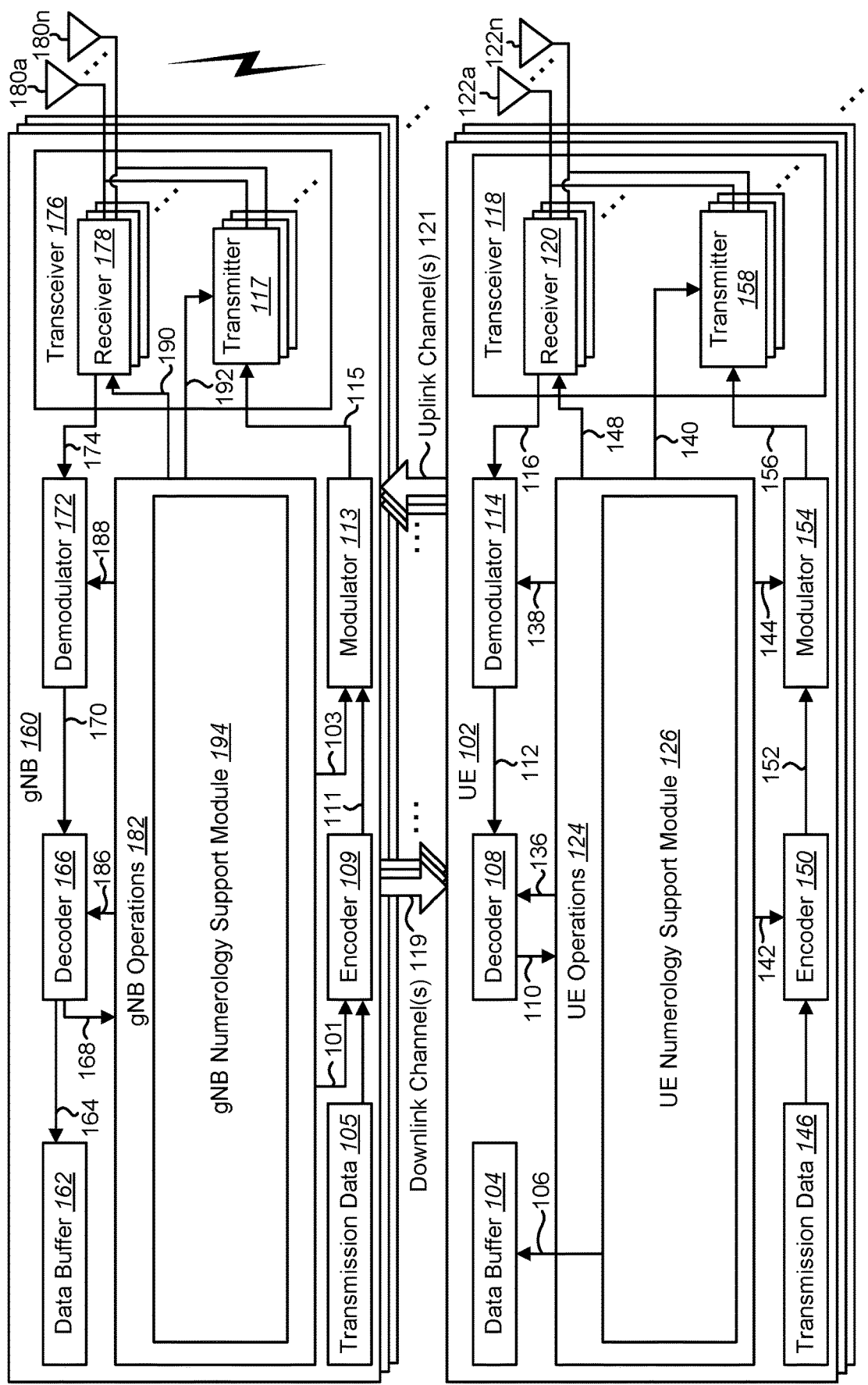
FIG. 1 is a block diagram illustrating one implementation of one or more base stations (gNBs) and one or more user equipments (UEs) in which systems and methods for supporting multiple numerologies in a single UL/DL grant for a fifth generation (5G) New Radio (NR) user equipment (UE) may be implemented.

A user equipment (UE) is described. The UE includes a receiving circuitry configured to receive a radio resource control message including first information used for determining a monitoring occasion where the UE monitors a physical downlink control channel (PDCCH) in a search space. The receiving circuitry is also configured to receive a radio resource control message including second information used for determining downlink control information (DCI) formats which accordingly the UE monitors the PDCCH in the search space. The search space is a UE-specific search space. The monitoring occasion comprises a slot and/or a symbol. The DCI formats include a DCI format used for scheduling of a physical uplink shared channel (PUSCH) and/or a DCI format used for scheduling of a physical downlink shared channel (PDSCH).

The receiving circuitry may also be configured to receive a radio resource control message including third information used for determining a subcarrier spacing(s) which accordingly the UE monitors the PDCCH in the search space.

The receiving circuitry may also be configured to receive a radio resource control message comprising fourth information used for determining a second monitoring occasion where the UE monitors the PDCCH in a common search space. The receiving circuitry may further be configured to receive a radio resource control message including fifth information used for determining the DCI formats which accordingly the UE monitors the PDCCH in the common search space. The second monitoring occasion may include a slot and/or a symbol.

A base station apparatus is also described. The base station apparatus includes a transmitting circuitry configured to transmit a radio resource control message including first information used for determining a monitoring occasion where a UE monitors a PDCCH in a search space. The transmitting circuitry is also configured to transmit a radio resource control message comprising second information used for determining DCI formats which accordingly the UE monitors the PDCCH in the search space. The search space is a UE-specific search space. The monitoring occasion includes a slot and/or a symbol. The DCI formats include a DCI format used for scheduling of a PUSCH and/or a DCI format used for scheduling of a PDSCH.

The transmitting circuitry may be configured to transmit a radio resource control message including third information used for determining a subcarrier spacing(s) which accordingly the UE monitors the PDCCH in the search space.

The transmitting circuitry may be configured to transmit a radio resource control message including fourth information used for determining a second monitoring occasion where the UE monitors the PDCCH in a common search space. The transmitting circuitry may be further configured to transmit a radio resource control message comprising fifth information used for determining the DCI formats which accordingly the UE monitors the PDCCH in the common search space. The second monitoring occasion may include a slot and/or a symbol.

A communication method of a UE is also described. The method includes receiving a radio resource control message comprising first information used for determining a monitoring occasion where the UE monitors a PDCCH in a search space. The method also includes receiving a radio resource control message including second information used for determining DCI formats which accordingly the UE monitors the PDCCH in the search space. The search space is a UE-specific search space. The monitoring occasion includes a slot and/or a symbol. The DCI formats include a DCI format used for scheduling of a PUSCH and/or a DCI format used for scheduling of a PDSCH.

A communication method of a base station apparatus is also described. The method includes transmitting a radio resource control message comprising first information used for determining a monitoring occasion where a UE monitors a PDCCH in a search space. The method also includes transmitting a radio resource control message comprising second information used for determining DCI formats which accordingly the UE monitors the PDCCH in the search space. The search space is a UE-specific search space. The monitoring occasion comprises a slot and/or a symbol. The DCI formats include a DCI format used for scheduling of a PUSCH and/or a DCI format used for scheduling of a PDSCH.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a gNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NW" by 3GPP) envisions the use of time/frequency/space resources to allow for enhanced mobile broadband (eMBB) communication and ultra-reliable low-latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. An NR base station may be referred to as a gNB. A gNB may also be more generally referred to as a base station device.

The systems and methods described herein provide a mechanism by which scheduling multiple simultaneous resources may be allocated to a user equipment (UE). The method may include receiving one or more radio resource control (RRC) message(s) including information used for determining a monitoring occasion. The UE may monitor a physical downlink control channel (PDCCH) in one or more search spaces, and information used for determining one or more downlink control information (DCI) formats upon which the UE monitors the PDCCH in the one or more search spaces. The one or more search spaces may be UE-specific search spaces. The monitoring occasion may include one or more slots and/or one or more symbols, and the one or more DCI formats may include a DCI format used for scheduling of a physical uplink shared channel (PUSCH) and/or a DCI format used for scheduling of a physical downlink shared channel (PDSCH).

These systems and methods also include decoding the one or more DCI formats based on the information used for determining a monitoring occasion and the information used for determining one or more downlink control information (DCI) formats.

These systems and methods may further include receiving radio resource control message(s) including information used for determining a subcarrier spacing(s) which accordingly the UE monitors the PDCCH in the search space.

Figure 3:
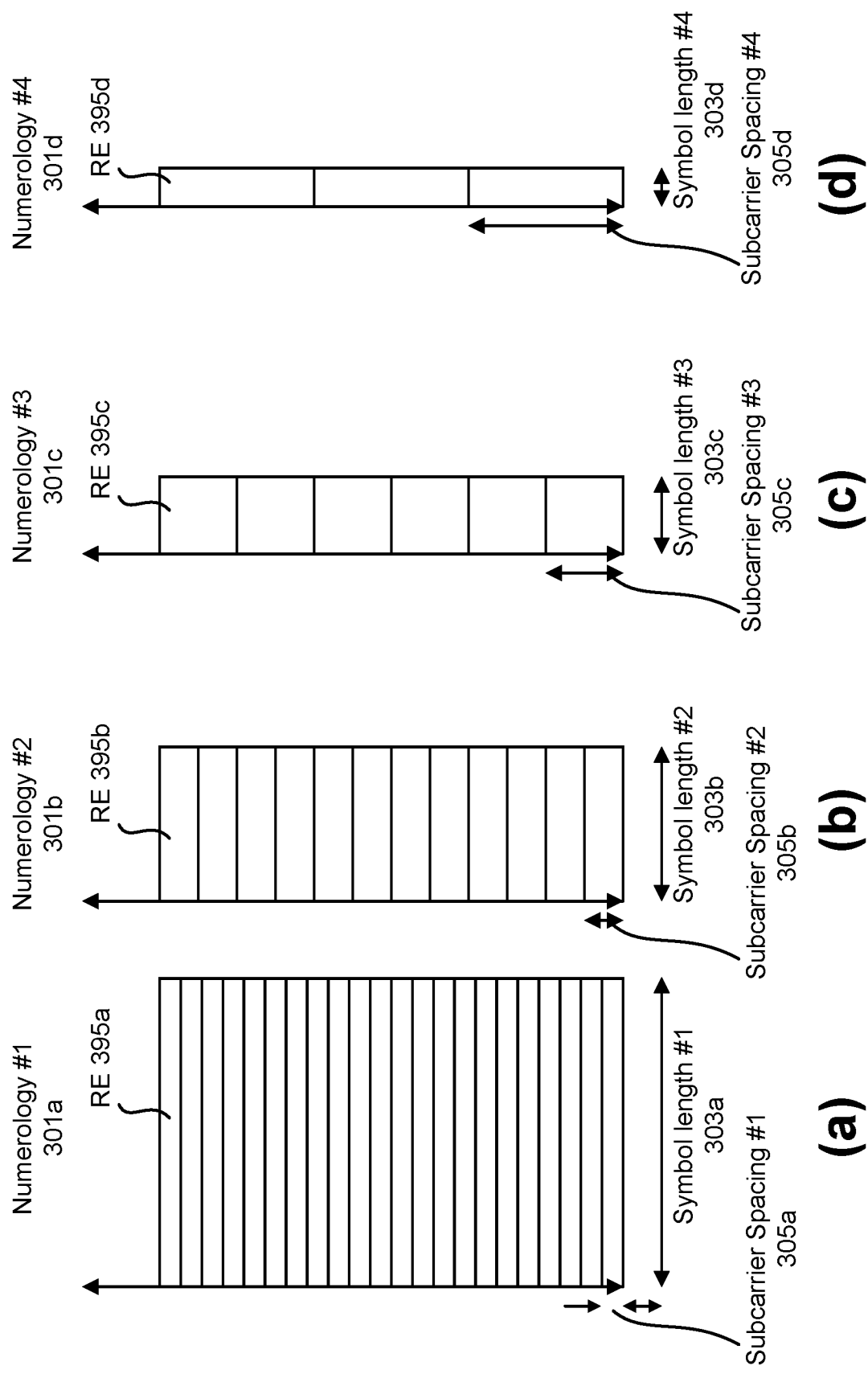
FIG. 3 shows examples of several numerologies.
Figure 4:
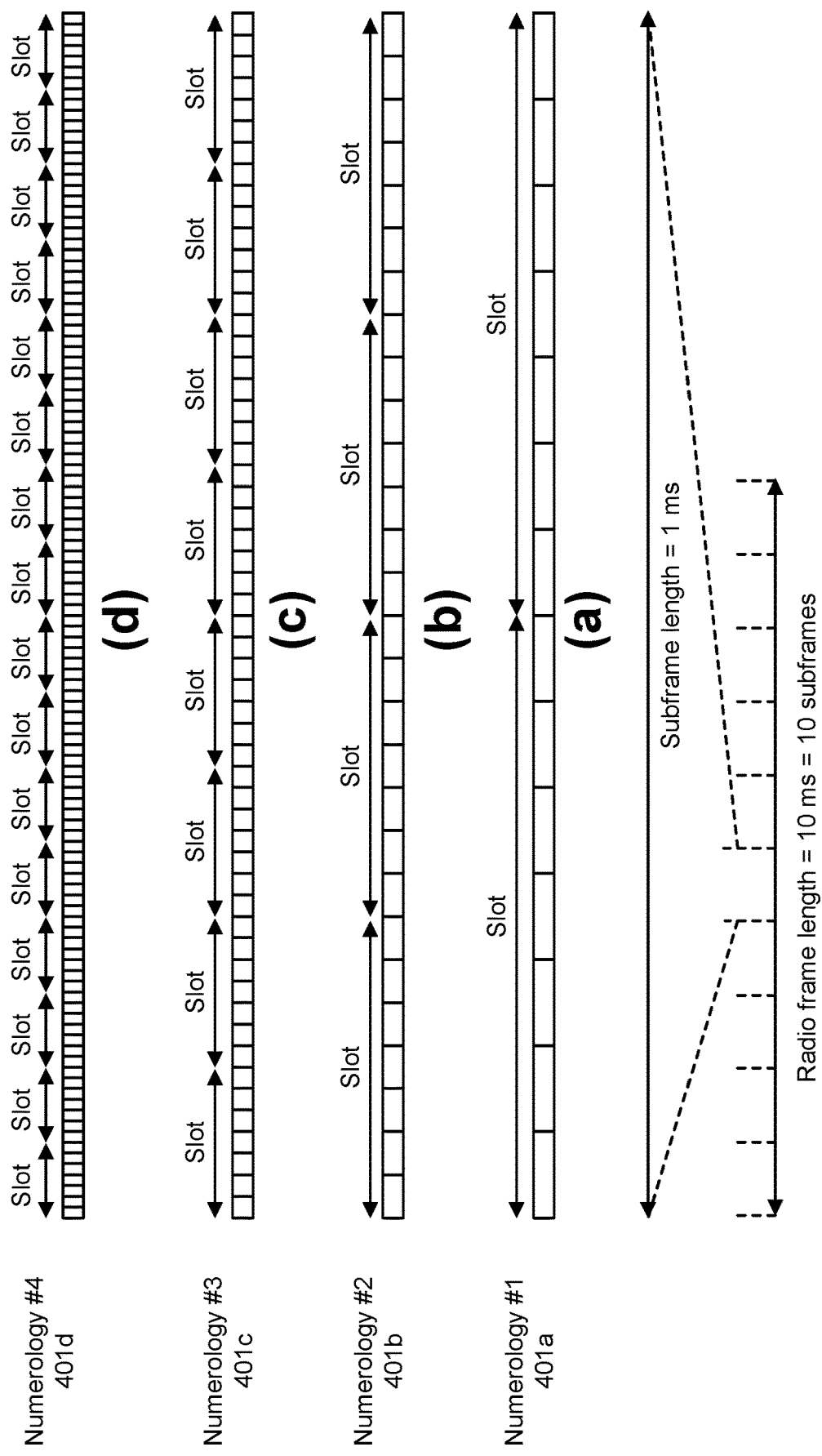
FIG. 4 shows examples of subframe structures for the numerologies that are shown in FIG. 3.

Depending of the amount of data available for transmission, the UE can use different numerologies for the same logical channel. The allocation of these numerologies and the associated logical channel assignment can be done as shown in FIGS. 3 and 4 below. The gNB may assign multiple numerologies (for example, subcarrier spacing: 15 KHz, 30 KHz, 60 KHz, and/or 120 KHz) to UEs where the gNB will assign these numerologies at a single time slot 'n' or at different time slots (e.g., 'n+4', 'n+6', 'n+10') as for Semi Persistence Scheduling, Radio Resource Control (RRC) configuration, and/or Downlink Control Information (DCI) indication.

Once the UL/DL grant is received, the UE may prioritize the logical channel assignment to the associated numerology as being instructed by the gNB in the UL/DL grant. Alternatively, the associations may be based on the priority of the Logical channel similar to a Leaky Bucket model. This scheme may require some adjustment to the UL/DL grant formats (e.g., DCI) and the mechanism by which the UE requests, receives, and processes its UL/DL grant. The HARQ procedures may be aligned so that multiple responses from different numerologies are arranged accordingly.

These systems and methods described above may also include the receiving of radio resource control message(s) including information used for determining a second monitoring occasion where the UE monitors the PDCCH in a common search space, and receiving of radio resource control message(s) comprising information used for determining the one or more DCI formats which accordingly the UE monitors the PDCCH in the common search space. The second monitoring occasion may include a second slot and/or symbol. This second slot and/or symbol may belong to the same and/or different numerology (e.g., subcarrier spacing).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for supporting multiple numerologies in a single UL/DL grant for a fifth generation (5G) New Radio (NR) user equipment (UE) 102 may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)), and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel), and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE numerology support module 126.

To support various requirements of different services, NR is envisioned to support different OFDM numerologies in a single framework. Different numerologies may be implemented between different/same carrier(s) for a given UE 102. Therefore, a UE 102 may be configured with multiple numerologies simultaneously in a Time Division Multiplexing (TDM) and/or Frequency-Division Multiplexing (FDM) pattern. A single numerology may be used exclusively for a specific service or shared between different services. To support efficient spectrum utilization and network operation flexibility, numerology sharing may be allowed while meeting service requirements. For example, eMBB service with delay tolerability can use the numerology for URLLC with the restriction that the performance of URLLC service is not harmed. Radio resource sharing may be realized by multiplexing, which is determined by the mapping between the logical channel and the numerology, and the priority of each logical channel.

In an implementation, a single logical channel may be mapped to one or more numerology/TTI duration. ARQ can be performed on any numerologies/TTI lengths that the LCH is mapped to. The RLC configuration may be per logical channel without dependency on numerology/TTI length. Logical channel to numerology/TTI length mapping may be reconfigured via RRC reconfiguration. HARQ retransmission may be performed across different numerologies and/or TTI durations. HARQ configuration, if any, may be numerology/TTI duration specific. A single MAC entity can support one or more numerology/TTI durations. Logical channel prioritization (LCP) may take into account the mapping of logical channel to one or more numerology/TTI duration.

The detailed logical channel multiplexing schemes to support the introduction of multiple numerologies are described herein. In LTE, data from different logical channel are multiplexed into a single MAC PDU which will be sent on a single numerology with TTI length of 1 ms. The LCP procedure is used for the MAC PDU construction by deciding the amount of data from each logical channel. By using the LCP procedure, the UE 102 can satisfy the QoS of each radio bearer in the best and most predictable way.

In LTE, a Prioritized Bit Rate (PBR) is defined for each logical channel. The PBR is the minimum data rate guaranteed for the logical channel. Even the logical channel has lowest priority, at least a certain amount of MAC PDU space is allocated to guarantee the PBR.

In LTE, LCP is implemented in two steps. In the first step, each logical channel is allocated resource in a decreasing priority order, with the amount of allocated resource limited by the corresponding PBR of the logical channel. After all the logical channel have been served up to their PBR values, if there is any space left, the second step is performed that each logical channel is allocated resource again in decreasing priority order, without limitation on the allocated resource. In other words, logical channel of lower priority can only be served if any logical channel of higher priority has no more data to transmit.

LCP on Multiple Numerologies in NR is also described herein. For NR, different sub-bands within a carrier may be configured with different numerologies. A transport block may be allocated within one sub-band, and therefore, there can only be one numerology with one TB.

Figure 14:
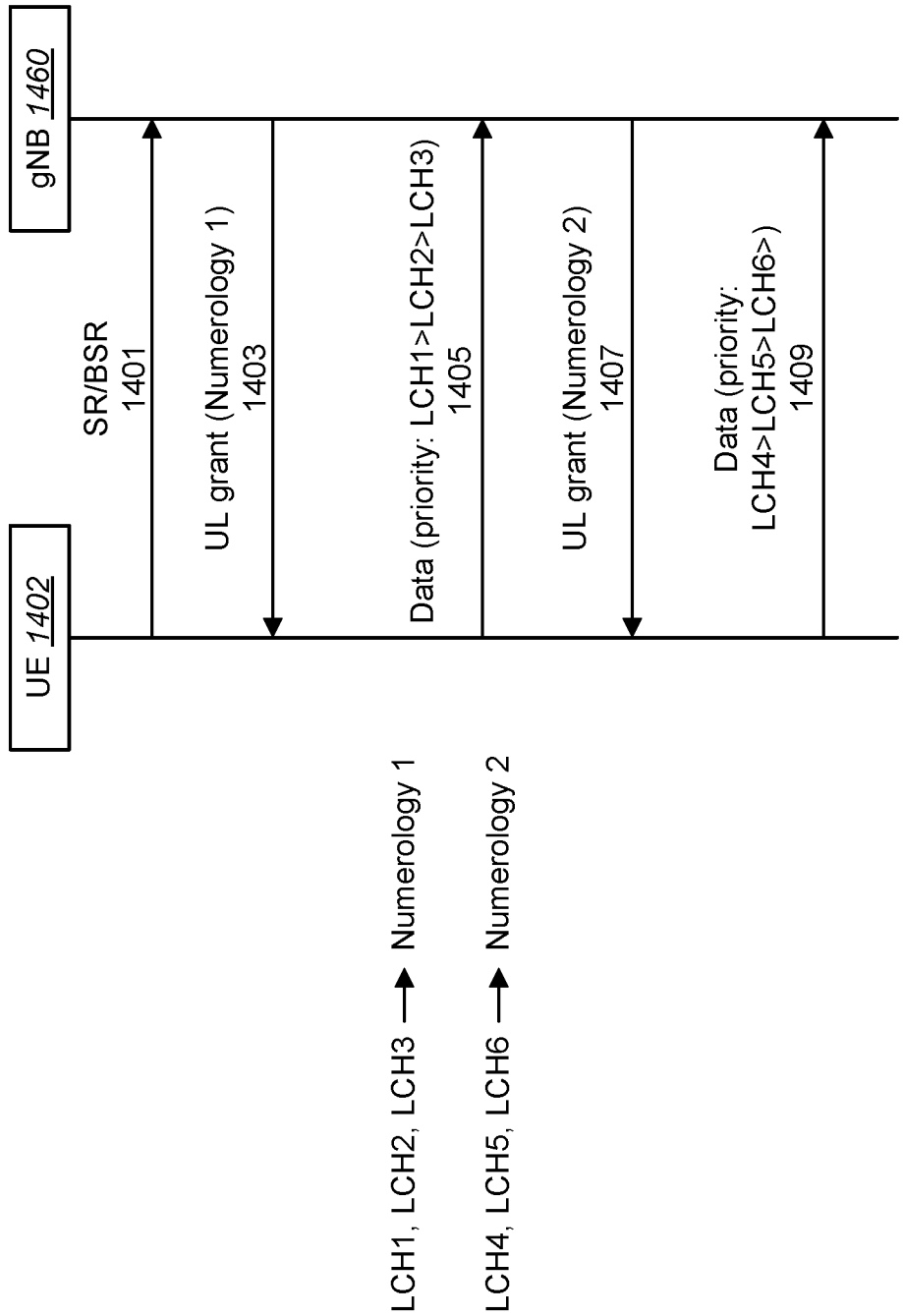
FIG. 14 is an example of mapping between logical channels and numerologies.

In LTE, each logical channel is authorized to use a radio resource allocated by the network to the UE 102, except for unlicensed bands. The only difference is the PBR and priority of each channel. In NR, a different numerology may be used to obtain the performance-overhead balance for different services. For the delay-sensitive service, like URLLC, a numerology with reduced TTI may be adopted to transmit and retransmit the URLLC data earlier at the cost of more control signaling. For the delay-tolerable service (e.g., eMBB), a numerology with a long TTI may be adopted due to the enlarged maximum size of block of resource that can be scheduled by a single control message. The network or the gNB 160 can provide differentiated QoS to different logical channel via mapping between the logical channel and the numerology/TTI, and giving those logical channels proper priorities. FIG. 14 illustrates a possible mapping between the logical channels and the numerologies, where the LCH1, LCH2 and LCH3 are mapped to numerology 1 in a decreasing priority order, and the LCH4, LCH5 and LCH6 are mapped to numerology 2 in a decreasing priority order.

A radio bearer/logical channel may be mapped to one or more numerologies. However, whether a numerology specific priority can be configured for a single logical channel is not discussed yet. In LTE, the logical channel priority is assigned on a per UE basis since only one numerology may be configured for the PUSCH. In NR, a numerology-specific priority may be supported to encourage data from a specific logical channel to be put into the MAC PDU, which will be transmitted on more suitable numerologies. For instance, it is expected that eMBB data is more likely to be embedded into the MAC PDU for transmission on the numerologies with long TTI. On the other hand, the URLLC service should be de-prioritized on the numerology of long TTI compared with the eMBB service.

Figure 15:
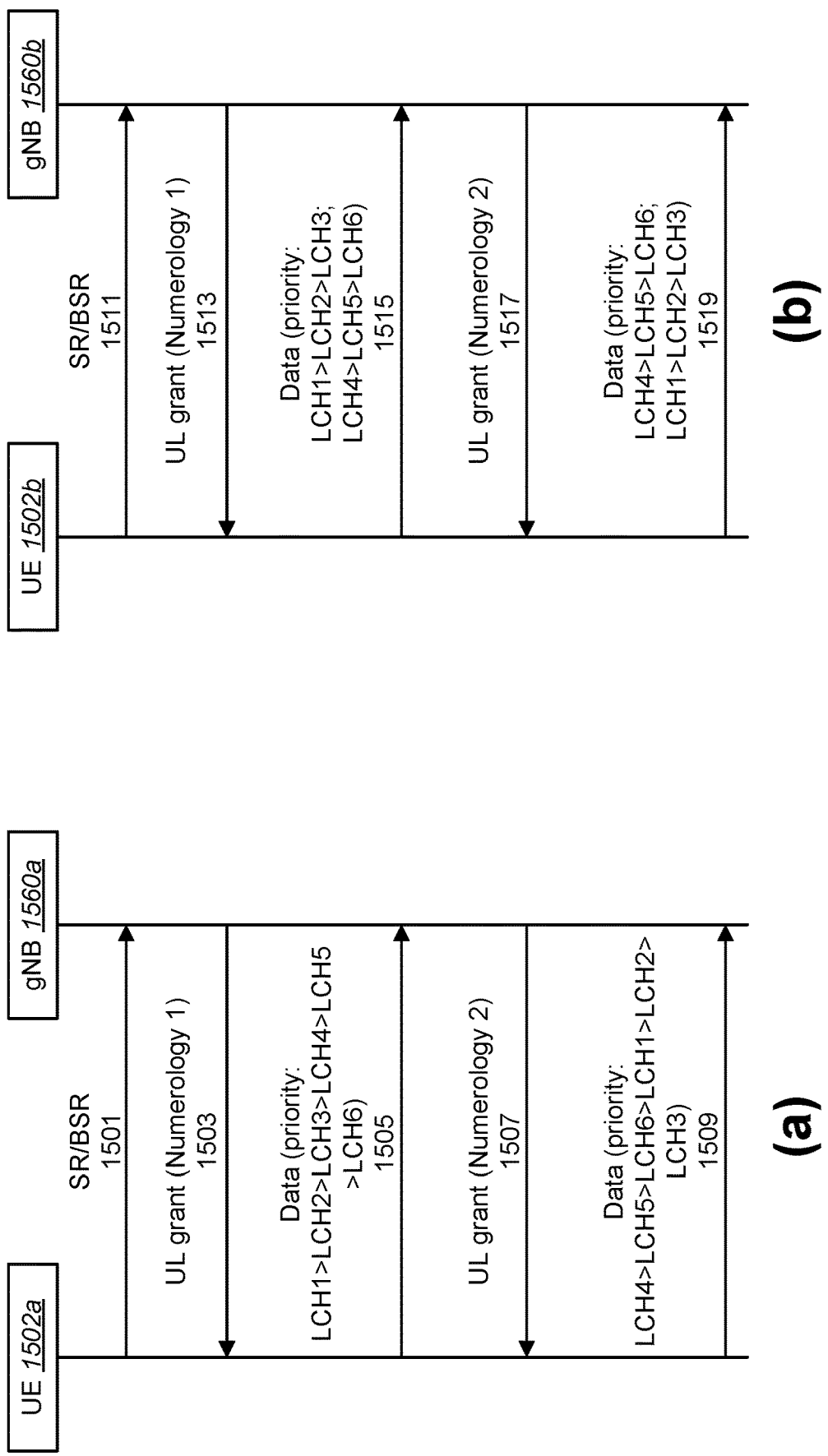
FIG. 15 illustrates examples of numerology-specific logical channel priority handling.

In a first approach, a single logical channel can be configured with numerology specific priority. FIG. 15 illustrates two alternatives of numerology specific logical channel priority handling rules, where each logical channel is configured to be associated with both numerology 1 and numerology 2.

In a second approach, the LCP rule may allow some logical channels to be precluded and to be served only after the data of the primary logical channels is exhausted. In a carrier aggregation (CA) case configured with multiple numerologies across different carriers, when a specific logical channel is mapped to a group of numerologies, the UE 102 may need to construct multiple MAC PDU for TBs from multiple carriers configured with distinct numerologies simultaneously. If the UE 102 performs LCP sequentially on these UL/DL grants from different carriers/numerologies, the amount of data of each logical channel put into the MAC PDUs may be different, as how much data UE 102 sends in a numerology on one carrier also depends on how much data the UE 102 has for the resources left after PBR is satisfied. The processing order of UL/DL grants from different carrier/numerologies may be determined either by network configuration, or by pre-defined criterion. The purpose of the numerology prioritization is for network to correctly calculate the amount of data expected from each logical channel and to allocate UL/DL grant properly.

In a third approach, when a logical channel is associated with multiple numerologies, the processing order of UL/DL grants of different carriers/numerologies may be determined either by network configuration, or by pre-defined criterion. From the analysis above the entire LCP may be as follows. A UL/DL grant may be selected for processing according to network configuration or pre-defined criterion, if CA with multiple numerologies is configured. The associated logical channels may be selected for the numerology/TTI duration of this UL/DL grant. LCP may be applied on the selected logical channels. LCP on other logical channels may be applied if there is room left in the UL/DL grant. In a fourth approach, the LCP in NR may be carried out according to the above procedure.

Uplink scheduling is a key functionality to meet a broad range of use cases including enhanced mobile broadband, massive Machine-Type Communications (MTC), critical MTC, and additional requirements. In LTE, scheduling requests (SRs) are used for requesting UL-SCH resources for new transmissions when the UE 102 has no valid UL/DL grant. If SRs are not configured for the UE 102, the UE 102 may initiate a Random Access procedure to get scheduled in UL.

In LTE, SRs include only one bit of information and indicate only that the UE 102 needs an UL/DL grant. This means that upon the reception of SR, the gNB 160 knows neither which logical channel (associated with certain Quality of Service (QoS) Class Identifier (QCI)) has data available for transmission, or the amount of data available for transmission at the UE 102. Furthermore, it should be noted that the numerology/TTI duration should be conveyed in the UL/DL grant. This implies that the gNB 160 may also be made aware of what numerology/TTI duration is desired by the UE 102 for the upcoming transmission. In short, in NR an accurate UL/DL grant cannot be provided to the UE 102 only based on the one-bit information of the LTE type of SR. It should be noted that LTE scheduling request saves physical layer resources but does not provide sufficient information for efficient UL/DL grant allocation in NR.

Buffer Status Reports (BSRs) on the other hand carry more detailed information compared to SR. A BSR indicates buffer size for each LCG. However, the BSR requires a UL/DL grant for transmission so it may take a longer time until the gNB 160 receives it since it may need to be preceded by an SR. The interaction between SR, BSR and UL/DL grant is exemplified in FIG. 11.

The framework with SR/BSR from LTE may be improved. In an approach, the SR/BSR scheme from LTE can be reused in NR as a baseline. NR should support a wide spread of use cases which have different requirements. In some use cases (e.g., critical MTC and URLLC), NR has tighter latency requirements than has been considered for LTE so far. Also, services such as eMBB can enjoy the enhancements to SR and BSR.

In NR, modifications of SR/BSR aim to report the UE buffer status (e.g., priority and the buffer size) as well as wanted numerology/TTI duration within the given time constraints. It is assumed that a mapping of logical channel (LCH) to LCG to numerology/TTI duration will make it possible to infer which numerology/TTI duration to use given the LCG. Hence no explicit signaling of numerology/TTI duration is needed in the SR/BSR if an LCG (or LCH) is present in the SR/BSR. Considering the limitations identified above, it is possible to either enhance SR with more information bits to indicate more information or enhance BSR.

A possible improvement is to extend the SR to not only indicate whether data is available or not. With more bits used in SR it would be possible to provide more detailed information such as the type of LCG that has data available, and/or the amount of available data associated with the LCG. By knowing the type of LCG, a gNB 160 can provide UL/DL grants for the traffic that needs to be scheduled. This enables a more correct priority handling. By indicating the amount of available data associated with the LCG that needs a UL/DL grant at the UE 102, the gNB 160 can provide a more suitable UL/DL grant size on the preferred numerology/TTI duration, for instance, to the UE 102.

Since the numerology/TTI duration can be derived from the LCG, situations where the UE 102 has data for transmission on, for example, a short TTI, but receives a UL/DL grant on a long TTI can be avoided. How many bits that SR should be extended with is a question of how to achieve a good trade-off between the increased L1 control channel issues (e.g., overhead, design complexity, etc.) and the achieved gain in terms of UP latency reduction. Therefore, more efficient priority handling may be achieved by extending additional bits for SR.

The BSR may also be enhanced. With regard to UL/DL grant-free transmission for BSR, to avoid the delay caused by BSR grant allocation, grant-free transmission of BSR without sending an SR may be supported. This may be a viable opportunity at low and medium load and in cells serving relatively few (active) UEs 102.

Similar grant-free mechanisms are also expected to be introduced that may delay critical use cases such as URLLC. For fast BSR reporting purposes, a dedicated resource allocation per UE 102 may be used. If grant-free transmissions are supported, it would be efficient to send BSR per logical channel group (also referred to as short BSR in LTE). In this way, only the BSR intended for high priority of traffic can be allowed to use the grant-free channel. For efficiency reasons, the grant-free resources assigned per UE 102 may be large enough to fit just the BSR. The grant-free resources should also be possible to be utilized by data transfer, if there is no BSR pending for transmission. Therefore, UL/DL grant allocation delay for BSR can be reduced with grant-free transmission of BSRs.

Improved BSR triggering is also described. In LTE, some of the existing rules for BSR triggering may be too strict. For instance, the UE 102 may be allowed to transmit a BSR when there is new data available in the buffer with higher priority than the existing data, while the UE 102 is not allowed to send a BSR if the new data has the same or lower priority than the existing data. This may lead to information mismatch between the UE 102 and gNB 160, resulting in a long unnecessary scheduling delay until the UE 102 can empty its transmission buffer. In this case, a simple solution is to remove the above restriction (i.e., let the UE 102 send the BSR when there is new data regardless of its priority). The network can configure this feature considering the balance between increased BSR reporting overhead and the need for accurate buffer information estimation. Therefore, the scheduling delay may be reduced by allowing a UE 102 to send BSR upon the arrival of new data regardless of the priority of its associated logical channel.

Just as in the case of SR, the gNB 160 needs to be made aware of what numerology/TTI duration that is preferred or what data is wanted. Since it may be assumed that a mapping of LCH to LCG to numerology/TTI duration will make it possible to infer which numerology/TTI duration to use given the LCG indicated in the BSR, no additional information is needed in the BSR.

SR enhancements give fast reporting without grant allocation at Layer 2. However, it would incur a higher control channel overhead, and higher design complexity. It is also more difficult to ensure the transmission reliability given that more information bits are carried. BSR enhancements potentially achieve the same performance as SR enhancements in terms of reduction of UP latency. While it requires network to assign dedicated resources to each UE 102, it might have a risk of resource over-provision in a case where there are a massive amount of connected UEs 102.

In some cases, if SR enhancements are adopted, BSR enhancements may not be needed and vice versa. Therefore, it is meaningful to further compare different enhancements.

In order to utilize the SCH resources efficiently, a scheduling function is used in MAC. An overview of the scheduler is given in terms of scheduler operation, signaling of scheduler decisions, and measurements to support scheduler operation. The MAC in an NR gNB 160 may include dynamic resource schedulers that allocate physical layer resources for the DL-SCH, UL-SCH transport channels. Different schedulers operate for the DL-SCH and the UL-SCH.

The scheduler should take account of the traffic volume and the QoS requirements of each UE 102 and associated radio bearers when sharing resources between UEs 102. Only "per UE" grants may be used to grant the right to transmit on the UL-SCH. Since a logical channel can be mapped to one or more numerologies/TTI durations, the UL/DL grant may be limited to certain logical channels mapped with certain numerologies, so, only those logical channels are allowed to transmit upon reception of this UL/DL grant. Schedulers may assign resources taking into account a radio conditions at the UE 102 identified through measurements made at the gNB 160 and/or reported by the UE 102.

In the uplink, an NR gNB 160 may dynamically allocate resources (e.g., Physical Resource Blocks (PRBs) and Modulation and Coding Scheme (MCS)) to UEs 102 at each TTI via the Cell Radio Network Temporary Identifier (C-RNTI) on PDCCH(s). Within each scheduling epoch, the scheduling entity may assign a UL/DL grant associated with a set of numerologies/TTI durations for each schedulable UE 102.

Measurement reports are required to enable the scheduler to operate in both uplink and downlink. These include transport volume and measurements of a UE's radio environment. Uplink buffer status reports (BSR) and scheduling request (SR) are needed to provide support for QoS-aware packet scheduling.

The scheduling request (SR) as a layer one signaling message may be used for requesting UL resources for new transmissions when the UE 102 has no valid UL/DL grant. An SR can be transmitted via either a PUCCH like channel in a case where the UE 102 has dedicated resources assigned for it, or a Random Access procedure in a case where the UE 102 has no dedicated resources assigned for it or the UE 102 is out of synchronization from the network.

Uplink buffer status reports (BSR) refer to the data that is buffered in for a group of logical channel (LCG) in the UE 102. Uplink buffer status reports are transmitted using MAC signaling. Prior to a BSR transmission, the UE 102 is required to have a valid UL/DL grant. The scheduling entity needs to be aware information including: an indication that a UE 102 has data to transmit; buffer size for each logical channel (group); priority indication for each logical channel (group); and/or an indication of a set of the associated numerologies/TTI durations for each logical channel (group). For each UE 102, the above information may be reported by a SR or a BSR.

As described above, in LTE, UL scheduling is mainly based on the scheduling request (SR) and buffer status report (BSR) received from UEs 102. The SR is an indication to the eNB to provide a UL/DL grant for transmitting the BSR and contains no information of the amount of data. The information of the amount of data for each of the logical channel group (LCG) may be provided in the BSR.

In NR, UL scheduling based on SR/BSR can be used for eMBB. For URLLC, other than the grant-less transmission, UL scheduling based on SR/BSR may also be implemented. In LTE, when a scheduling request (SR) is triggered, the UE 102 indicates to the eNB that it has data to transmit in the buffer. The eNB provides a default UL grant which is used by the UE 102 to transmit the data and/or BSR. It may be the case that the provided UL/DL grant is enough to transmit all data. However, it is also likely that the UL/DL grant is not enough and the UE 102 has to request another grant using BSR. The consequence of this process is additional delay for the case when the UE 102 would have been able to transmit all data, had the first UL grant been little bit larger. Also, there is no indication of the priority of the SR. Allowing the gNB 160 to know the priority of the SR would help the gNB 160 scheduler prioritize the UL resources among the UEs 102.

In LTE, the eNB has no information whether the UE 102 has a large or small amount of data and also whether the UE 102 has high priority data until the eNB receives a BSR. For delay-sensitive use cases, it can be beneficial if the SR is enhanced to piggyback more information about the characteristic of data being queued at the UE buffer. It is because the UE 102 may be able to transmit all the data in the first UL grant it receives without waiting for the next UL grant received based on a BSR.

NR has to support variety of services. Other than eMBB services, NR also supports URLLC services which require ultra-low latency. Even within eMBB services, there are services that are more delay-stringent than others and may have a higher priority. There may also be Radio Resource Control (RRC)/Non-Access Stratum (NAS) signaling requiring higher priority than normal data transmission from other UEs 102. Hence, it may be beneficial for the gNB scheduler to know the priority of the SR to allow the gNB 160 to prioritize the UL resources among the UEs 102.

In order for the eNB scheduler to schedule the UL resources directly from the received SR, it needs to know the characteristics of the UL data which is contained in the LCG. Hence, it is beneficial for the gNB scheduler to know the LCG associated with UL data. SR with more information on traffic characteristic/services may be beneficial for better UL scheduling at the network. However, in today's LTE SR format, no extra information bits are present apart from presence or absence of SR.

In LTE, there are two types of BSR formats that can be reported to the eNB. The first one is the short/truncated BSR format where buffer status of one logical channel group can be reported. The second one is the long BSR format where data from all logical channel groups are reported. In LTE, there are four LCGs. In NR, more LCGs may be defined to provide finer granularity of the data priorities depending on the number of logical channels or types of services to be supported.

A drawback of the current method is that it is not flexible to transmit the BSR corresponding to two to (max−1) LCGs. It is also not possible to identify the TTIs or service for which the BSR is being reported. Such identification may be helpful for better UL scheduling decision by the network.

Figure 16:
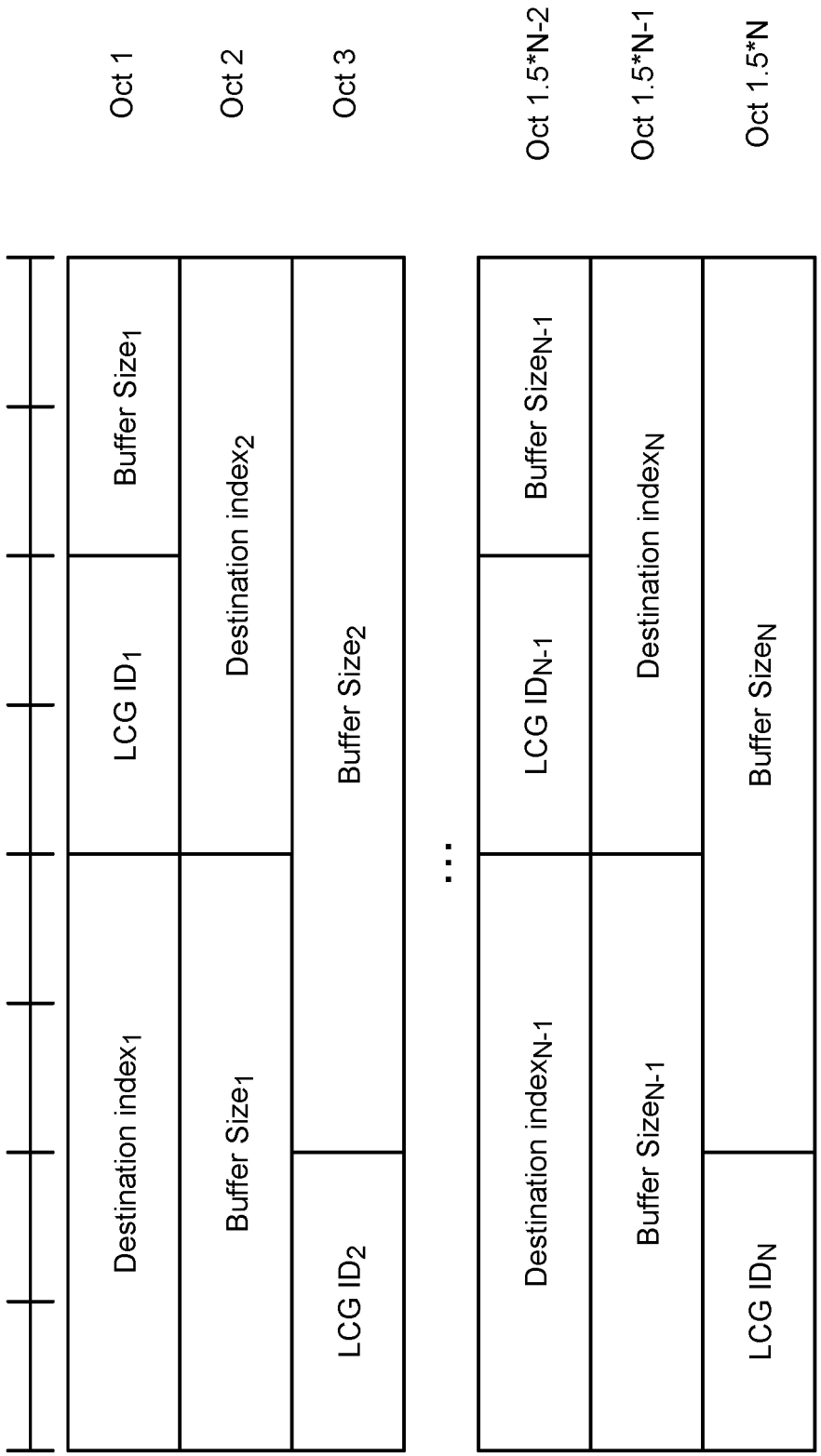
FIG. 16 is an example illustrating a sidelink Buffer Status Report (BSR) format in LTE.

In LTE sidelink operation, each sidelink logical channel group is defined per ProSe destination. A ProSe destination with the highest priority is selected for UL scheduling by the network. Therefore, the sidelink BSR format is different than that of LTE legacy BSR format as shown in FIG. 16.

In NR, it is also possible that more logical channel groups than that of LTE are defined for BSR to help the network better prioritize the user's data. This requires a change in MAC CE format of the BSR, which can be done efficiently if it is defined in terms of logical channel or logical channel groups.

In LTE, only four logical channel group (LCG) are defined to prioritize the data. In NR, for finer granularity of data priorities to reflect the various services and numerologies a UE is supporting, a larger number of LCGs could be necessary in NR. In this case, a new MAC CE for BSR needs to be designed to accommodate all data corresponding to a number of LCGs. The MAC CE could include one or more than one LCG IDs of the data.

Another option in enhancing the BSR could be reporting the BSR corresponding to each logical channel. In NR, it is likely that a logical channel may be associated with a TTI or a service in a UE 102. It could be possible that data in one logical channel may be more important or have higher priority than the data in other logical channel. This can be decided based on a mapping function between the logical channel and TTI duration or QoS flow profile. For this purpose, a new MAC CE can be defined to indicate the logical channel associated with the buffer index in the BSR.

URLLC will provide a paradigm shift and enhance the way of communication with extremely challenging requirements. This includes 1 ms end-to-end radio link latency and guaranteed minimum reliability of 99.999%, which are crucial for some URLLC use cases.

Some URLLC uses cases are described herein and how they map to requirements at a high level. A URLLC terminal (e.g., UE 102) will get a benefit from packet duplication. RLC retransmission (ARQ) is not assumed to be used for meeting the strict user plane latency requirements of URLLC. A URLLC device MAC entity may be supported by more than one numerology/TTI durations.

The NR design aims to meet the URLLC QoS requirements only after the control plane signaling for session setup has completed (to eliminate the case that the UE 102 is initially in idle). Discontinuous reception (DRX) design will not optimize for URLLC service requirements.

For DL, dynamic resource sharing between URLLC and eMBB is supported by transmitting URLLC scheduled traffic. URLLC transmission may occur in resources scheduled for ongoing eMBB traffic. Asynchronous and adaptive HARQ is supported for URLLC DL.

At least an UL transmission scheme without grant is supported for URLLC. Resources may or may not be shared among one or more users.

In an implementation, mini-slots have the following lengths. At least above 6 GHz, mini-slot with length 1 symbol supported. Lengths from 2 to slot length −1 may be supported. It should be noted that some UEs 102 targeting certain use cases may not support all mini-slot lengths and all starting positions. Mini-slots can start at any OFDM symbol, at least above 6 GHz. A mini-slot may contain DMRS at position(s) relative to the start of the mini-slot.

A wide range of URLLC use cases may be supported by NR. 5G aims to support a broad range of use cases (or services) and enable ground-breaking performance of the URLLC devices (e.g., robots, smart cars, etc.). Some URLLC applications are discussed herein.

One URLLC use case is robotics. 5G needs to improve the response time for diagnostic situations. For instance, in the near future, robots will be very low-cost, since robots will only carry around a set of sensors, cameras, actuators and mobility control units. All the intelligent computation system, requiring expensive hardware, may be remotely run on an edge cloud.

The sensors and cameras on the robots may be used to monitor the environment and capture the data in real time. The captured data will be immediately transmitted to a central system in a few milliseconds. The center processes the data in an intelligent way (e.g., based on machine learning and AI (artificial intelligent) algorithms) and makes decisions for the robots. The decision/commands may be delivered to the robot very quickly and the robots will follow the instructions.

The targeted maximum round trip time for this kind of robotic scenario is 1 ms. This may include starting with capturing data, transmitting the data to the center, progressing data on the center and sending the command to the robot, and running the received command.

Another URLLC use case is industrial automation. Industrial automation (together with MTC) is one of the key applications that are considered within 5G systems. Current industrial control systems rely on fast and reliable wired links. However, there exists a large interest in utilizing flexible wireless systems provided by 5G in the future.

This use case considers a combined indoor factory environment, where a number of objects (e.g., robots, self-driving heavy machines, etc.) perform various dedicated tasks as parts of a production process. All these objects are controlled by a production center. These kinds of industrial applications require a guaranteed reliability, higher data rate and minimum end-to-end latency within various control processes.

Another URLLC use case is remote surgery and health care. Remote surgery can be considered as another 5G URLLC use case. With a sense of touch, 5G can enable a surgeon to diagnose (e.g., identify cancerous tissue) where the specialist and the patient physically are not able to be present in the same room/environment.

In this 5G medical use case, there may be a robotic end which in real time will provide the sense of touch to the surgeon during a minimally invasive surgery. The sense of touch will be captured at the robotic end and, with a latency of few milliseconds, the sensed data will be reflected to the surgeon who is at the other end and wears haptic gloves. On top of that, the surgeon needs to be able to remotely control the robotic end as well in a visualized environment. In the remote surgery scenario, the e2e latency is ideally in the order of several milliseconds.

Another URLLC use case is interactive augmented-virtual reality. A high-resolution augmented-virtual reality system is an efficient way to display a real or manipulated environment in three-dimensions for educational purposes, for instance. In one scenario, a number of trainees are connected in a virtualized real environment/system simulator, where the trainees are able to jointly/collaboratively interact with each other by perceiving the same environment and the same artificial subjects and objects. Since the scenario requires interaction between the trainees in real time, the targeted round-trip time from trainee to the simulator and from simulator back to the trainee should be in the order of milliseconds and not exceed human perception time.

Another URLLC use case is smart vehicles, transport and infrastructure. Self-Driving vehicles can be interpreted as automated driving where vehicle-to-infrastructure (e.g., smart bus stop, smart traffic lights, etc.) and vehicle-to-vehicle real-time communication is required. All these communications can be coordinated in real time by a centralized system (e.g., Intelligent Traffic Management Center (ITMC)).

In such a scenario, the ITMC aims to estimate hazardous conditions well in advance and decrease the risk of traffic accidents. As an example, as an intelligent system, the ITMC can monitor attributes of the objects in the traffic based on the object's received data. By doing that, fatal situations will be anticipated and the system will interact directly (e.g., steer vehicles) even before the drivers to prevent accidents. In this kind of traffic scenario, round-trip latencies from vehicles to ITMC and ITMC to the vehicles in the order of milliseconds will increase the traffic safety.

Another URLLC use case is drones and aircraft communication. Drones are getting increasingly important, especially in the surveillance, public safety and media domain. All of these domains come under the critical communication with strict requirements on latency and reliability. The motivation for such requirements varies from mission criticality to monetary benefits (e.g., coverage of sports events using drones leading to in-demand content with high copyrights cost).

Latency and reliability are key factors to control the drones given the nature of use cases considered. Similarly, aircraft communication is also being considered using NR which also demands the highest standard of reliability and strict latency requirements. The long distances and mobility aspects together with latency and reliability requirements present challenges in this use case.

As observed by these use cases, in some URLLC scenarios, mobility is a key requirement together with latency and reliability. A core need of each URLLC use case is reliability and latency and these needs should have precedence over resource efficiency due to criticality of the scenarios.

Both International Telecommunication Union (ITU) and 3GPP have defined a set of requirements for 5G, including URLLC. For URLLC reliability, the requirement is the same, whereas for URLLC latency, 3GPP places a stricter requirement of 0.5 ms one-way end-to-end latency in UL and DL, compared to 1 ms in ITU.

3GPP has agreed on the following relevant requirements. Reliability can be evaluated by the success probability of transmitting X bytes within a certain delay, which is the time it takes to deliver a small data packet from a radio protocol layer 2/3 SDU ingress point to a radio protocol layer 2/3 SDU egress point of a radio interface, at a certain channel quality (e.g., coverage-edge). A general URLLC reliability requirement for one transmission of a packet is $1-10^{-5}$ for 32 bytes with a user plane latency of 1 ms.

User plane (UP) latency can be described as the time it takes to successfully deliver an application layer packet/message from a radio protocol layer 2/3 SDU ingress point to a radio protocol layer 2/3 SDU egress point via a radio interface in both uplink and downlink directions, where neither device nor base station reception is restricted by DRX. For URLLC, the target for user plane latency should be 0.5 ms for UL, and 0.5 ms for DL. Furthermore, if possible, the latency should also be low enough to support the use of the next generation access technologies as a wireless transport technology that can be used within the next generation access architecture. The value above should be considered an average value and does not have an associated high reliability requirement.

According to IMT 2020, LTE Rel-15 should be able to separately fulfill low latency and reliability requirements. Low latency may be defined as the one-way time it takes to successfully deliver an application layer packet/message from a radio protocol layer 2/3 SDU ingress point to a radio protocol layer 2/3 SDU egress point of a radio interface in either uplink or downlink in the network for a given service in unloaded conditions, assuming the mobile station is in the active state. In IMT 2020, the minimum requirements for user plane latency is 1 ms for URLLC.

Reliability may be defined as the success probability of transmitting a layer 2/3 packet within a required maximum time, which is the time it takes to deliver a small data packet from a radio protocol layer 2/3 SDU ingress point to a radio protocol layer 2/3 SDU egress point of a radio interface at a certain channel quality (e.g., coverage-edge). This requirement is defined for the purpose of evaluation in the related URLLC test environment.

The minimum requirement for the reliability is $1-10^{-5}$ success probability of transmitting a data packet of size (e.g., 20 bytes) bytes within 1 ms in channel quality of coverage edge for the Urban macro-URLLC test environment.

Apart from the ITU and 3GPP requirements, there are other interesting combinations of latency and reliability that may apply to future use cases. One such case is a wide-area scenario with a more relaxed latency but with high reliability. Therefore, we argue that a network should be able to configure a wide range of latency-reliability settings. To enable this, several different technological components may be considered for URLLC. Therefore, URLLC may fulfil IMT 2020 requirements and also a wider range of requirements relevant for future use cases.

As mentioned above, a wide range of performance requirements calls for a set of tools for the network to apply according to use case and scenario. At the physical layer, this can include enhanced coding, diversity, repetitions, and extra robust control and feedback. At higher layers, the focus is fast and reliable scheduling, data duplication, and mobility robustness.

Diversity is a key to achieve high reliability. Whereas one single transmission (including control message) can be robust (e.g., low Block Error Rate (BLER)), it requires a very low code rate and therefore wide allocations to reach the target. With diversity, the transmission is spread out in time, space, and frequency, exploiting variations in the channel to maximize the signal.

In time domain, at least two main options may be employed. One option is that the transmission is extended over more OFDM symbols and thereby the code rate is reduced. Alternatively, the transmission is repeated. A repetition can be automatic (bundled transmissions), or a retransmission triggered by feedback.

In frequency domain, the transmission of control and data may be repeated on multiple carriers to exploit frequency diversity of the channel. Frequency repetition of data can be done on lower layers (e.g., MAC) or in higher layers (e.g., PDCP). Another possibility for achieving frequency diversity is to spread out parts of the transmissions over a wider bandwidth.

For UL transmissions, the basic access may be based on a scheduling request (SR). The SR may be followed by an UL grant, and only after receiving this grant can the UE 102 transmit UL data. The two first transmissions (SR and grant) cause an extra delay, which may be an issue for delay sensitive traffic. Latency reduction is a feature in LTE-14 to scale down the minimum schedulable time unit so that the absolute time duration of the first two transmissions is scaled down proportionally. Similar principles can be applied to 5G with tools such as higher numerology. This, in principle, can satisfy the latency requirements and allow several HARQ retransmissions round-trip-time that further enhance the reliability. However, with higher numerology, it poses challenges to support wide-area deployment with power-limited UEs 102 and requires a larger bandwidth. Last but not the least, additional works to enhance reliability for SR and UL grant are required.

As an alternative, the UL grant can be configured (e.g., like SPS UL) with skip padding in LTE. This may be referred to as "Fast UL." With Fast UL, the UE 102 has a configured UL grant that it may use when it has UL data. In this setup, the UL latency is similar to that of DL, making it an important enhancement for URLLC.

Given the large bandwidth (BW) allocations expected for URLLC UL traffic, a configured grant where the gNB 160 pre-allocates a part of the band to a UE 102 can lead to UL capacity problems. This leads to even larger resource waste if the URLLC UL traffic is less frequent and sporadic. This issue can be solved if the same time-frequency resource can be given to multiple UEs 102.

Collisions may occur in contention-based access. To satisfy the strict URLLC requirements, resolutions must be resolved in a reliable way and remedial solutions may45 be in place in the event of the collisions. As a baseline, reliable UE identification should be available for contention-based access in the case of collided transmissions. After detecting the collision, fast switching to grant-based resources should be available. In addition, automatic repetitions with a predefined hopping pattern can reduce requirements on collision probability and UE identification detection.

The requirement on latency and reliability is not only for static UEs 102, but also for UEs 102 with different mobility levels for different use cases.

Increased robustness can be achieved at higher layers by transmitting duplicates of the data in either the spatial domain (e.g., Dual Connectivity), frequency domain (e.g., Carrier Aggregation), or in time domain with MAC/RLC layer duplication. Optionally, without duplication, better reception quality can be achieved by properly selecting between a set of available connecting links (e.g., Multiple Connectivity).

In another aspect, a buffer status reporting (BSR) procedure may be used to provide the serving eNB 160 with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signaling logicalChannelGroup, which allocates the logical channel to a Logical Channel Group (LCG).

For the Buffer Status reporting procedure, the MAC entity may consider radio bearers that are not suspended and may consider radio bearers that are suspended. For narrowband Internet of Things (NB-IoT), the Long BSR is not supported and all logical channels belong to one LCG.

A (BSR) may be triggered if any of the following events occur. A BSR may be triggered if UL data, for a logical channel which belongs to a LCG, becomes available for transmission in the RLC entity or in the Packet Data Convergence Protocol (PDCP) entity and either the data belongs to a logical channel with higher priority than the priorities of the logical channels which belong to any LCG and for which data is already available for transmission, or there is no data available for transmission for any of the logical channels which belong to a LCG. In this case, the BSR may be referred to as a "Regular BSR."

A BSR may also be triggered if UL resources are allocated and the number of padding bits is equal to or larger than the size of the BSR MAC control element plus its subheader. In this case, the BSR may be referred to as a "Padding BSR."

A BSR may also be triggered if the retxBSR-Timer expires and the MAC entity has data available for transmission for any of the logical channels which belong to a LCG. In this case, the BSR may be referred to as a "Regular BSR."

A BSR may also be triggered if a periodicBSR-Timer expires. In this case, the BSR may be referred to as a "Periodic BSR."

For a Regular BSR, if the BSR is triggered due to data becoming available for transmission for a logical channel for which logicalChannelSR-ProhibitTimer is configured by upper layers, a UE 102 may start or restart the logicalChannelSR-ProhibitTimer. Otherwise, if running, the UE 102 may stop the logicalChannelSR-ProhibitTimer.

For Regular and Periodic BSR, if more than one LCG has data available for transmission in the TTI where the BSR is transmitted, the UE 102 may report a Long BSR. Otherwise, the UE 102 may report a Short BSR.

For a Padding BSR, if the number of padding bits is equal to or larger than the size of the Short BSR plus its subheader but smaller than the size of the Long BSR plus its subheader and if more than one LCG has data available for transmission in the TTI where the BSR is transmitted, the UE 102 may report a truncated BSR of the LCG with the highest priority logical channel with data available for transmission. Otherwise, the UE 102 may report a Short BSR. If the number of padding bits is equal to or larger than the size of the Long BSR plus its subheader, the UE 102 may report a long BSR.

If the BSR procedure determines that at least one BSR has been triggered and not cancelled and if the MAC entity has UL resources allocated for new transmission for this TTI, then the UE 102 may instruct the Multiplexing and Assembly procedure to generate the BSR MAC control element(s). The UE 102 may start or restart the periodicBSR-Timer except when all the generated BSRs are Truncated BSRs. The UE 102 may start or restart a retxBSR-Timer.

If a Regular BSR has been triggered and logicalChannelSR-ProhibitTimer is not running, and if an uplink grant is not configured or the Regular BSR was not triggered due to data becoming available for transmission for a logical channel for which logical channel SR masking (logicalChannelSR-Mask) is setup by upper layers, then a Scheduling Request may be triggered.

A MAC PDU may contain at most one MAC BSR control element, even when multiple events trigger a BSR by the time a BSR can be transmitted in which case the Regular BSR and the Periodic BSR have precedence over the padding BSR. The MAC entity shall restart retxBSR-Timer upon indication of a grant for transmission of new data on any UL-SCH.

All triggered BSRs may be cancelled in case the UL grant(s) in this TTI can accommodate all pending data available for transmission but is not sufficient to additionally accommodate the BSR MAC control element plus its subheader. All triggered BSRs may be cancelled when a BSR is included in a MAC PDU for transmission.

The MAC entity may transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI may reflect the buffer status after all MAC PDUs have been built for this TTI. Each LCG may report at the most one buffer status value per TTI and this value may be reported in all BSRs reporting buffer status for this LCG.

It should be noted that padding BSR is not allowed to cancel a triggered Regular/Periodic BSR, except for NB-IoT. A Padding BSR is triggered for a specific MAC PDU only and the trigger may be cancelled when this MAC PDU has been built.

A MAC PDU is a bit string that is byte aligned (i.e., multiple of 8 bits) in length. As described herein, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU is represented with the first and most significant bit in the leftmost bit and the last and least significant bit in the rightmost bit.

MAC SDUs are bit strings that are byte-aligned (i.e., multiple of 8 bits) in length. An SDU is included into a MAC PDU from the first bit onward. The MAC entity may ignore the value of Reserved bits in downlink MAC PDUs.

Figure 12:
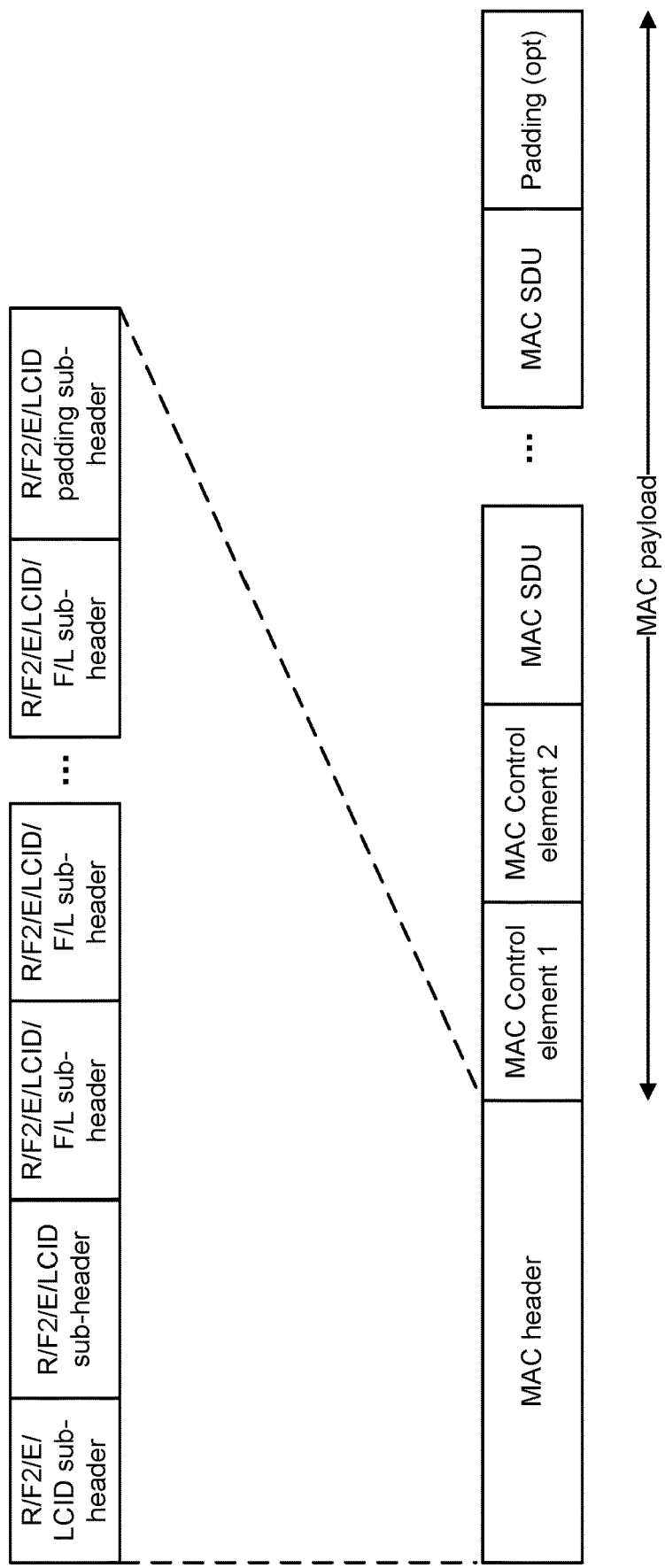
FIG. 12 is an example of medium access control (MAC) Protocol Data Unit (PDU)

A MAC PDU includes a MAC header, zero or more MAC Service Data Units (MAC SDU), zero, or more MAC control elements, and optionally padding, as illustrated in FIG. 12. Both the MAC header and the MAC SDUs may be of variable sizes. A MAC PDU header may include one or more MAC PDU subheaders. Each subheader may correspond to either a MAC SDU, a MAC control element or padding. Examples of MAC PDU subheaders are described in connection with FIG. 13.

A MAC PDU subheader may include the five or six header fields R/F2/E/LCID/(F)/L but for the last subheader in the MAC PDU and for fixed sized MAC control elements. The last subheader in the MAC PDU and subheaders for fixed sized MAC control elements may include the four header fields R/F2/E/LCID. A MAC PDU subheader corresponding to padding includes the four header fields R/F2/E/LCID.

BSR MAC control elements may include one of the following formats. One format is a short BSR and truncated BSR format. This format has one LCG ID field and one corresponding Buffer Size field, as depicted in FIG. 17(a). Another format is a long BSR format. This format has four Buffer Size fields, corresponding to LCG IDs #0 through #3, as depicted in FIG. 17(b).

The BSR formats are identified by MAC PDU subheaders with LCIDs. The fields LCG ID and Buffer Size are defined herein. The Logical Channel Group ID (LCG ID) field identifies the group of logical channel(s) whose buffer status is being reported. The length of the field is 2 bits.

The Buffer Size field identifies the total amount of data available across all logical channels of a logical channel group after all MAC PDUs for the TTI have been built. The amount of data is indicated in a number of bytes. The Buffer Size field may include all data that is available for transmission in the RLC layer and in the PDCP layer. The size of the RLC and MAC headers are not considered in the buffer size computation. The length of this field is 6 bits. If extendedBSR-Sizes is not configured, the values taken by the Buffer Size field are shown in Table 1. If extendedBSR-Sizes is configured, the values taken by the Buffer Size field are shown in Table 2.

TABLE 2

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 3

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

DCI formats are also described herein. The fields defined in DCI formats may be mapped to the information bits $\alpha_0$ to $\alpha_{A-1}$ as follows. Each field may be mapped in the order in which it appears in the description, including the zero-padding bit(s), if any, with the first field mapped to the lowest order information bit $\alpha_0$ and each successive field mapped to higher order information bits. The most significant bit of each field may be mapped to the lowest order information bit for that field (e.g., the most significant bit of the first field is mapped to $\alpha_0$).

DCI format 0 may be used for the scheduling of PUSCH in one UL cell. The following information may be transmitted by means of the DCI format 0. A carrier indicator may be transmitted by DCI format 0. The carrier indicator may be 0 or 3 bits.

The DCI format 0 may transmit a flag for format0/format1A differentiation. The flag may be 1 bit, where value 0 indicates format 0 and value 1 indicates format 1A.

The DCI format 0 may also transmit a frequency hopping flag, which may be 1 bit. This field may be used as the Most Significant Bit (MSB) of the corresponding resource allocation field for resource allocation type 1.

The DCI format 0 may also transmit a resource block assignment and hopping resource allocation. This may be $\lceil \log_2(N_{RB}^{UL}(N_{RB}^{UL}+1)/2) \rceil$ bits. For PUSCH hopping (resource allocation type 0 only), $N_{UL\_hop}$ MSB bits are used to obtain the value of $\tilde{n}_{PRB}(i)$. In this case, $(\lceil \log_2(N_{RB}^{UL}(N_{RB}^{UL}+1)/2) \rceil - N_{UL\_hop})$ bits provide the resource allocation of the first slot in the UL subframe. For non-hopping PUSCH with resource allocation type 0, $(\lceil \log_2(N_{RB}^{UL}(N_{RB}^{UL}+1)/2) \rceil)$ bits provide the resource allocation in the UL subframe. For non-hopping PUSCH with resource allocation type 1, the concatenation of the frequency hopping flag field and the resource block assignment and hopping resource allocation field provides the resource allocation field in the UL subframe.

The DCI format 0 may also transmit a modulation and coding scheme and redundancy version (which may be 5 bits), a new data indicator (1 bit), and a Transmitter Power Control (TPC) command for scheduled PUSCH (2 bits).

The DCI format 0 may also transmit a cyclic shift for Demodulation Reference signal (DMRS) and orthogonal cover code (OCC) index and IFDMA configuration. This field may be 3 bits. This field may not be present when the format 0 CRC is scrambled by UL-SPS-V-RNTI.

The DCI format 0 may also transmit a UL SPS configuration index. This field may be 3 bits. This field may be present when the format 0 CRC is scrambled by UL-SPS-V-RNTI.

The DCI format 0 may also transmit a UL index. This field may be 2 bits. This field may be present only for Time Division Duplex (TDD) operation with uplink-downlink configuration 0, or TDD operation with uplink-downlink configuration 6 and special subframe configuration 10 when the higher layer parameter symPUSCH-UpPts is configured and the corresponding DCI is mapped onto the UE specific search space given by the C-RNTI.

The DCI format 0 may also transmit a downlink assignment index (DAI). This field may be 2 bits. This field may be present only for cases with TDD primary cell and either TDD operation with uplink-downlink configurations 1-6 or Frequency Division Duplex (FDD) operation.

The DCI format 0 may also transmit a CSI request. This field may be 1, 2, 3, 4 or 5 bits. If UEs 102 are not configured with CSI-RS-ConfigNZPAperiodic or if UEs 102 are configured with CSI-RS-ConfigNZPAperiodic and numberActivatedAperiodicCSI-RS-Resources=1 for each CSI process the 2-bit field applies to UEs 102 configured with no more than five DL cells and to the following: UEs 102 that are configured with more than one DL cell and when the corresponding DCI format is mapped onto the UE specific search space given by the C-RNTI; UEs 102 that are configured by higher layers with more than one CSI process and when the corresponding DCI format is mapped onto the UE specific search space given by the C-RNTI; and UEs 102 that are configured with two CSI measurement sets by higher layers with the parameter csi-MeasSubframeSet, and when the corresponding DCI format is mapped onto the UE specific search space given by the C-RNTI. The 3-bit field applies to UEs 102 that are configured with more than five DL cells and when the corresponding DCI format is mapped onto the UE specific search space given by the C-RNTI. Otherwise the 1-bit field applies for the CSI request.

If UEs are configured with CSI-RS-ConfigNZPAperiodic and numberActivatedAperiodicCSI-RS-Resources>1 for at least one CSI process, then the 4-bit field applies to UEs 102 configured with no more than five DL cells and to one or more of the following: UEs 102 that are configured with more than one DL cell and when the corresponding DCI format is mapped onto the UE specific search space given by the C-RNTI; UEs 102 that are configured by higher layers with more than one CSI process and when the corresponding DCI format is mapped onto the UE specific search space given by the C-RNTI; and UEs 102 that are configured with two CSI measurement sets by higher layers with the parameter csi-MeasSubframeSet, and when the corresponding DCI format is mapped onto the UE specific search space given by the C-RNTI. The 5-bit field applies to UEs 102 that are configured with more than five DL cells and when the corresponding DCI format is mapped onto the UE specific search space given by the C-RNTI. Otherwise the 3-bit field applies.

The DCI format 0 may also transmit an SRS request. This field may be 0 or 1 bit. This field can only be present in DCI formats scheduling PUSCH which are mapped onto the UE specific search space given by the C-RNTI.

The DCI format 0 may also transmit a resource allocation type. This field may be 1 bit. This field may only be present if $N_{RB}^{UL} \leq N_{RB}^{DL}$.

The DCI format 0 may also transmit a cyclic shift field mapping table for DMRS. This field may be 1 bit. The 1-bit field applies to UEs 102 that are configured with higher layer parameter UL-DMRS-IFDMA, and when the corresponding DCI format is mapped onto the UE-specific search space given by the C-RNTI. When the format 0 CRC is scrambled by SPS C-RNTI, this field is set to zero.

If the number of information bits in format 0 mapped onto a given search space is less than the payload size of format 1A for scheduling the same serving cell and mapped onto the same search space (including any padding bits appended to format 1A), zeros may be appended to format 0 until the payload size equals that of format 1A.

DCI format 0A is used for the scheduling of PUSCH (e.g., in a Licensed Assisted Access (LAA) SCell). The following information may be transmitted by means of the DCI format 0A. A carrier indicator may be transmitted. This field may be 0 or 3 bits.

The DCI format 0A may also transmit a flag for format0A/format1A differentiation. This field may be 1 bit, where value 0 indicates format 0A and value 1 indicates format 1A.

The DCI format 0A may also transmit a PUSCH trigger A. This field may be 1 bit, where value 0 indicates non-triggered scheduling and value 1 indicates triggered scheduling.

The DCI format 0A may also transmit a timing offset. This field may be 4 bits. When the PUSCH trigger A is set to 0, the field indicates the absolute timing offset for the PUSCH transmission. Otherwise, the first two bits of the field indicate the timing offset, relative to the UL offset 1, for the PUSCH transmission. The last two bits of the field indicate the time window within which the scheduling of PUSCH via triggered scheduling is valid.

The DCI format 0A may also transmit a resource block assignment. This field may be 5 or 6 bits, which provide the resource allocation in the UL subframe.

The DCI format 0A may also transmit a Modulation and coding scheme. This field may be 5 bits.

The DCI format 0A may also transmit a HARQ process number. This field may be 4 bits.

The DCI format 0A may also transmit a new data indicator. This field may be 1 bit.

The DCI format 0A may also transmit a redundancy version. This field may be 2 bits.

The DCI format 0A may also transmit a TPC command for scheduled PUSCH. This field may be 2 bits.

The DCI format 0A may also transmit a cyclic shift for DMRS and OCC index. This field may be 3 bits.

The DCI format 0A may also transmit a CSI request. This field may be 1, 2 or 3 bits. The 2-bit field applies to UEs 102 configured with no more than five DL cells and to the following: UEs 102 that are configured with more than one DL cell and when the corresponding DCI format is mapped onto the UE specific search space given by the C-RNTI; UEs 102 that are configured by higher layers with more than one CSI process and when the corresponding DCI format is mapped onto the UE specific search space given by the C-RNTI; UEs 102 that are configured with two CSI measurement sets by higher layers with the parameter csi-MeasSubframeSet, and when the corresponding DCI format is mapped onto the UE specific search space given by the C-RNTI.

For the CSI request, the 3-bit field applies to UEs 102 that are configured with more than five DL cells and when the corresponding DCI format is mapped onto the UE specific search space given by the C-RNTI. Otherwise the 1-bit field applies.

The DCI format 0A may also transmit a SRS request. This field may be 1 bit.

The DCI format 0A may also transmit a PUSCH starting position. This field may be 2 bits. The bit value and corresponding PUSCH starting position may be implemented as shown in Table 3.

TABLE 3

| Value | PUSCH starting position |
| --- | --- |
| 00 | symbol 0 |
| 01 | 25 µs in symbol 0 |
| 10 | (25 + TA) µs in symbol 0 |
| 11 | symbol 1 |

The DCI format 0A may also transmit a PUSCH ending symbol. This field may be 1 bit, where value 0 indicates the last symbol of the subframe and value 1 indicates the second to last symbol of the subframe.

The DCI format 0A may also transmit a channel access type. This field may be 1 bit.

The DCI format 0A may also transmit a channel access priority class. This field may be 2 bits.

If the number of information bits in format 0A mapped onto a given search space is less than the payload size of format 1A for scheduling the same serving cell and mapped onto the same search space (including any padding bits appended to format 1A), zeros may be appended to format 0A until the payload size equals that of format 1A.

DCI format 0B may be used for the scheduling of PUSCH in each of multiple subframes (e.g., in a LAA SCell). The following information may be transmitted by means of the DCI format 0B. Carrier indicator may be transmitted. This field may be 0 or 3 bits.

The DCI format 0B may also transmit a PUSCH trigger A. This field may be 1 bit, where value 0 indicates non-triggered scheduling and value 1 indicates triggered scheduling.

The DCI format 0B may also transmit a timing offset. This field may be 4 bits. When the PUSCH trigger A is set to 0, the field indicates the absolute timing offset for the PUSCH transmission. Otherwise, the first two bits of the field indicate the timing offset, relative to the UL offset 1, for the PUSCH transmission. The last two bits of the field indicate the time window within which the scheduling of PUSCH via triggered scheduling is valid.

The DCI format 0B may also transmit a number of scheduled subframes. This field may be 1 or 2 bits. The 1-bit field applies when maxNumberOfSchedSubframes-Format0B-r14 is configured by higher layers to two, otherwise the 2-bit field applies.

The DCI format 0B may also transmit a resource block assignment. This field may be 5 or 6 bits, which provide the resource allocation in the UL subframe.

The DCI format 0B may also transmit a modulation and coding scheme. This field may be 5 bits.

The DCI format 0B may also transmit a HARQ process number. This field may be 4 bits. In an implementation, the 4-bit applies to the first scheduled subframe.

The DCI format 0B may also transmit a new data indicator. This field may be maxNumberOfSchedSubframes-Format0B-r14 bits. Each scheduled PUSCH may correspond to 1 bit.

The DCI format 0B may also transmit a redundancy version. This field may be maxNumberOfSchedSubframes-Format0B-r14 bits. Each scheduled PUSCH may correspond to 1 bit.

The DCI format 0B may also transmit a TPC command for scheduled PUSCH. This field may be 2 bits.

The DCI format 0B may also transmit a cyclic shift for DMRS and OCC index. This field may be 3 bits.

The DCI format 0B may also transmit a CSI request. This field may be 1, 2 or 3 bits. The 2-bit field applies to UEs 102 configured with no more than five DL cells and to the following: UEs 102 that are configured with more than one DL cell and when the corresponding DCI format is mapped onto the UE specific search space given by the C-RNTI; UEs 102 that are configured by higher layers with more than one CSI process and when the corresponding DCI format is mapped onto the UE specific search space given by the C-RNTI; and UEs 102 that are configured with two CSI measurement sets by higher layers with the parameter csi-MeasSubframeSet, and when the corresponding DCI format is mapped onto the UE specific search space given by the C-RNTI. The 3-bit field applies to UEs 102 that are configured with more than five DL cells and when the corresponding DCI format is mapped onto the UE specific search space given by the C-RNTI. Otherwise the 1-bit field applies.

The DCI format 0B may also transmit an SRS request. This field may be 2 bits.

The DCI format 0B may also transmit a PUSCH starting position. This field may be 2 bits as specified in Table 3, which is applicable to only the first scheduled subframe.

The DCI format 0B may also transmit a PUSCH ending symbol. This field may be 1 bit, where value 0 indicates the last symbol of the last scheduled subframe and value 1 indicates the second to last symbol of the last scheduled subframe.

The DCI format 0B may also transmit a channel access type. This field may be 1 bit.

The DCI format 0B may also transmit a channel access priority class. This field may be 2 bits.

If the number of information bits in format 0B is equal to the payload size for DCI format 1, 2, 2A, 2B, 2C or 2D associated with the configured DL transmission mode in the same serving cell, one zero bit may be appended to format 0B.

DCI format 0C may be used for the scheduling of PUSCH in one UL cell. The following information may be transmitted by means of the DCI format 0C. A flag for format 0C/format1A differentiation may be transmitted. This field may be 1 bit, where value 0 indicates format 0C and value 1 indicates format 1A.

The DCI format 0C may also transmit a resource allocation type. This field may be 1 bit. This field is only present if $N_{RB}^{UL} \leq N_{RB}^{DL}$.

The DCI format 0C may also transmit a frequency hopping flag. This field may be 1 bit. This field may be used as the MSB of the corresponding resource allocation field for resource allocation type 1.

The DCI format 0C may also transmit a Resource block assignment. This field may be $\lceil \log_2(N_{RB}^{UL}(N_{RB}^{UL}+1)/2) \rceil$ bits. For PUSCH with resource allocation type 0, $\lceil \log_2(N_{RB}^{UL}(N_{RB}^{UL}+1)/2) \rceil$ bits provide the resource allocation in the UL subframe. For non-hopping PUSCH with resource allocation type 1, the concatenation of the frequency hopping flag field and the resource block assignment field provides the resource allocation field in the UL subframe.

The DCI format 0C may also transmit a Modulation and coding scheme. This field may be 5 bits.

The DCI format 0C may also transmit a repetition number. This field may be 3 bits.

The DCI format 0C may also transmit a HARQ process number. This field may be 3 bits.

The DCI format 0C may also transmit a new data indicator. This field may be 1 bit.

The DCI format 0C may also transmit a redundancy version. This field may be 2 bits.

The DCI format 0C may also transmit a TPC command for scheduled PUSCH. This field may be 2 bits.

The DCI format 0C may also transmit a cyclic shift for DMRS and OCC index. This field may be 3 bits.

The DCI format 0C may also transmit a UL index. This field may be 2 bits. This field is present only for TDD operation with uplink-downlink configuration 0.

The DCI format 0C may also transmit a downlink assignment index (DAI). This field may be 2 bits. This field is present only for cases with TDD primary cell and either TDD operation with uplink-downlink configurations 1-6 or FDD operation.

The DCI format 0C may also transmit a CSI request. This field may be 1, 2 or 3 bits. The 2-bit field applies to UEs configured with no more than five DL cells and to the following: UEs 102 that are configured with more than one DL cell and when the corresponding DCI format is mapped onto the UE specific search space given by the C-RNTI; UEs 102 that are configured by higher layers with more than one CSI process and when the corresponding DCI format is mapped onto the UE specific search space given by the C-RNTI; and UEs 102 that are configured with two CSI measurement sets by higher layers with the parameter csi-MeasSubframeSet, and when the corresponding DCI format is mapped onto the UE specific search space given by the C-RNTI. The 3-bit field applies to UEs 102 that are configured with more than five DL cells and when the corresponding DCI format is mapped onto the UE specific search space given by the C-RNTI. Otherwise the 1-bit field applies.

The DCI format 0C may also transmit an SRS request. This field may be 1 bit.

The DCI format 0C may also transmit a modulation order override. This field may be 1 bit.

The DCI format 0C may also transmit precoding information. This field is present only if the higher layer parameter transmissionModeUL is configured to be transmission mode 2.

If the number of information bits in format 0C mapped onto a given search space is less than the payload size of format 1A for scheduling the same serving cell and mapped onto the same search space (including any padding bits appended to format 1A), zeros may be appended to format 0C until the payload size equals that of format 1A.

A random access response grant is also described herein. The higher layers may indicate a 20-bit UL Grant to the physical layer. This is referred to the random access response grant in the physical layer. The content of these 20 bits starting with the MSB and ending with the least significant bit (LSB) are as follows: Hopping flag (1 bit); Fixed size resource block assignment (10 bits); Truncated modulation and coding scheme (4 bits); TPC command for scheduled PUSCH (3 bits); UL delay (1 bit); and CSI request (1 bit).

The UE 102 may use a single-antenna port uplink transmission scheme for the PUSCH transmission corresponding to the random access response grant and the PUSCH retransmission for the same transport block.

The UE 102 may perform PUSCH frequency hopping if the single bit frequency hopping (FH) field in a corresponding random access response grant is set as 1 and the uplink resource block assignment is type 0, otherwise no PUSCH frequency hopping is performed. When the hopping flag is set, the UE 102 may perform PUSCH hopping as indicated via the fixed size resource block assignment detailed below.

The fixed size resource block assignment field is interpreted as follows: if $N_{RB}^{UL} \leq 44$, then truncate the fixed size resource block assignment to its b least significant bits, where $b = \lceil \log_2(N_{RB}^{UL} \cdot (N_{RB}^{UL}+1)/2) \rceil$, and interpret the truncated resource block assignment according to the rules for a regular DCI format 0. Else, insert b most significant bits with value set to '0' after the NUL_hop hopping bits in the fixed size resource block assignment, where the number of hopping bits NUL_hop is zero when the hopping flag bit is not set to 1, and is defined in Table 8.4-1 when the hopping flag bit is set to 1, and $b = (\lceil \log_2(N_{RB}^{UL} \cdot (N_{RB}^{UL}+1)/2) \rceil - 10)$, and interpret the expanded resource block assignment according to the rules for a regular DCI format 0.

The truncated modulation and coding scheme field may be interpreted such that the modulation and coding scheme corresponding to the random access response grant is determined from MCS indices 0 through 15 in Table 8.6.1-1.

The TPC command $\delta_{msg\_2}$ may be used for setting the power of the PUSCH, and is interpreted according to Table 4.

TABLE 4

| TPC Command | Value (in dB) |
| --- | --- |
| 0 | −6 |
| 1 | −4 |
| 2 | −2 |

TABLE 4-continued

| TPC Command | Value (in dB) |
| --- | --- |
| 3 | 0 |
| 4 | 2 |
| 5 | 4 |
| 6 | 6 |
| 7 | 8 |

In non-contention based random access procedure, the CSI request field may be interpreted to determine whether an aperiodic channel quality indicator (CQI), Precoding Matrix Indicator (PMI), Rank Indicator (RI), and Contention Resolution Identity (CRI) report is included in the corresponding PUSCH transmission. In contention based random access procedure, the CSI request field is reserved.

The UL delay applies for TDD, FDD and FDD-TDD and this field can be set to 0 or 1 to indicate whether the delay of PUSCH is introduced.

An example of a random access preamble is also described herein. The physical layer random access burst includes a cyclic prefix, a preamble, and a guard time during which nothing is transmitted. The random access preambles may be generated from Zadoff-Chu sequences with zero correlation zone (ZC-ZCZ) or generated from one or several root Zadoff-Chu sequences.

Figure 9:
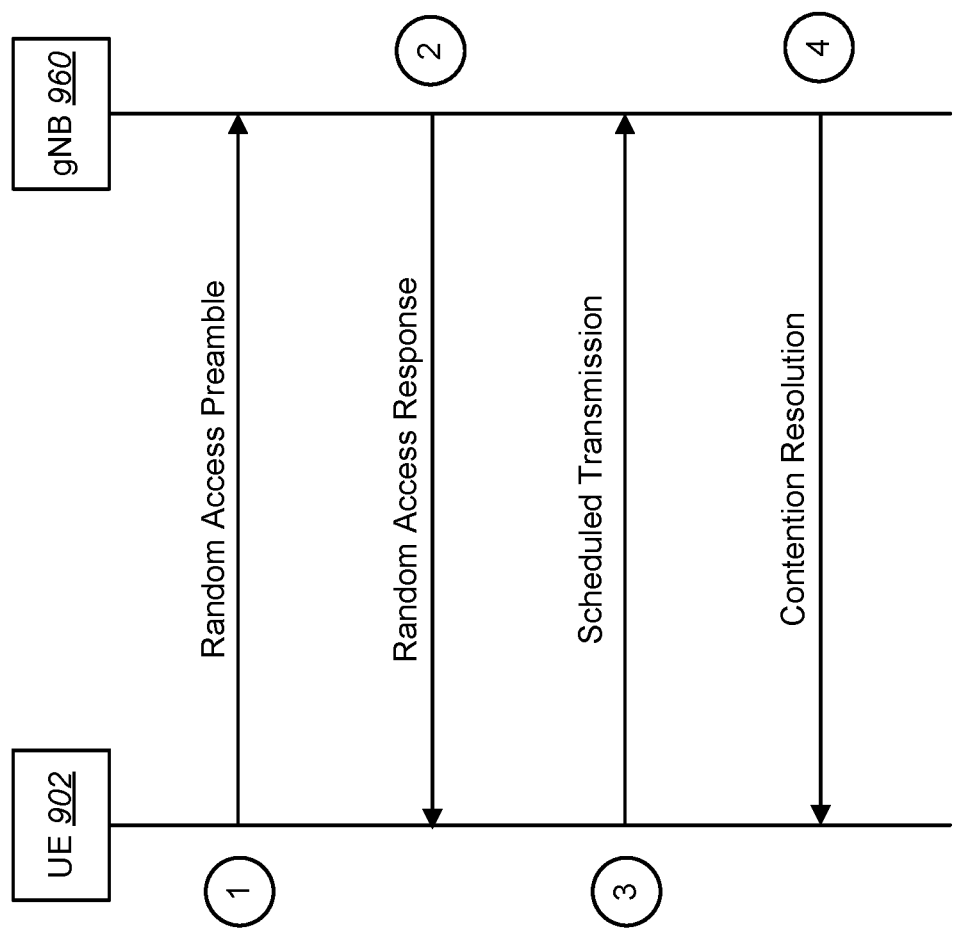
FIG. 9 is an example illustrating a contention-based random access procedure.

A contention-based random access procedure is outlined on FIG. 9. A non-contention based random access procedure is outlined in FIG. 10.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB numerology support module 194. The gNB numerology support 194 may support multiple numerologies in a single grant for a 5G NR UE 102 as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
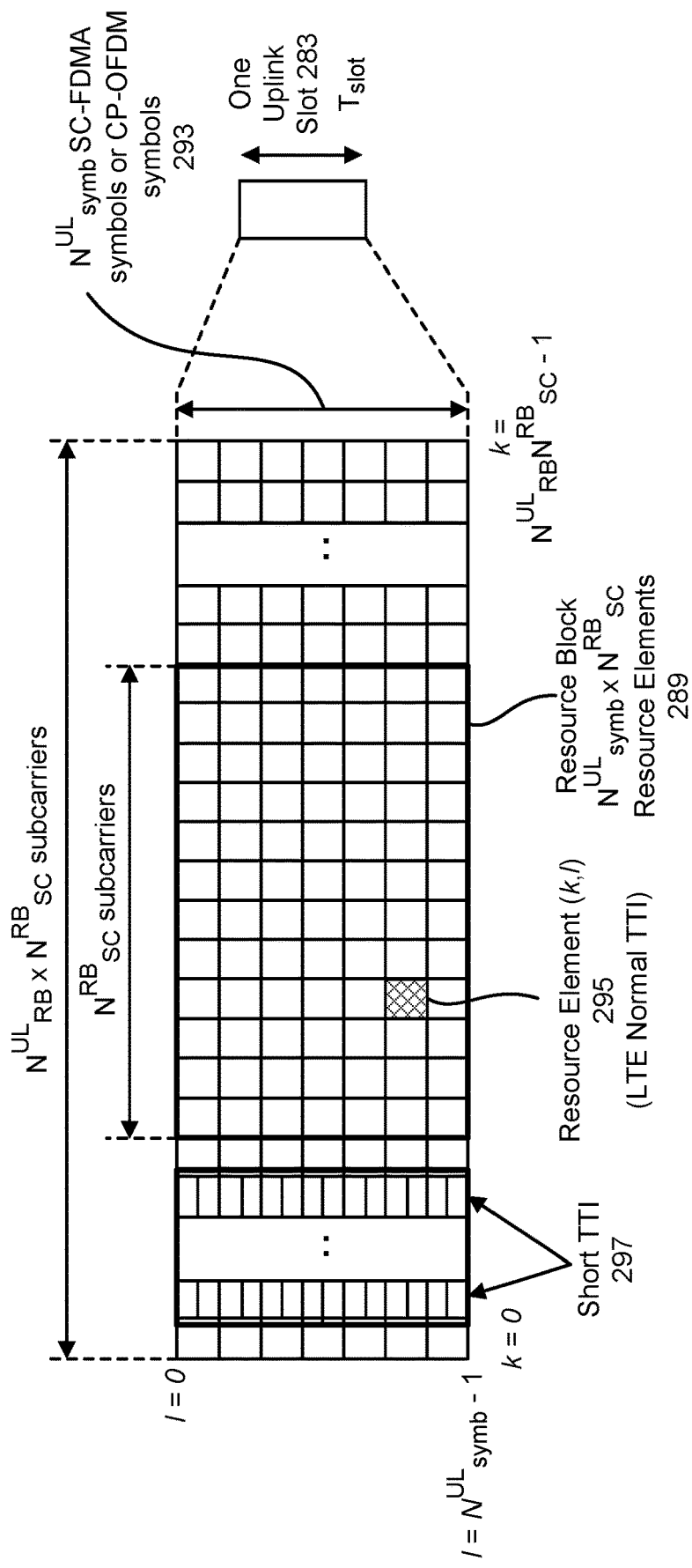
FIG. 2 is a diagram illustrating one example of a resource grid for the uplink.

FIG. 2 is a diagram illustrating one example of a resource grid for the uplink. The resource grid illustrated in FIG. 2 may be utilized in some implementations of the systems and methods disclosed herein. More detail regarding the resource grid is given in connection with FIG. 1.

In FIG. 2, one uplink subframe may include two uplink slots 283. $N^{UL}_{RB}$ is uplink bandwidth configuration of the serving cell, expressed in multiples of $N^{RB}_{sc}$, where $N^{RB}_{sc}$ is a resource block 289 size in the frequency domain expressed as a number of subcarriers, and $N^{UL}_{symb}$ is the number of SC-FDMA or CP-OFDM symbols 293 in an uplink slot 283. A resource block 289 may include a number of resource elements (RE) 291.

In LTE, a resource block 289 may be a normal Transmission Time Interval (TTI) 295. In NR, a short TTI 297 may be a number of resource elements 289 or sub-units of resource elements 289. The length of a short TTI 297 may be less than a normal TTI 295.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, Physical Random Access Channel (PRACH) and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair may include two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) and is uniquely identified by the index pair (k,l) in a slot, where k and l are indices in the frequency and time domains respectively. While uplink subframes in one component carrier (CC) are discussed herein, uplink subframes are defined for each CC.

FIG. 3 shows examples of several numerologies 301. The numerology #1 301a may be a basic numerology (e.g., a reference numerology). For example, a RE 395a of the basic numerology 301a may be defined with subcarrier spacing 305a of 15 kHz in frequency domain and 2048 Ts+CP length (e.g., 160 Ts or 144 Ts) in time domain (i.e., symbol length #1 303a), where Ts denotes a baseband sampling time unit defined as 1/(15000*2048) seconds. For the i-th numerology, the subcarrier spacing 305 may be equal to $15*2^i$ and the effective OFDM symbol length $2048*2^{-i}*Ts$. It may cause the symbol length is $2048*2^{-i}*Ts$+CP length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology.

In Numerology #2 301b, the RE 395b may be defined with symbol length #2 303b and subcarrier spacing #2 305b. In Numerology #3 301c, the RE 395c may be defined with symbol length #3 303c and subcarrier spacing #3 305c. In Numerology #4 301d, the RE 395d may be defined with symbol length #4 303d and subcarrier spacing #4 305d.

While four numerologies 301a-d are shown in FIG. 3, the system may support another number of numerologies 301. Furthermore, the system does not have to support all of the 0-th to the I-th numerologies 301, i=0, 1, . . . , I.

FIG. 4 shows examples of subframe structures for the numerologies 401 that are shown in FIG. 3. Given that a slot 283 includes $N^{DL}_{symb}$ (or $N^{UL}_{symb}$)=7 symbols, the slot length of the i+1-th numerology 401 is a half of the one for the i-th numerology 401, and eventually the number of slots 283 in a subframe (i.e., 1 ms) becomes double. It may be noted that a radio frame may include 10 subframes, and a radio frame length may be equal to 10 ms.

Figure 5:
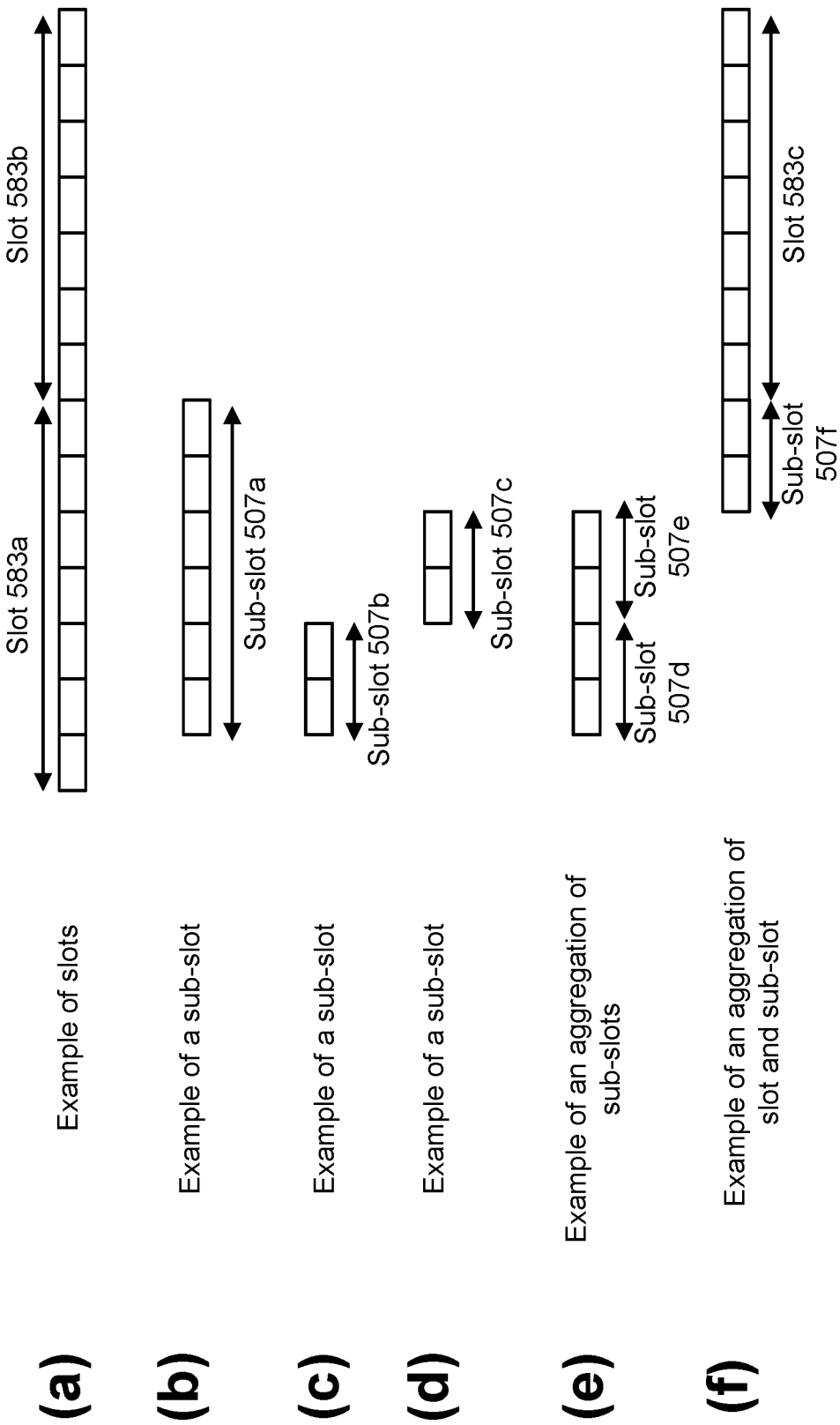
FIG. 5 shows examples of slots and sub-slots.

FIG. 5 shows examples of slots 583 and sub-slots 507. If a sub-slot 507 is not configured by higher layer, the UE 102 and the eNB/gNB 160 may only use a slot 583 as a scheduling unit. More specifically, a given transport block may be allocated to a slot 583. If the sub-slot 507 is configured by higher layer, the UE 102 and the eNB/gNB 160 may use the sub-slot 507 as well as the slot 583. The sub-slot 507 may include one or more OFDM symbols. The maximum number of OFDM symbols that constitute the sub-slot 507 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 507 may start at any symbol within a slot 583 unless it collides with a control channel. There could be restrictions of mini-slot length based on restrictions on starting position. For example, the sub-slot 507 with the length of $N^{DL}_{symb}-1$ (or $N^{UL}_{symb}-1$) may start at the second symbol in a slot 583. The starting position of a sub-slot 507 may be indicated by a physical layer control channel (e.g., by DCI format). Alternatively, the starting position of a sub-slot 507 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 507.

In cases when the sub-slot 507 is configured, a given transport block may be allocated to either a slot 583, a sub-slot 507, aggregated sub-slots 507 or aggregated sub-slot(s) 507 and slot 583. This unit may also be a unit for HARQ-ACK bit generation.

Example (a) illustrates slots 583a-b with seven symbols. Example (b) illustrates a sub-slot 507a of six symbols. Example (c) illustrates a sub-slot 507b of two symbols. Example (d) illustrates a sub-slot 507c of two symbols. Example (e) illustrates an aggregation of sub-slots 507d-e. Example (f) illustrates an aggregation of a sub-slot 507f and a slot 583c.

Here, the DCI (i.e., the DCI format) may be transmitted on a Physical Downlink Control Channel (PDCCH). More than one DCI format may be defined for DCI transmission on the PDCCH. Fields may be defined in the DCI format, and the fields may be mapped to the information bits (e.g., DCI bits). For example, a DCI format 1A that is used for scheduling of one physical shared channel (PSCH) (e.g., PDSCH, transmission of one downlink transport block) in a cell may be defined as the DCI format for the downlink. Also, for example, a DCI format (e.g., a DCI format 0, a DCI format 0A, and/or a DCI format 0C) that is used for scheduling of the PUSCH (e.g., the PUSCH transmission of one uplink transport block) in a cell may be defined as the DCI format for the uplink. Also, for example, a DCI format (e.g., DCI format 0B) that is used for scheduling of the PUSCH in each of multiple subframes may be defined as the DCI format for the uplink. Also, a DCI format that is used for scheduling of the PUSCH in each of frequency band(s) (RB(s)) may be defined as the DCI format for the uplink.

A random access response grant that is used for scheduling of the PUSCH may be defined for a random access procedure (e.g., a contention based random access procedure, and/or a non-contention based random access procedure (i.e., a contention-free random access procedure)). For example, in the random access procedure, the gNB 160 may transmit, as a message 2 (Msg. 2), a random access response that corresponds to a random access preamble transmission (i.e., a message 1 (Msg. 1)). The random access response may include the random access response grant. For example, the PDSCH scheduled by using the PDCCH with RA-RNTI (Random Access RNTI) may be used for transmitting the random access response. The UE 102 may transmit a message 3 (Msg. 3) based on the random access response grant. The message 3 may be transmit on Uplink Shared Channel (UL-SCH). Namely, the message 3 may be transmitted on the PUSCH scheduled by using the random access response grant.

The DCI format (e.g., a DCI format 0, a DCI format 0A, and/or a DCI format 0C), the DCI format (e.g., DCI format 0B), the DCI format that is used for scheduling of the PUSCH in each of frequency band(s), and/or the random access response grant herein may be assumed to be included in an uplink grant (UL grant) in some implementations for the sake of simple description.

The gNB 160 may schedule, by using the UL grant, the PUSCH in the subframe, the slot 583, and/or the sub-slot 507. Also, the gNB 160 may schedule, by using one or more UL grants (i.e., a single UL grant and/or multiple UL grants), multiple PUSCHs in a same timing (e.g., a single time slot, a single slot 583, and/or a single sub-slot 507). Also, the gNB may schedule, by using one or more UL grants (i.e., a single UL grant and/or multiple UL grants), multiple PUSCHs in different timing(s) (e.g., different time slot(s), different slot(s) 583, and/or different sub-slot(s) 507).

Here, one of the multiple PUSCHs scheduled (in the same timing, and/or in the different timing(s)) by using the UL grant(s) may be the PUSCH in the subframe (i.e., the PUSCH mapped to over the subframe). Also, one of the multiple PUSCHs scheduled (in the same timing, and/or the different timing(s)) by using the UL grant(s) may be the PUSCH in the slot 583 (i.e., the PUSCH mapped to over the slot 583). Also, one of the multiple PUSCHs scheduled (in the same timing, and/the different timing(s)) by using the UL grant(s) may be the PUSCH in the sub-slot 507 (i.e., the PUSCH mapped to over the sub-slot 507). Namely, the gNB 160 may schedule multiple PUSCHs in the same timing and/or the different timing, and each of the multiple PUSCHs may be scheduled in different time duration(s) (e.g., different transmission time interval(s) (TTI(s)).

Also, the gNB 160 may schedule, by using one or more UL grants, multiple PUSCHs with multiple numerologies 301 (e.g., the PUSCH of a first subcarrier spacing (e.g., 15 KHz), the PUSCH of a second subcarrier spacing (e.g., 30 KHz), the PUSCH of a third subcarrier spacing (e.g., 60 KHz), and/or the PUSCH of a fourth subcarrier spacing (e.g., 120 KHz)). Namely, the gNB 160 may schedule multiple PUSCHs, and the numerologies 301 (the subcarrier spacing) of each of the multiple PUSCHs may be different. Namely, the gNB 160 may schedule, in the same subframe and/or the different subframe, the multiple PUSCHs with the multiple numerologies 301.

For example, the gNB 160 may transmit a RRC (Radio Resource Control) signal (e.g., a dedicated RRC signal) including first information configuring multiple transmission timings (e.g., four transmission timings). In addition, the gNB 160 may transmit the UL grant including second information indicating one or more transmission timings amount the multiple transmission timings. Namely, the UE 102 may perform one or more PUSCH transmissions in one or more transmission timings, which is indicated by using the second information (i.e., one or more transmission timings indicated, by using the second information, among the multiple transmission timings). Here, the first information may be included in a MIB (Master Information Block), and/or a SIB (System Information Block). Namely, the first information may be transmitted on the Physical Broadcast Channel (PBCH), and/or the PDSCH. Also, the first information may be included in configuration(s) for a random access procedure (i.e., Random Access Channel (RACH) configuration).

Also, the gNB 160 may transmit the RRC signal including third information configuring multiple numerologies 301 (e.g., four numerologies). In addition, the gNB 160 may transmit the UL grant including fourth information indicating one or more numerologies 301 among the multiple numerologies 301. Namely, the UE 102 may perform the transmission(s) on the PUSCH(s) with one or more numerologies 301, which is indicated by using the fourth information (i.e., one or more numerologies 301 indicated, by using the fourth information, among the multiple numerologies 301). Here, the third information may be included in a MIB (Master Information Block), and/or a SIB (System Information Block). Namely, the third information may be transmitted on the PBCH, and/or the PDSCH. Also, the third information may be included in configuration(s) for a random access procedure (i.e., RACH configuration).

The UE may monitor a set of candidates of the DL control channel(s) (e.g., in the occasions(s)). Here, the candidates of DL control channel (s) may be candidates for which the DL control channel(s) may possibly be mapped, assigned, and/or transmitted. For example, a candidate of the DL control channel(s) is composed of one or more control channel elements (CCEs). The term "monitor" means that the UE attempts to decode each DL control channel(s) in the set of candidates of the DL control channel(s) in accordance with all the DCI format(s) (e.g., the UL grant) to be monitored. The set of candidates of the DL control channel(s) which the UE monitors may be also referred to as a search space (e.g., DL control channel set etc.). That is, the search space is a set of resource that may possibly be used for transmission of the DL control channel(s).

Here, a common search space (CSS) and a user equipment-specific search space (USS) are set (or defined, configured) in a region(s) of DL control channel(s). For example, the CSS may be used for transmission of DCI (e.g., the UL grant) to a plurality of the UEs. That is, the CSS may be defined by a resource common to a plurality of the UEs. For example, the CSS is composed of CCEs having numbers that are predetermined between the gNB and the UE. For example, the CSS is composed of CCEs having indices 0 to 15. Also, the CSS (e.g., the region of the CSS) may be configured by using the MIB and/or the SIB. Namely, the CSS may be configured by using the PBCH and/or the PDSCH. Here, the CSS may be used for transmission of DCI to a specific UE. That is, the gNB may transmit, in the CSS, DCI format(s) intended for a plurality of the UEs 102 and/or DCI format(s) intended for a specific UE 102.

The USS may be used for transmission of DCI (the UL grant) to a specific UE 102. That is, the USS may be defined by a resource dedicated to a certain UE 102. The USS may be defined independently for each UE 102. For example, the USS may be composed of CCEs having numbers that are determined based on a Radio Network Temporary Identifier (RNTI), a slot number in a radio frame, an aggregation level, and/or the like. The RNTI(s) may be assigned by the gNB 160. Namely, each of the USSs corresponding to each of the RNTI(s) described blow may be defined. Also, for example, the USS (e.g., the region of the USS) may be configured by using the MIB and/or the SIB. Namely, the USS may be configured by using the PBCH and/or the PDSCH. Also, the USS may be configured by using the RRC signal (e.g., the dedicated RRC signal). Also, the base station may transmit, in the USS, DCI format(s) intended for a specific UE 102.

Here, the RNTI(s) may include Cell-RNTI (C-RNTI), System Information RNTI (SI-RNTI), Paging RNTI (P-RNTI), Random Access-RNTI (RA-RNTI) and/or Temporary C-RNTI. For example, C-RNTI may be a unique identification used for identifying RRC connection and scheduling. The SI-RNTI may be used for identifying SI (i.e., SI message) mapped on the Broadcast Control Channel (BCCH) and dynamically carried on DL-SCH. The SI-RNTI may be used for broadcasting of SI. The P-RNTI may be used for transmission of Paging and/or SI change notification. The RA-RNTI may be an identification used for the random access procedure. The Temporary C-RNTI may be used for the random access procedure. And, the RNTI(s) assigned to the UE 102 may be used for transmission of DCI (transmission of DL control channel(s)). Specifically, Cyclic Redundancy Check (CRC) parity bits (also referred to simply as CRC), which are generated based on DCI (or the DCI format, and/or the UL grant), are attached to DCI, and, after attachment, the CRC parity bits are scrambled by the RNTI(s). The UE may attempt to decode DCI to which the CRC parity bits scrambled by the RNTI(s) are attached, and detects DL control channel; (e.g., DCI, the DCI format, and/or the UL grant). That is, the UE may decode the DL control channel(s) with the CRC scrambled by the RNTI(s). That is, the UE may monitor the DL control channel(s) with the RNTI(s).

Here, the gNB 160 may configure one or more occasions (i.e., a first occasion(s)) of DL control channel(s) (e.g., PDCCH(s)) monitoring with respect to the one or more numerologies 301 of the DL control channel(s) (e.g., the first numerologies 301). Here, the occasion(s) may correspond to a subframe, a slot 583, a sub-slot 507, and/or a symbol. For example, the occasion(s) may correspond to a position(s) of a subframe, a slot 583, a sub-slot 507, and/or a symbol. Here, the gNB 160 may configure, (e.g., by using the RRC signal, the MIB, and/or the SIB), one or more DCI format(s) (i.e., a first DCI format(s)) which the UE 102 may monitor in the occasion(s) of the DL control channel(s) with respect to the one or more numerologies 301 of the DL control channel(s).

Also, the gNB 160 may configure, (by using the RRC signal, the MIB, and/or the SIB), one or more RNTI(s) which the UE 102 may monitor the DL control channel(s) in the occasion(s) of the DL control channel(s) with respect to the one or more numerologies 301 of the DL control channel(s). For example, the gNB 160 may configure, (e.g., by using the RRC signal, the MIB, and/or the SIB), a set of the occasion(s), the first DCI format(s), and/or the first RNTI(s) (e.g., a combination of the occasion(s), the first DCI format(s), and/or the first RNTI(s)). Namely, the gNB 160 may configure the first DCI format(s) and/or the first RNTI(s) for the occasion(s). The UE 102 may monitor in a certain occasion, the DL control channel(s) based on the numerology 301, the first DCI format(s), and/or the first RNTI(s). Namely, the UE 102 may monitor in the certain occasion, the DL control channel(s) by assuming the configured numerology 301. Also, the UE 102 may monitor in the certain occasion, the DL control channel(s) by assuming that the first DCI format(s) is transmitted. Also, the UE 102 may monitor in the certain occasion, the DL control channel(s) by assuming that the first RNTI(s) is attached to the first DCI format(s) (e.g., CRC parity bits scrambled by the first RNTI(s) is attached to the first DCI format(s)).

Here, the first DCI format(s) and the first RNTI(s) may be defined, in advance, by the specification and known information between the gNB 160 and the UE 102. For example, the first DCI format(s) may include any one or more UL grants (e.g., the DCI format 0 and the DCI format 0A, and/or the UL grants except for the random access response grant). Also, for example, the first RNTI(s) may include any one or more RNTIs as above described (e.g., C-RNTI).

Also, the occasion(s) (i.e., the first occasion(s)) may be configured only for the DL control channel(s) of the USS. Namely, the set of the occasion(s), the DCI format(s), and/or the RNTI(s) may be configured only for the DL control channel(s) of the USS. And, the set of the occasion(s), the DCI format(s), and/or the RNTI(s) for the DL control channel(s) of the CSS may be defined, in advance by specification as one or more predetermined numerologies, one or more predetermined DCI format(s), and/or one or more predetermined RNTI(s).

The one or more predetermined numerologies 301 (e.g., second numerologies 301) may be one or more default numerologies 301, and/or one or more reference numerologies 301. Also, the one or more predetermined DCI formats (a second DCI formats) may be one or more default DCI formats, and/or one or more reference DCI formats. Also, the one or more predetermined RNTIs (a second RNTIs) may be one or more default RNTIs, and/or one or more reference RNTIs. Here, for example, the second numerologies 301, the second DCI format(s), and/or the second RNTI(s) may be defined, in advance, by the specifications, and known information between the gNB 160 and the UE 102. Also, for example, the second numerologies 301, the second DCI format(s), and/or the second RNTI(s) may be configured by using the MIB and/or the SIB. Namely, the second numerologies 301, the second DCI format(s), and/or the second RNTI(s) may be configured by using the PBCH and/or the PDSCH. Also, the second numerologies 301, the second DCI format(s), and/or the second RNTI(s) may be defined per a frequency band. For example, for a first frequency band (e.g., below 6 GHz), a first set of the second numerologies, the second DCI format(s), and/or the second RNTI(s) may be defined.

Also, for a second frequency band (e.g., above 6 GHz), a second set of the second numerologies 301, the second DCI format(s), and/or the second RNTI(s) may be defined. For example, the second DCI format(s) may include any one or more UL grants (e.g., the random access response grant, and/or the DCI format 0). Also, for example, the second RNTI(s) may include any one or more RNTIs as above described (e.g., the SI-RNTI, the P-RNTI, the RA-RNTI, and/or the Temporary C-RNTI).

The UE 102 may monitor the DL control channel(s) of the CSS based on the assumption of the second numerologies 301, the second DCI format(s), and/or the second RNTI(s). Namely, the UE 102 may monitor the DL control channel (s) of the CSS in every timing (e.g., in every subframe, in every slot, and/or in every sub-slot). Here, the every timing may be every timing except for a timing of Discontinues Reception (DRX). Namely, the every timing may be every non-DRX timing.

Also, the gNB 160 may configure, (e.g., by using the RRC signal, the MIB, and/or the SIB) one or more occasions (e.g., a second occasion(s)) of monitoring of the DL control channel of the CSS, the second DCI format(s), and/or the second RNTI(s). Namely, the gNB 160 may configure the second occasion(s) different from the first occasion(s). The gNB 160 may configure a set of the second occasion(s), the second DCI format(s), and/or the second RNTI(s) (e.g., a combination of the second occasion(s), the second DCI format(s), and/or the second RNTI(s)). The second DCI format(s) and/or the second RNTI(s) may be configured for the second occasion(s).

Here, the numerologies 301 of the PUSCH may be associated with the occasion(s). For example, the association of the numerologies 301 of the PUSCH and the occasion(s) of the DL control channel(s) (i.e., the UL grant, the DL control channel(s) on which the UL grant(s) is transmitted on) used for scheduling of the PUSCH may be defined. The gNB 160 may configure the association (e.g., a correspondence) by using information included in the RRC signal, the MIB, and/or the SIB.

In a case that the first numerology 301 is configured for the occasion(s) of the DL control channel(s), the numerologies 301 of the PUSCH scheduled by using the DL control channel(s) may be the first numerology 301. Also, in a case that the second numerology 301 is configured for the occasion(s) of the DL control channel(s), the numerologies 301 of the PUSCH scheduled by using the DL control channel(s) may be the second numerology 301 and/or the third numerology 301. Also, in a case that the third numerology 301 and the forth numerology 301 may be configured for the occasion(s) of the DL control channel(s), the numerologies 301 of the PUSCH scheduled by using the DL control channel(s) may be the second numerology 301, the third numerology 301 and/or the fourth numerology 301.

In a case that the UE 102 detects the DL control channel (s) of the first numerology 301, the numerologies 301 of the PUSCH may be the first numerology 301. Also, in a case that the UE 102 detects the DL control channel (s) of the second numerology 301, the numerologies 301 of the PUSCH may be the second numerology 301 and/or the third numerology 301. Also, in a case that the UE 102 detects the DL control channel(s) of the third numerology 301, the numerologies 301 of the PUSCH may be the second numerology 301, the third numerology 301 and/or the fourth numerology 301.

The UE 102 may perform the PUSCH(s) transmission based on the scheduling by the gNB 160. For example, the UE 102 may perform the multiple PUSCH(s) transmission(s) in the same timing. Also, the UE 102 may perform the multiple PUSCH(s) transmission(s) in the different timing. For example, the UE 102 may perform the multiple PUSCH(s) transmission(s) of the same and/or different numerologies 301 in the same timing. Namely, the UE 102 may perform simultaneous transmission of the multiple PUSCH(s) of the same and/or different numerologies 301. Also, the UE 102 may perform the multiple PUSCH(s) transmission(s) of the same and/or different numerologies 301 in the different timing.

The gNB 160 may transmit (e.g., by using the RRC signal, the UL grant, the MIB, and/or the SIB) information used for configuring the simultaneous transmission of the PUSCH(s) of the same and/or different numerologies 301. For example, in a case that the simultaneous transmission of the PUSCH(s) of the same and/or different numerologies 301 is configured (e.g., indicated, allowed), the UE 102 may perform the simultaneous transmission of PUSCH(s) of the same and/or different numerologies 301 in the different timing.

Figure 6:
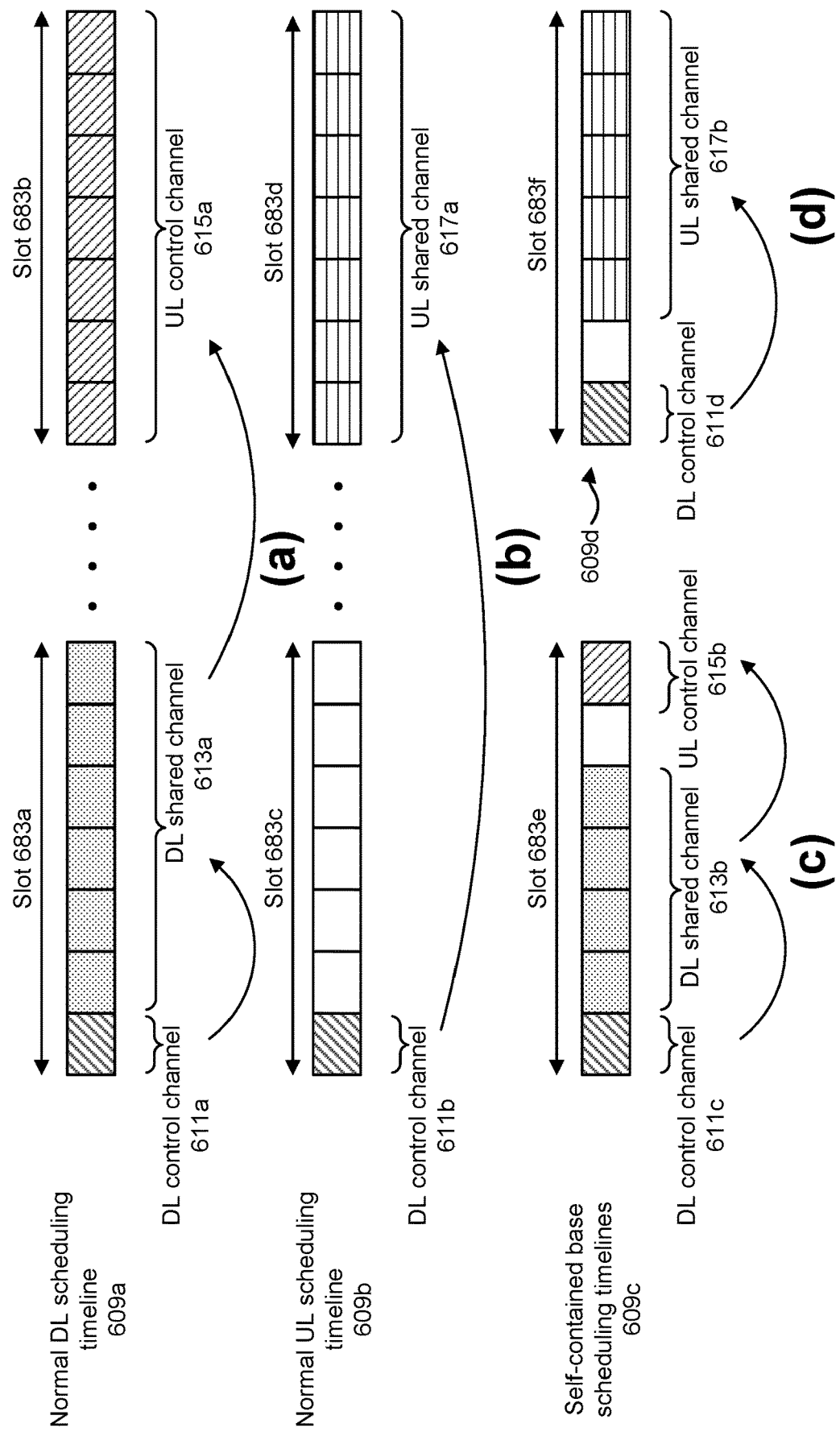
FIG. 6 shows examples of scheduling timelines.

FIG. 6 shows examples of scheduling timelines 609. For a normal DL scheduling timeline 609a, DL control channels are mapped the initial part of a slot 683a. The DL control channels 611 schedule DL shared channels 613a in the same slot 683a. HARQ-ACKs for the DL shared channels 613a (i.e., HARQ-ACKs each of which indicates whether or not transport block in each DL shared channel 613a is detected successfully) are reported via UL control channels 615a in a later slot 683b. In this instance, a given slot 683 may contain either one of DL transmission and UL transmission.

For a normal UL scheduling timeline 609b, DL control channels 611b are mapped the initial part of a slot 683c. The DL control channels 611b schedule UL shared channels 617a in a later slot 683d. For these cases, the association timing (time shift) between the DL slot 683c and the UL slot 683d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 609c, DL control channels 611c are mapped to the initial part of a slot 683e. The DL control channels 611c schedule DL shared channels 613b in the same slot 683e. HARQ-ACKs for the DL shared channels 613b are reported in UL control channels 615b, which are mapped at the ending part of the slot 683e.

For a self-contained base UL scheduling timeline 609d, DL control channels 611d are mapped to the initial part of a slot 683f. The DL control channels 611d schedule UL shared channels 617b in the same slot 683f. For these cases, the slot 683f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 7:
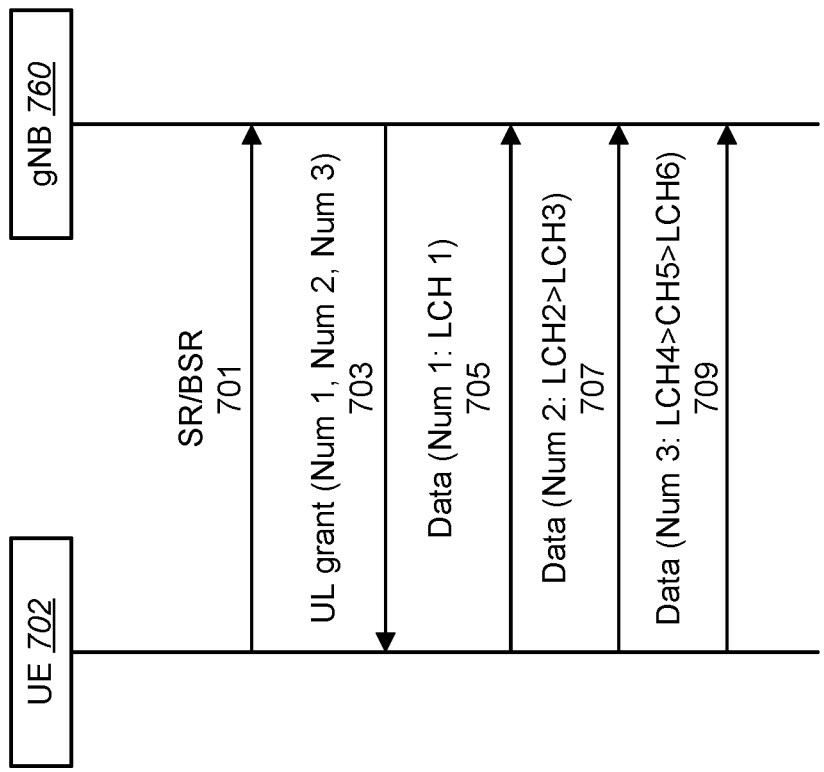
FIG. 7 shows an example of uplink transmission.

FIG. 7 shows an example of uplink transmission. When the UE 702 has new data, the UE 702 may send 701 a scheduling request (SR) and/or BSR to the gNB 760. The eNB 760 may respond to the SR by sending 703 a grant to the UE 702. As mentioned above, the gNB 760 may indicate one or more numerologies 301 for the uplink transmission (e.g., the PUSCH(s) transmission(s)) by using the UL grant(s). Here, in FIG. 7, although the one or more numerologies 301 are indicated by using the UL grant as an example, the gNB 760 may indicate the one or more numerologies 301 according to the descriptions above.

For the uplink transmission, a logical channel prioritization may be applied. For the logical channel prioritization procedure, the UE 102 may take into account a relative priority. In FIG. 7, for example, Logical Channel 1 (LCH1) >Logical Channel 2 (LCH2) may indicate that a priority of the LCH1 is higher than a priority of the LCH2. Namely, a priority of data from the LCH1 is higher than a priority of data from the LCH2. Here, one logical channel may be mapped to one or more numerologies 301.

For example, a case 1 where LCH1 is mapped to a first numerology (Num1), LCH2 and LCH3 are mapped to a second numerology (Num2), and LCH4, LCH5, and LCH6 are mapped to a third numerology (Num3) is explained. In the case 1, if the Num1, the Num2, and the Num3 are indicated, resources (e.g., UL resources, MAC SDU, MAC PDU, UL-SCH, etc.) may be allocated to the logical channel(s). For example, the resources corresponding to each numerology 301 may be allocated to the logical channel(s).

In this example, the resources of the Num1 may be allocated to the LCH1 mapped to the Num1. Also, the resources of the Num2 may be allocated to the LCH2 and/or the LCH3 mapped to the Num2. Here, the logical channel(s) mapped to the same numerology 301 may be prioritized. For example, the logical channel(s) mapped to the same numerology 301 may be prioritized, in advance, by the specification, and known information between the gNB 760 and the UE 702. For example, in a case that a priority of the LCH2 is higher than a priority of the LCH3, the resources may be allocated to the LCH2, and then if the resources remain (e.g., if any resources remain), the resource may be allocated to the LCH3.

In one implementation, the UE 702 may send 705 data corresponding to LCH1 using Num1. The UE 702 may send 707 data corresponding to LCH2 and/or LCH3 using Num2. The UE 702 may send 709 data corresponding to LCH4, LCH5 and/or LCH6 using Num3.

Also, the gNB 760 may configure, (by using the RRC signal, the MIB, and/or the SIB), a priority for the logical channel(s) mapped to the same numerology 301. Namely, the gNB 760 may configure (indicate) which logical channel(s) is prioritized. For example, the gNB 760 may configure that the LCH3 is prioritized over the LCH2 for the logical channel prioritization procedure. In a case that the LCH3 is prioritized over the LCH2, the resources may be allocated to the LCH3, and then if the resources remain, the resources may be allocated to the LCH2.

Also, for the case 1, if the Num1 is indicated (e.g., only the Num1 is indicated), the resource may be allocated to the LCH1, the LCH2, the LCH3, the LCH4, the LCH5, and/or the LCH6. Namely, the resources may be allocated to the LCH1 (i.e., the logical channel(s) mapped to the indicated numerology 301), and then if the resources remain, the resources may be allocated to the LCH2, the LCH3, the LCH4, the LCH5, and/or the LCH6 (i.e., the logical channel(s) not mapped to the indicated numerology 301, the logical channel(s) mapped to the not indicated numerology 301). In other words, a priority of the logical channel(s) mapped to the indicated numerology 301 is higher than a priority of the logical channel(s) not mapped to the indicated numerology 301. And, the logical channel(s) not mapped to the indicated numerology 301 may be allocated the remaining resources.

Here, the gNB 760 may configure, (by using the RRC signal, the MIB, and/or the SIB), a priority for the numerologies 301. Namely, the gNB 760 may configure (indicate) which numerology 301 is prioritized. For example, the gNB 760 may configure that the Num3 is prioritized over the Num2 for the logical channel prioritization procedure. In a case that the Num3 is prioritized over the Num2, the resources may be allocated to LCH4, the LCH5, and the LCH6 (i.e., the logical channel(s) mapped to the Num3), and then if the resources remain, the resources may be allocated to LCH2 and the LCH3 (i.e., the logical channel(s) mapped to the Num2). Here, as above described, the logical channel(s) mapped to the same numerology 301 may be prioritized. Also, as above described, the gNB 760 may configure the priority of the logical channel(s) mapped to the same numerology 301.

Also, for the case 1, if the Num1 is indicated (e.g., only the Num1 is indicated), the resources may be allocated to the LCH1 (i.e., the LCH only). Namely, the resource may be allocated to the logical channel(s) mapped to the indicated numerology 301 only. And, the logical channel(s) not mapped to the indicated numerology 301 may not be allocated the resource (e.g., the remaining resources). Namely, the logical channel(s) mapped to the not indicated numerology 301 may not be allocated the resources. For example, the resources may be allocated to the LCH1, and then if the resources remain, the resources may be allocated to other logical channel(s) except for the LCH2, the LCH3, the LCH4, the LCH5, and the LCH6. A priority of the other logical channel may be lower than a priority of the LCH2, the LCH3, the LCH4, the LCH5, and the LCH6. The other logical channel may include MAC control element(s) for padding (e.g., padding bit(s)).

In a second case (case 2) the LCH1 is mapped to the Num1, the LCH2 is mapped to the Num1 and the Num2, the LCH3 is mapped to the Num1, the Num2 and the Num3, and the LCH4 is mapped to the Num2, the LCH5 is mapped to the Num2 and the Num3, and LCH6 is mapped to the Num2, the Num3 and the Num1.

For the case 2, if the Num1 is indicated (e.g., only the Num1 is indicated), the resource may be allocated to the LCH1, the LCH2, the LCH3, the LCH4, the LCH5, and/or the LCH6. Namely, the resources may be allocated to the LCH1 (i.e., the logical channel(s) mapped to the indicated numerology 301), and then if the resources remain, the resources may be allocated to the LCH2, and then if the resources remain, the resources may be allocated to the LCH3 and/or the LCH6, and then if the resources remain, the resources may be allocated to the LCH4 and/or the LCH5 (i.e., the logical channel(s) not mapped to the indicated numerology 301).

In this case, a priority of the logical channel(s) mapped to the single numerology may be higher than a priority of the logical channel(s) mapped to the multiple numerologies 301. A priority of the logical channel(s) mapped to the indicated single numerology 301 may be higher than a priority of the logical channel(s) mapped to the multiple numerologies 301 including the indicated numerology 301. Here, a priority of the logical channel(s) mapped to the smaller number of numerologies 301 (e.g., the logical channel(s) mapped to two kinds of numerologies 301 (e.g., the Num2 and the Num3)) may be higher than a priority of the logical channel(s) mapped to the larger number of numerologies 301 (e.g., the logical channel(s) mapped to three kinds of numerologies (e.g., the Num1, the Num2, and the Num3)).

Here, the combination of above description is not precluded. For example, for the case 2, if the Num1, the Num2, and the Num3 are indicated (e.g., multiple PUSCHs transmission in the same/different timing), the combination of above description may be applied for the resources corresponding to each PUSCH transmission (e.g., the PUSCH of the Num1, the PUSCH of Num2, and the PUSCH of Num3). Namely, the logical channel prioritization may be applied to each transmission (e.g., each new transmission) with the same and/or different numerology 301. Also, the logical channel prioritization may be applied when each transmission (e.g., each new transmission) with the same and/or different numerology 301 is performed.

For example, for the case 2, if the Num1, the Num2, and the Num3 are indicated, the resources corresponding to the PUSCH of the Num1 may be allocated to the LCH1, the LCH2, the LCH3, the LCH4, the LCH5, and/or the LCH6. A priority of the LCH1 mapped to the indicated single numerology may be higher than a priority of the LCH2 mapped to the multiple numerologies 301 including the indicated numerology 301. Also, the priority of the LCH2 mapped to the smaller number of numerologies 301 including the indicated numerology 301 may be higher than a priority of the LCH3 and the LCH6 mapped to the larger number of numerologies 301 including the indicated numerologies 301. Also, the priority of the LCH3 and the LCH6 mapped to the indicated numerology 301 (i.e., multiple numerologies 301 including the indicated numerology 301) may be higher than a priority of the LCH4 not mapped to the indicated numerology 301. Also, the priority of the LCH4 mapped to the single numerology 301 may be higher priority of the LCH5 mapped to the multiple numerologies 301. Therefore, for the transmission of Num1 (i.e., the transmission on the PUSCH of Num1), the priority may be ordered as the LCH1> the LCH2> the LCH3, and the LCH6> the LCH4> the LCH5.

Also, for example, for the case 2, if the Num1, the Num2, and the Num3 are indicated, the resources corresponding to the PUSCH of the Num2 may be allocated to the LCH1, the LCH2, the LCH3, the LCH4, the LCH5, and/or the LCH6. For example, a priority of the LCH4 mapped to the indicated single numerology 301 may be higher than a priority of the LCH2 and the LCH5 mapped to the multiple numerologies 301 including the indicated numerology 301. Also, the priority of the LCH2 and the LCH5 mapped to the smaller number of numerologies 301 including the indicated numerology 301 may be higher than a priority of the LCH3 and the LCH6 mapped to the larger number of numerologies 301 including the indicated numerologies 301. Also, the priority of the LCH3 and the LCH6 mapped to the indicated numerology 301 (i.e., multiple numerologies 301 including the indicated numerology 301) may be higher than a priority of the LCH1 not mapped to the indicated numerology 301. Therefore, for the transmission of Num2 (i.e., the transmission on the PUSCH of Num2), the priority may be ordered as the LCH4> the LCH2, the LCH5> the LCH3, and the LCH6> the LCH1.

Also, for example, for the case 2, if the Num1, the Num2, and the Num3 are indicated, the resources corresponding to the PUSCH of the Num3 may be allocated to the LCH1, the LCH2, the LCH3, the LCH4, the LCH5, and/or the LCH6. For example, a priority of the LCH5 mapped to the smaller number of numerologies 301 including the indicated numerology 301 may be higher than a priority of the LCH3 and the LCH6 mapped to the larger number of numerologies 301 including the indicated numerologies 301. Also, the LCH3 and the LCH6 mapped to the indicated numerology 301 (i.e., multiple numerologies 301 including the indicated numerology 301) may be higher than a priority of the LCH1 and the LCH4 not mapped to the indicated numerology 301. Also, the priority of the LCH1 and the LCH4 mapped to the smaller number of numerologies 301 may be higher than a the larger number of numerologies 301. Therefore, for the transmission of Num3 (i.e., the transmission on the PUSCH of Num3), the priority may be ordered as the LCH5> the LCH3, the LCH6> the LCH1, and the LCH4> the LCH2.

Figure 8:
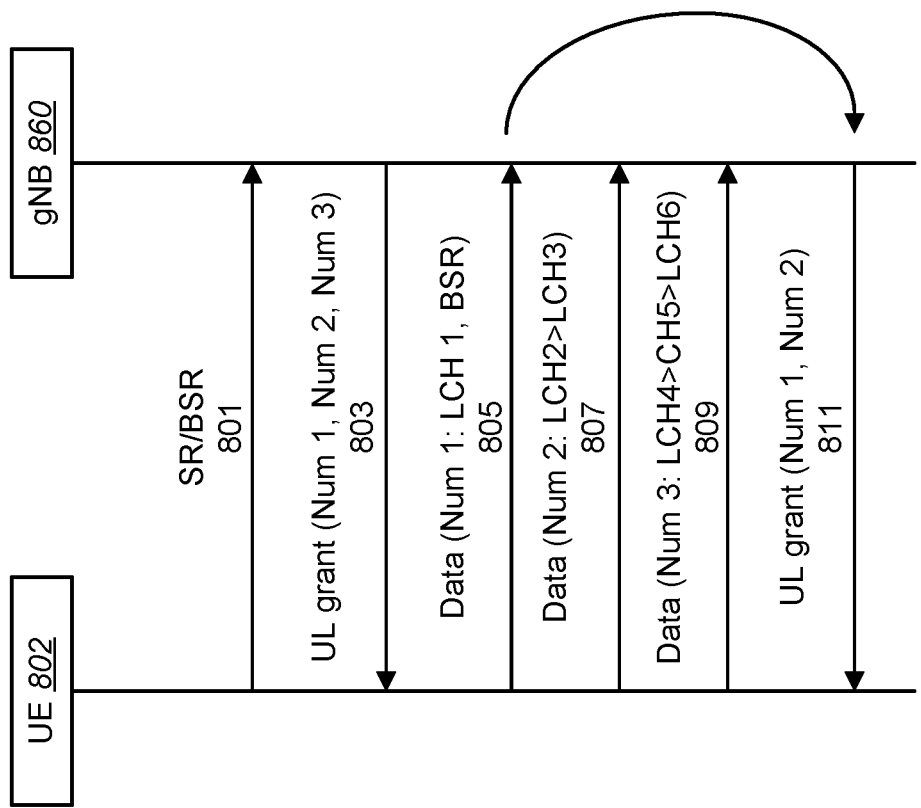
FIG. 8 shows another example of uplink transmission.

FIG. 8 shows another example of uplink transmission. When the UE 802 has new data, the UE 802 may send 801 a scheduling request (SR) and/or BSR to the gNB 860. The eNB 860 may respond to the SR by sending 803 a grant to the UE 802. As mentioned above, the gNB 860 may indicate one or more numerologies 301 for the uplink transmission (e.g., the PUSCH(s) transmission(s)) by using the UL grant(s). Here, in FIG. 8, although the one or more numerologies 301 are indicated by using the UL grant as an example, the gNB 860 may indicate the one or more numerologies 301 according to the descriptions above.

For the uplink transmission, a logical channel prioritization may be applied. For the logical channel prioritization procedure, the UE 102 may take into account a relative priority. In FIG. 8, for example, Logical Channel 1 (LCH1) >Logical Channel 2 (LCH2) may indicate that a priority of the LCH1 is higher than a priority of the LCH2. Namely, a priority of data from the LCH1 is higher than a priority of data from the LCH2. Here, one logical channel may be mapped to one or more numerologies 301.

In one implementation, the UE 802 may send 805 data corresponding to LCH1 using Num1. The UE 802 may send 807 data corresponding to LCH2 and/or LCH3 using Num2. The UE 802 may send 809 data corresponding to LCH4, LCH5 and/or LCH6 using Num3.

In this example, when the UE 802 sends 805 data on LCH1 using Num1, the UE 802 may include a BSR. In response, the gNB 860 may send 811 an UL grant that indicates Num1 and Num2.

It should be noted that the cases and procedures described in connection with FIG. 7 may be implemented in accordance with FIG. 8.

FIG. 9 is an example illustrating a contention-based random access procedure. A UE 902 may communicate with a gNB 960. The contention-based random access procedures may include the following steps.

A first step (1) includes a random access preamble on RACH in uplink. There are two possible groups defined and one is optional. If both groups are configured, the size of message 3 and the pathloss are used to determine which group a preamble is selected from. The group to which a preamble belongs provides an indication of the size of the message 3 and a radio conditions at the UE 902. The preamble group information along with the necessary thresholds are broadcast on system information.

A second step (2) includes a random access response generated by MAC on DL-SCH. This step is semi-synchronous (within a flexible window of which the size is one or more TTI) with message 1. In this case, there is no HARQ. The random access response may be addressed to RA-RNTI on PDCCH. The random access response conveys at least RA-preamble identifier, timing alignment information for the pTAG, initial UL grant and assignment of Temporary C-RNTI (which may or may not be made permanent upon contention resolution). The random access response may be intended for a variable number of UEs in one DL-SCH message.

A third step (3) includes a first scheduled UL transmission on UL-SCH. The scheduled transmission uses HARQ. The size of the transport blocks depends on the UL grant conveyed in step 2. For initial access, the scheduled transmission conveys the RRC connection request generated by the RRC layer and transmitted via Common Control Channel (CCCH). The scheduled transmission conveys at least NAS UE identifier but no NAS message. A radio Link Control (RLC) Transparent Mode (TM) has no segmentation.

For an RRC Connection Re-establishment procedure, the scheduled transmission conveys the RRC connection re-establishment request generated by the RRC layer and transmitted via CCCH. The RLC TM has no segmentation. The scheduled transmission does not contain any NAS message.

After handover, in the target cell, the scheduled transmission conveys the ciphered and integrity protected RRC Handover Confirm generated by the RRC layer and transmitted via Dedicated Control Channel (DCCH). The scheduled transmission conveys the C-RNTI of the UE (which was allocated via the Handover Command). The scheduled transmission includes an uplink Buffer Status Report when possible.

For other events, the scheduled transmission conveys at least the C-RNTI of the UE.

For NB-IoT, in the procedure to resume the RRC connection, the scheduled transmission conveys a Resume ID to resume the RRC connection. In the procedure to setup the RRC connection, an indication of the amount of data for subsequent transmission(s) on Signaling Radio Bearer (SRB) or Data Radio Bearer (DRB) can be indicated. A fourth step (4) includes contention resolution on DL.

Figure 10:
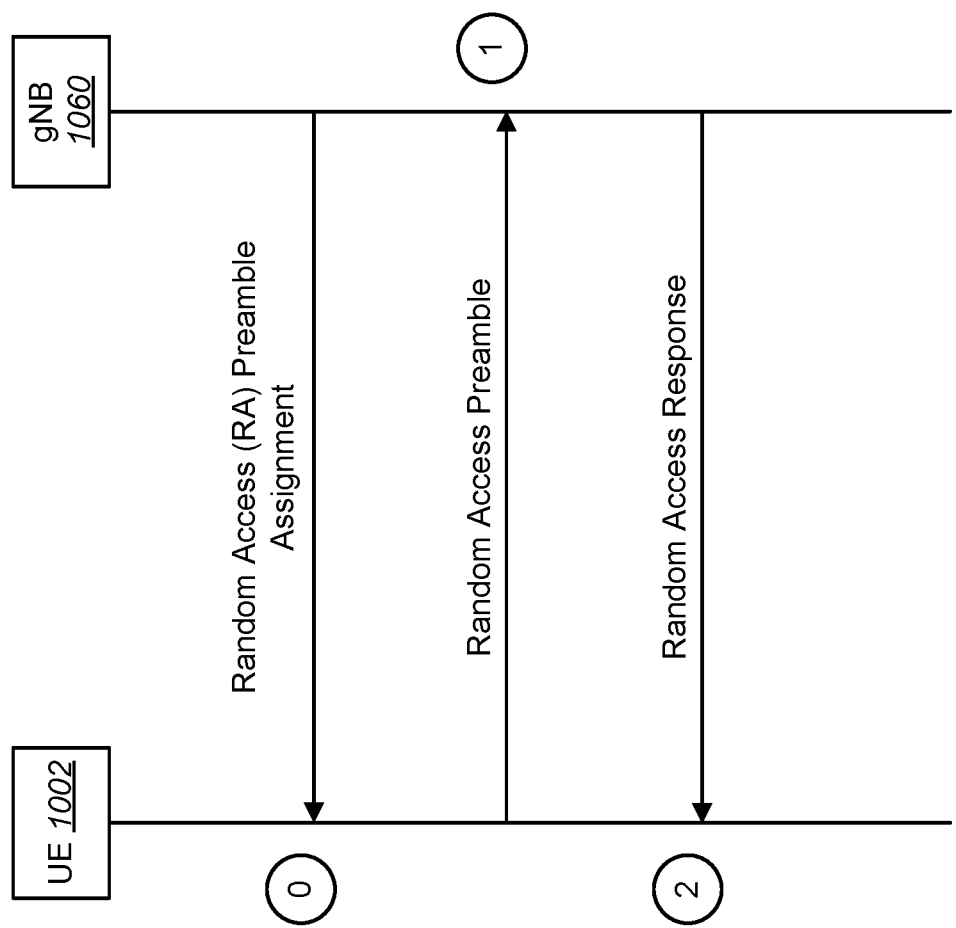
FIG. 10 is an example illustrating a non-contention-based random access procedure.

FIG. 10 is an example illustrating a non-contention-based random access procedure. A UE 1002 may communicate with a gNB 1060. The non-contention-based random access procedures may include the following steps.

A first step (0) is a random access preamble assignment via dedicated signaling in DL. The gNB 1060 assigns to the UE 1002 a non-contention Random Access Preamble (a Random Access Preamble not within the set sent in broadcast signaling). The random access preamble may be signaled via one or more of (a) a HO command generated by a target gNB 1060 and sent via a source gNB 1060 for handover; (b) PDCCH in case of DL data arrival or positioning; (c) PDCCH for initial UL time alignment for a sTAG.

A second step (1) is a random access preamble on RACH in uplink. The UE 1002 may transmit the assigned non-contention random access preamble.

A third step (2) is a random access response on DownLink Shared Channel (DL-SCH). This may be semi-synchronous (within a flexible window of which the size is two or more TTIs) with message 1. There may be no HARQ. The random access response may be addressed to RA-RNTI on PDCCH. The random access response may convey at least (a) timing alignment information and initial UL grant for handover; (b) timing alignment information for DL data arrival; (c) a RA-preamble identifier; (d) intended for one or multiple UEs 1002 in one DL-SCH message.

Figure 11:
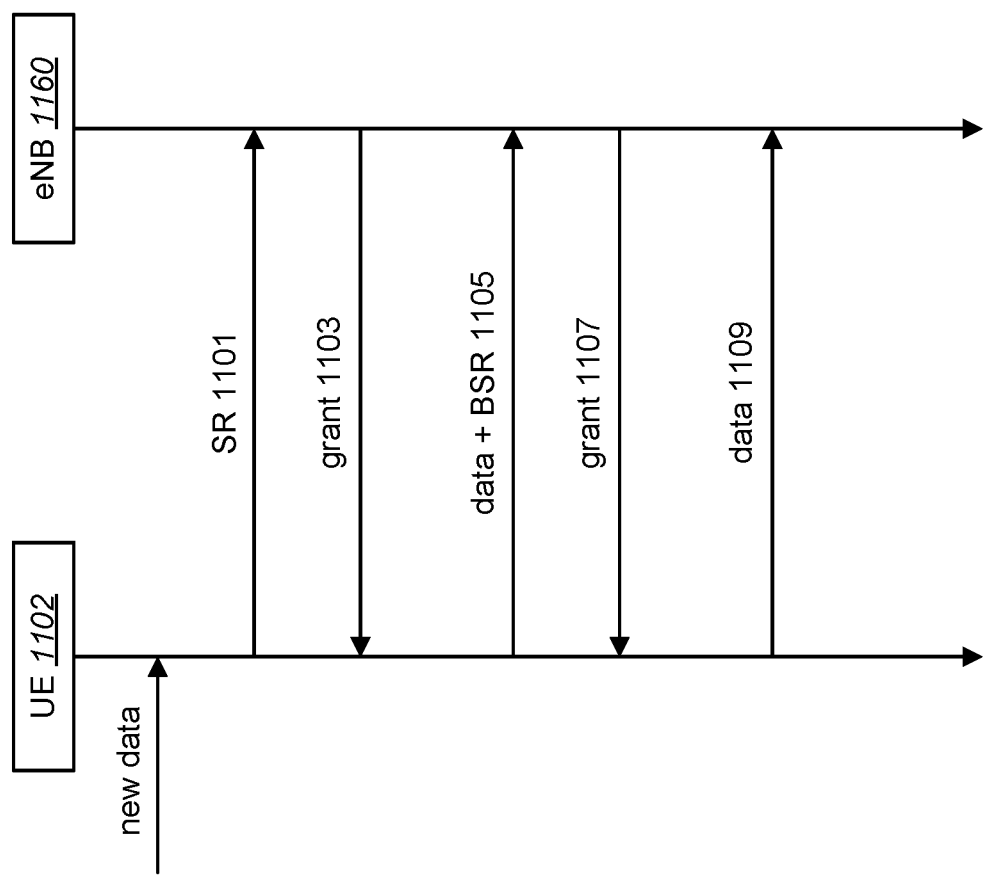
FIG. 11 is a call flow diagram illustrating a scheduling procedure for dynamic scheduling in LTE.

FIG. 11 is a call flow diagram illustrating a scheduling procedure for dynamic scheduling in LTE. When the UE 1102 has new data, the UE 1102 may send 1101 a scheduling request (SR) to the eNB 1160. The eNB 1160 may respond to the SR by sending 1103 a grant to the UE 1102. The eNB 1160 provides a default UL grant which is used by the UE 1102 to transmit 1105 the data and/or BSR.

In response to the BSR, the eNB 1160 sends 1107 another grant. The UE 1102 then sends 1109 the remaining data to the eNB 1160.

A BSR indicates buffer size for each LCG. However, the BSR requires a grant for transmission so it may take a longer time until the eNB 1160 receives it, since it is preceded by an SR. It may be the case that the provided grant is enough to transmit all data. However, as seen in FIG. 11, it is also likely that a grant is not enough and the UE 1102 has to request another grant using BSR. The consequence of this process is additional delay for the case when UE 1102 would have been able to transmit all data, had the first UL grant been little bit larger.

As shown in FIG. 11, the complex signaling interaction procedure of SR-UL grant-BSR-UL grant-Data results in latency, processing and signaling overhead. The usages of SR and BSR are limited which cannot provide a better QoS for diverse services in NR.

In an implementation, a logical channel prioritization procedure may be applied when a new transmission is performed. RRC controls the scheduling of uplink data by signaling the following for each logical channel: priority where an increasing priority value indicates a lower priority level, a prioritisedBitRate which sets the Prioritized Bit Rate (PBR), bucketSizeDuration which sets the Bucket Size Duration (BSD). For NB-IoT, prioritisedBitRate, bucketSizeDuration and the corresponding steps of the Logical Channel Prioritization procedure (i.e., Step 1 and Step 2 below) are not applicable.

The MAC entity may maintain a variable Bj for each logical channel j. Bj may be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it may be set to the bucket size. The bucket size of a logical channel is equal to PBR×BSD, where PBR and BSD are configured by upper layers.

The MAC entity may perform the following Logical Channel Prioritization procedure when a new transmission is performed. The MAC entity may allocate resources to the logical channels in the following three steps. In a first step (Step 1), all the logical channels with Bj>0 are allocated resources in a decreasing priority order. If the PBR of a logical channel is set to "infinity", the MAC entity may allocate resources for all the data that is available for transmission on the logical channel before meeting the PBR of the lower priority logical channel(s). In a second step (Step 2), the MAC entity may decrement Bj by the total size of MAC SDUs served to logical channel j in Step 1. It should be noted that the value of Bj can be negative. In a third step (Step 3), if any resources remain, all the logical channels are served in a strict decreasing priority order (regardless of the value of Bj) until either the data for that logical channel or the UL grant is exhausted, whichever comes first. Logical channels configured with equal priority should be served equally.

The UE 1102 may also follow the rules below during the scheduling procedures above. The UE 1102 should not segment an RLC SDU (or partially transmitted SDU or retransmitted RLC PDU) if the whole SDU (or partially transmitted SDU or retransmitted RLC PDU) fits into the remaining resources of the associated MAC entity. If the UE 1102 segments an RLC SDU from the logical channel, it may maximize the size of the segment to fill the grant of the associated MAC entity as much as possible. The UE 102 may maximize the transmission of data. If the MAC entity is given an UL grant size that is equal to or larger than 4 bytes while having data available for transmission, the MAC entity may not transmit only padding BSR and/or padding (unless the UL grant size is less than 7 bytes and an AMD PDU segment needs to be transmitted). For transmissions on serving cells operating according to Frame Structure Type 3, the MAC entity may only consider logical channels for which laa-Allowed has been configured.

The MAC entity may not transmit data for a logical channel corresponding to a radio bearer that is suspended. If the MAC PDU includes only the MAC control element (CE) for padding BSR or periodic BSR with zero MAC SDUs and there is no aperiodic CSI requested for this TTI, the MAC entity may not generate a MAC PDU for the HARQ entity in the following cases: (1) in a case that the MAC entity is configured with skipUplinkTxDynamic and the grant indicated to the HARQ entity was addressed to a C-RNTI; or (2) in a case that the MAC entity is configured with skipUplinkTxSPS and the grant indicated to the HARQ entity is a configured uplink grant.

For the logical channel prioritization procedure, the MAC entity may take into account the following relative priority in decreasing order: MAC control element for C-RNTI or data from UL-CCCH; MAC control element for Semi-Persistent Scheduling (SPS) confirmation; MAC control element for BSR, with exception of BSR included for padding; MAC control element for Power Headroom Report (PHR), Extended PHR, or Dual Connectivity PHR; MAC control element for Sidelink BSR, with exception of Sidelink BSR included for padding; data from any Logical Channel, except data from UL-CCCH; MAC control element for BSR included for padding; and/or MAC control element for Sidelink BSR included for padding.

It should be noted that when the MAC entity is requested to transmit multiple MAC PDUs in one TTI, Steps 1 to 3 and the associated rules may be applied either to each grant independently or to the sum of the capacities of the grants. Also the order in which the grants are processed may be left up to UE implementation. It is up to the UE implementation to decide in which MAC PDU a MAC control element is included when MAC entity is requested to transmit multiple MAC PDUs in one TTI. When the UE 1102 is requested to generate MAC PDU(s) in two MAC entities in one TTI, it is up to UE implementation in which order the grants are processed.

In an implementation, the MAC entity may multiplex MAC control elements and MAC SDUs in a MAC PDU.

FIG. 12 is an example of medium access control (MAC) Protocol Data Unit (PDU). The MAC PDU includes a MAC header, zero or more MAC control elements, zero or more MAC Service Data Units (SDUs) and optionally padding. Both the MAC header and the MAC SDUs may be of variable sizes. A MAC PDU header may include one or more MAC PDU subheaders. Both the MAC header and the MAC SDUs may be of variable sizes.

A MAC PDU header may include one or more MAC PDU subheaders. Each subheader may correspond to either a MAC SDU, a MAC control element or padding.

FIG. 13 illustrates examples of MAC PDU subheaders. A first example (a) illustrates an R/F2/E/LCID/F/L MAC subheader with a 7-bits L field. A second example (b) illustrates an R/F2/E/LCID/F/L MAC subheader with a 15-bits L field. A third example (c) illustrates an R/F2/E/LCID/L MAC subheader with a 16-bits L field. A fourth example (d) illustrates an R/F2/E/LCID MAC subheader.

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per Transport Block (TB) per MAC entity. A maximum of one Multicast Channel (MCH) MAC PDU can be transmitted per TTI.

In FIG. 13, LCID is the Logical Channel ID field that identifies the logical channel instance of the corresponding MAC SDU or the type of the corresponding MAC control element or padding for the DL-SCH, UL-SCH and MCH respectively. There may be one LCID field for each MAC SDU, MAC control element or padding included in the MAC PDU. In addition to that, one or two additional LCID fields may be included in the MAC PDU, when single-byte or two-byte padding is required but cannot be achieved by padding at the end of the MAC PDU. A UE 102 of Category 0 may indicate CCCH using LCID "01011", otherwise the UE 102 may indicate CCCH using LCID "00000". The LCID field size is 5 bits.

The Length (L) field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field and F2 field.

The Format (F) field indicates the size of the Length field. There is one F field per MAC PDU subheader except for the last subheader and subheaders corresponding to fixed-sized MAC control elements and except for when F2 is set to 1. The size of the F field is 1 bit. If the F field is included, and if the size of the MAC SDU or variable-sized MAC control element is less than 128 bytes, the value of the F field is set to 0, otherwise it is set to 1.

The Format2 (F2) field indicates the size of the Length field. There is one F2 field per MAC PDU subheader. The size of the F2 field is 1 bit. If the size of the MAC SDU or variable-sized MAC control element is larger than 32767 bytes, and if the corresponding subheader is not the last subheader, the value of the F2 field is set to 1, otherwise it is set to 0.

The Extension (E) field is a flag indicating if more fields are present in the MAC header or not. The E field is set to "1" to indicate another set of at least R/F2/E/LCID fields. The E field is set to "0" to indicate that either a MAC SDU, a MAC control element or padding starts at the next byte.

The Reserved (R) bit may be set to "0".

FIG. 14 is an example of mapping between logical channels and numerologies 301. A UE 1402 may be in communication with a gNB 1460. FIG. 14 depicts a possible mapping between the logical channels and the numerologies 301. In this example logical channel-1 (LCH1), logical channel-2 (LCH2) and logical channel-3 (LCH3) are mapped to numerology 1 in a decreasing priority order. Logical channel-4 (LCH4), logical channel-5 (LCH5) and logical channel-6 (LCH6) are mapped to numerology 2 in a decreasing priority order.

When the UE 1402 has new data, the UE 1402 may send 1401 a scheduling request (SR) and/or BSR to the gNB 1460. The eNB 1460 may respond to the SR by sending 1403 a UL grant to the UE 1402. In this case, the grant includes numerology 1. The UE 1402 may transmit 1405 on LCH1, LCH2, or LCH3 using numerology 1.

The gNB 1460 may send 1407 a second UL grant that includes numerology 2. The UE 1402 may then transmit 1409 on LCH4, LCH5, or LCH6 using numerology 2.

FIG. 15 illustrates examples of numerology-specific logical channel priority handling. FIG. 15 illustrates two alternatives of numerology-specific logical channel priority handling rules, where each logical channel is configured to be associated with both numerology 1 and numerology 2.

In example (a), a similar LCP procedure as in LTE can be applied. For each numerology 301, the UE 1502a first allocates the resource to each logical channel to satisfy the PBR in a decreasing order of priority and then allocates the remaining resource for the remaining data associated with each logical channel in order of priority.

The UE 1502a may send 1501 a scheduling request (SR) and/or BSR to the gNB 1560. The eNB 1560a may respond to the SR by sending 1503 a UL grant to the UE 1502a. In this case, the grant includes numerology 1, which has a logical channel priority of LCH1>LCH2>LCH3>LCH4>LCH5>LCH6. The UE 1502a may transmit 1505 data using numerology 1 according to the logical channel priority.

The eNB 1560a may send 1507 a UL grant to the UE 1502a. In this case, the grant includes numerology 2, which has a logical channel priority of LCH4>LCH5>LCH6>LCH1>LCH2>LCH3. The UE 1502a may transmit 1509 data using numerology 2 according to the logical channel priority.

In example (b), a primary and a secondary logical channel group is defined for each numerology. For numerology 1, the primary logical channel group contains logical channel LCH1-LCH3, and the secondary logical channel group contains logical channels LCH4-LCH6. With this hierarchical logical channel grouping stem, logical channels LCH4-LCH6 can only be served on numerology 1 if the data of the logical channels LCH1-LCH3 have been exhausted. The same procedure applies to the LCP procedure on numerology 2, where the logical channels LCH1-LCH3 which belongs to the secondary logical channel group of numerology 2 are de-prioritized and are prohibited to use a radio resource if the logical channels LCH4-LCH6 which belongs to the primary logical channel group of numerology 2 still have data to transmit.

The UE 1502b may send 1511 a scheduling request (SR) and/or BSR to the gNB 1560. The eNB 1560b may respond to the SR by sending 1513 a UL grant to the UE 1502b. In this case, the grant includes numerology 1, which has a logical channel priority of LCH1>LCH2>LCH3 in the primary logical channel group and LCH4>LCH5>LCH6 in the secondary logical channel group. The UE 1502b may transmit 1515 data using numerology 1 according to the logical channel priority.

The eNB 1560b may send 1517 a UL grant to the UE 1502b. In this case, the grant includes numerology 2, which has a logical channel priority of LCH4>LCH5>LCH6 in the primary logical channel group and LCH1>LCH2>LCH3 in the secondary logical channel group. The UE 1502b may transmit 1519 data using numerology 2 according to the logical channel priority.

The second alternative implies that different logical channels are treated in different steps of the LCP procedure. The benefit of the second alternative is to avoid eMBB data occupies the short TTI resource before all the URLLC data has been served. It also implies that URLLC data has opportunities for transmission on the long TTI resource if the short TTI resource is not allocated or not adequate in this TTI. Compared with the first alternative, the second alternative is more efficient at differentiating handling of logical channels based on the property of the numerology.

FIG. 16 is an example illustrating a sidelink Buffer Status Report (BSR) format in LTE. In LTE sidelink operation, each sidelink logical channel group is defined per ProSe destination. A ProSe destination with highest priority is selected for UL scheduling by the network. Therefore, the sidelink BSR format is different than that of the LTE legacy BSR format.

Figure 17:
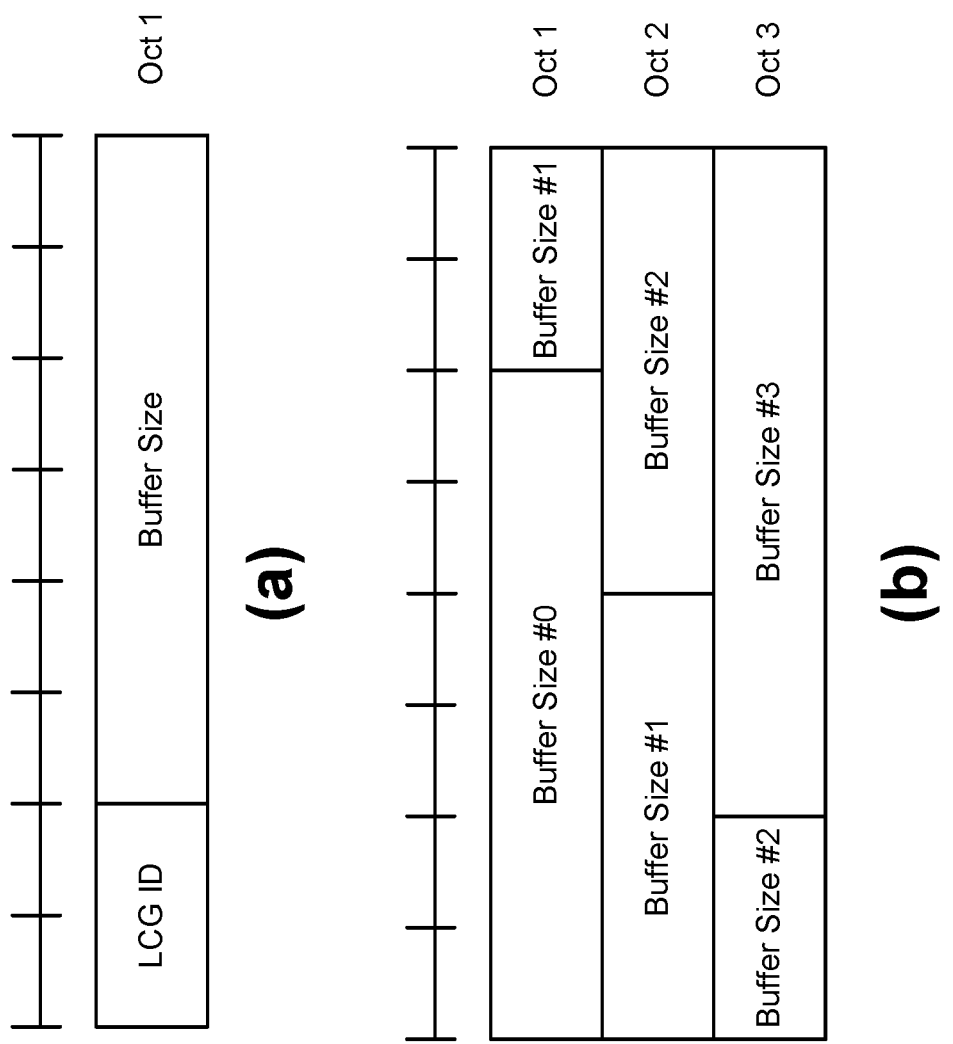
FIG. 17 illustrates Buffer Status Report (BSR) MAC control elements.

FIG. 17 illustrates Buffer Status Report (BSR) MAC control elements. A first example (a) illustrates a short BSR and truncated BSR MAC control element. A second example (b) illustrates a long BSR MAC control element.

Figure 18:
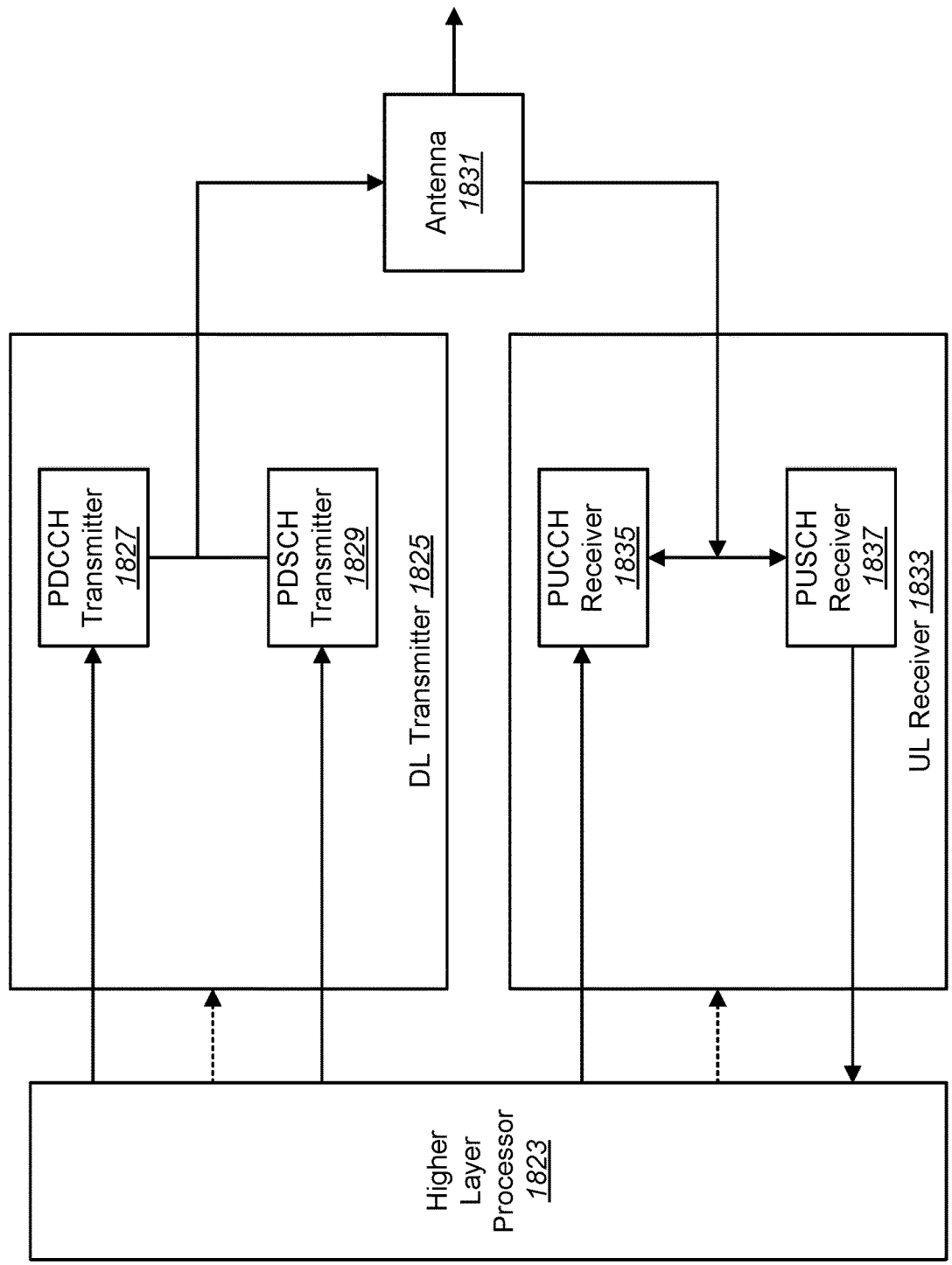
FIG. 18 is a block diagram illustrating one implementation of a gNB.

FIG. 18 is a block diagram illustrating one implementation of a gNB 1860. The gNB 1860 may include a higher layer processor 1823, a DL transmitter 1825, a UL receiver 1833, and one or more antenna 1831. The DL transmitter 1825 may include a PDCCH transmitter 1827 and a PDSCH transmitter 1829. The UL receiver 1833 may include a PUCCH receiver 1835 and a PUSCH receiver 1837.

The higher layer processor 1823 may manage physical layer's behaviors (the DL transmitter's and the UL receiver's behaviors) and provide higher layer parameters to the physical layer. The higher layer processor 1823 may obtain transport blocks from the physical layer. The higher layer processor 1823 may send/acquire higher layer messages such as an RRC message and MAC message to/from a UE's higher layer. The higher layer processor 1823 may provide the PDSCH transmitter transport blocks and provide the PDCCH transmitter transmission parameters related to the transport blocks.

The DL transmitter 1825 may multiplex downlink physical channels and downlink physical signals (including reservation signal) and transmit them via transmission antennas 1831. The UL receiver 1833 may receive multiplexed uplink physical channels and uplink physical signals via receiving antennas 1831 and de-multiplex them. The PUCCH receiver 1835 may provide the higher layer processor 1823 Uplink Control Information (UCI). The PUSCH receiver 1837 may provide the higher layer processor 1823 received transport blocks.

Figure 19:
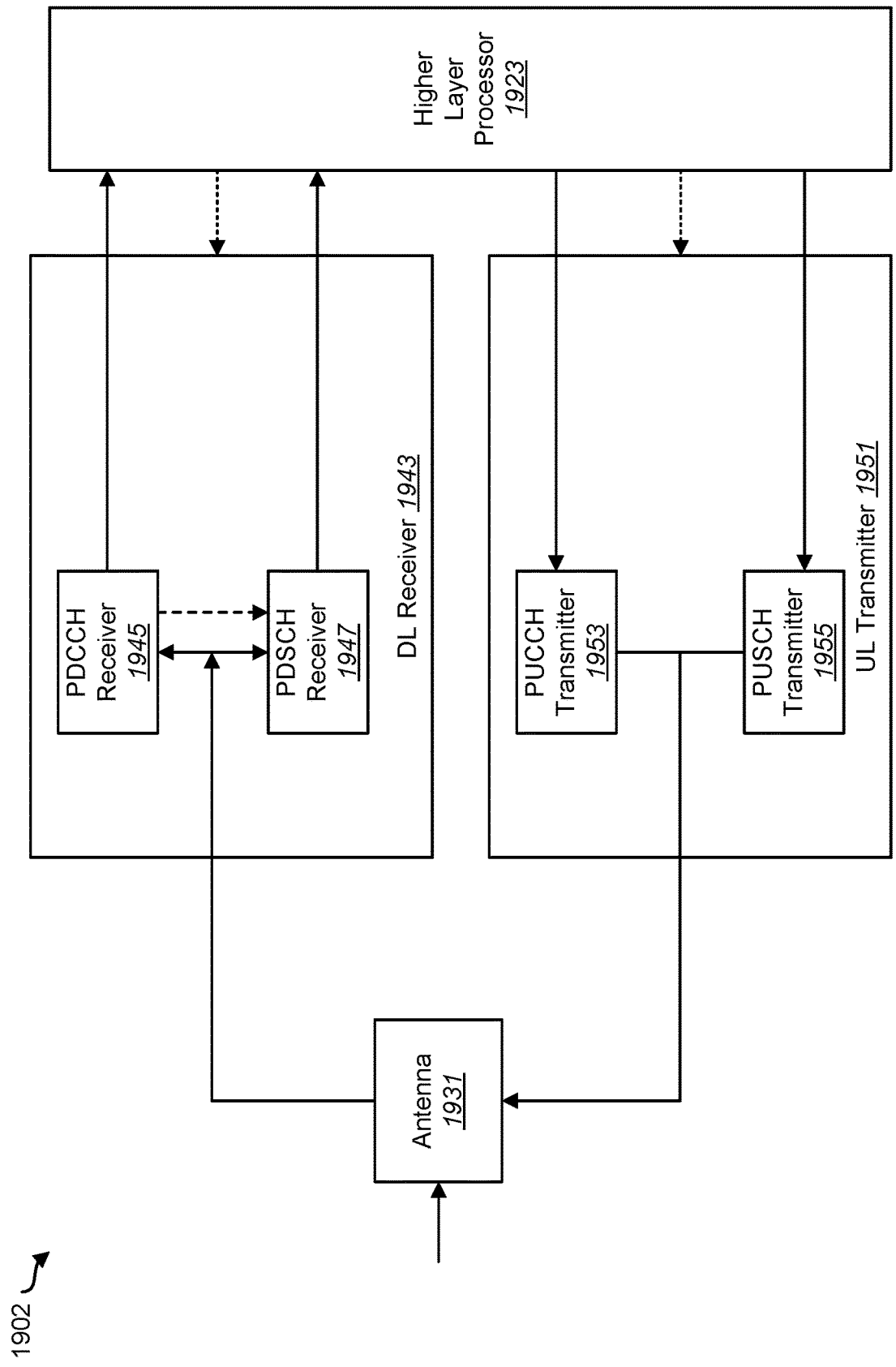
FIG. 19 is a block diagram illustrating one implementation of a UE.

FIG. 19 is a block diagram illustrating one implementation of a UE 1902. The UE 1902 may include a higher layer processor 1923, a UL transmitter 1951, a DL receiver 1943, and one or more antenna 1931. The UL transmitter 1951 may include a PUCCH transmitter 1953 and a PUSCH transmitter 1955. The DL receiver 1943 may include a PDCCH receiver 1945 and a PDSCH receiver 1947.

The higher layer processor 1923 may manage physical layer's behaviors (the UL transmitter's and the DL receiver's behaviors) and provide higher layer parameters to the physical layer. The higher layer processor 1923 may obtain transport blocks from the physical layer. The higher layer processor 1923 may send/acquire higher layer messages such as an RRC message and MAC message to/from a UE's higher layer. The higher layer processor 1923 may provide the PUSCH transmitter transport blocks and provide the PUCCH transmitter 1953 UCI.

The DL receiver 1943 may receive multiplexed downlink physical channels and downlink physical signals via receiving antennas 1931 and de-multiplex them. The PDCCH receiver 1945 may provide the higher layer processor 1923 DCI. The PDSCH receiver 1947 may provide the higher layer processor 1923 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 20:
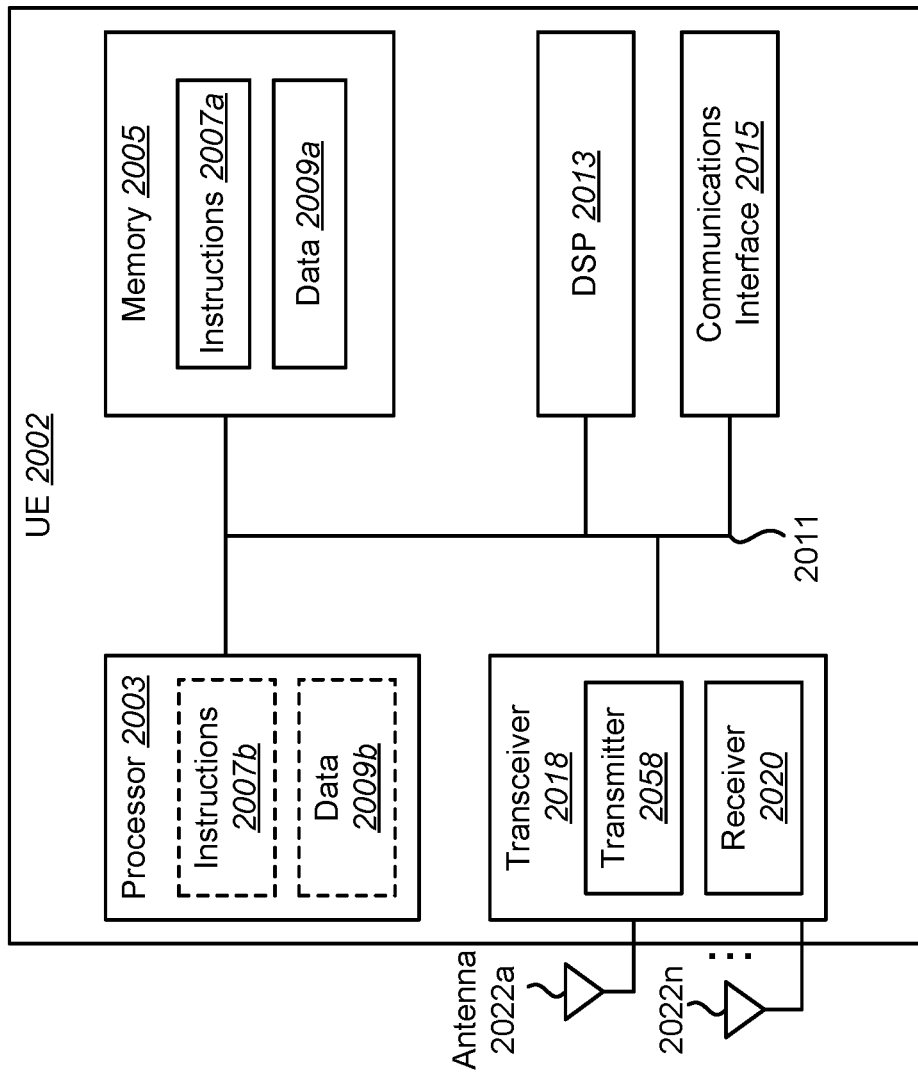
FIG. 20 illustrates various components that may be utilized in a UE.

FIG. 20 illustrates various components that may be utilized in a UE 2002. The UE 2002 described in connection with FIG. 20 may be implemented in accordance with the UE 102 described in connection with FIG. 1. The UE 2002 includes a processor 2003 that controls operation of the UE 2002. The processor 2003 may also be referred to as a central processing unit (CPU). Memory 2005, which may include read-only memory (ROM), random access memory (RAM), a combination of the two or any type of device that may store information, provides instructions 2007a and data 2009a to the processor 2003. A portion of the memory 2005 may also include non-volatile random access memory (NVRAM). Instructions 2007b and data 2009b may also reside in the processor 2003. Instructions 2007b and/or data 2009b loaded into the processor 2003 may also include instructions 2007a and/or data 2009a from memory 2005 that were loaded for execution or processing by the processor 2003. The instructions 2007b may be executed by the processor 2003 to implement the methods described above.

The UE 2002 may also include a housing that contains one or more transmitters 2058 and one or more receivers 2020 to allow transmission and reception of data. The transmitter(s) 2058 and receiver(s) 2020 may be combined into one or more transceivers 2018. One or more antennas 2022a-n are attached to the housing and electrically coupled to the transceiver 2018.

The various components of the UE 2002 are coupled together by a bus system 2011, which may include a power bus, a control signal bus and a status signal bus, in addition to a data bus. However, for the sake of clarity, the various buses are illustrated in FIG. 20 as the bus system 2011. The UE 2002 may also include a digital signal processor (DSP) 2013 for use in processing signals. The UE 2002 may also include a communications interface 2015 that provides user access to the functions of the UE 2002. The UE 2002 illustrated in FIG. 20 is a functional block diagram rather than a listing of specific components.

Figure 21:
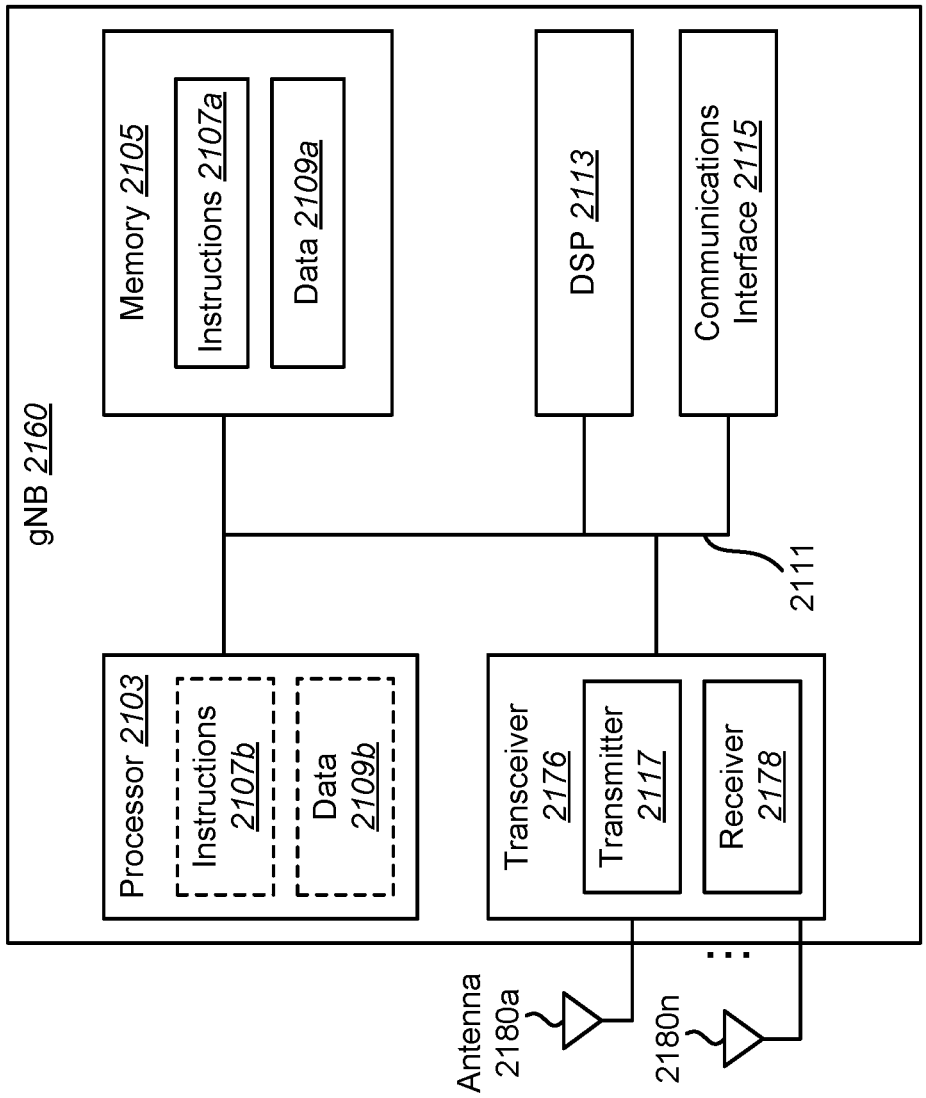
FIG. 21 illustrates various components that may be utilized in a gNB.

FIG. 21 illustrates various components that may be utilized in a gNB 2160. The gNB 2160 described in connection with FIG. 21 may be implemented in accordance with the gNB 160 described in connection with FIG. 1. The gNB 2160 includes a processor 2103 that controls operation of the gNB 2160. The processor 2103 may also be referred to as a central processing unit (CPU). Memory 2105, which may include read-only memory (ROM), random access memory (RAM), a combination of the two or any type of device that may store information, provides instructions 2107a and data 2109a to the processor 2103. A portion of the memory 2105 may also include non-volatile random access memory (NVRAM). Instructions 2107b and data 2109b may also reside in the processor 2103. Instructions 2107b and/or data 2109b loaded into the processor 2103 may also include instructions 2107a and/or data 2109a from memory 2105 that were loaded for execution or processing by the processor 2103. The instructions 2107b may be executed by the processor 2103 to implement the methods described above.

The gNB 2160 may also include a housing that contains one or more transmitters 2117 and one or more receivers 2178 to allow transmission and reception of data. The transmitter(s) 2117 and receiver(s) 2178 may be combined into one or more transceivers 2176. One or more antennas 2180a-n are attached to the housing and electrically coupled to the transceiver 2176.

The various components of the gNB 2160 are coupled together by a bus system 2111, which may include a power bus, a control signal bus and a status signal bus, in addition to a data bus. However, for the sake of clarity, the various buses are illustrated in FIG. 21 as the bus system 2111. The gNB 2160 may also include a digital signal processor (DSP) 2113 for use in processing signals. The gNB 2160 may also include a communications interface 2115 that provides user access to the functions of the gNB 2160. The gNB 2160 illustrated in FIG. 21 is a functional block diagram rather than a listing of specific components.

Figure 22:
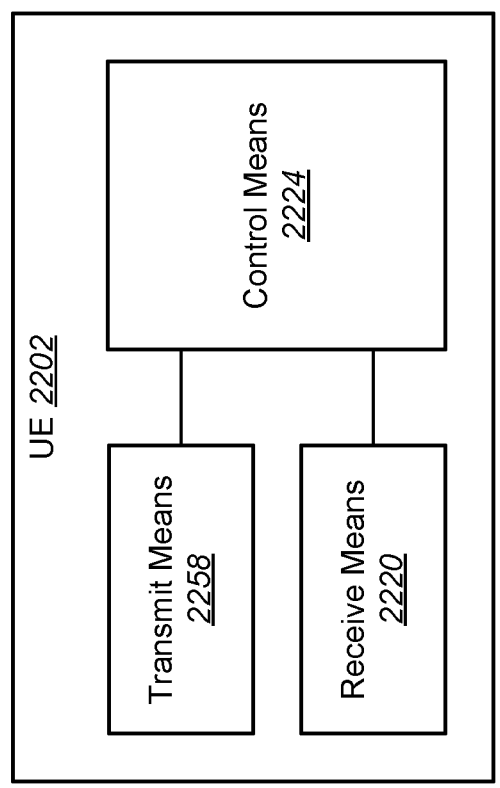
FIG. 22 is a block diagram illustrating one implementation of a UE in which systems and methods for supporting multiple numerologies in a single UL/DL grant may be implemented.

FIG. 22 is a block diagram illustrating one implementation of a UE 2202 in which systems and methods for supporting multiple numerologies in a single grant may be implemented. The UE 2202 includes transmit means 2258, receive means 2220 and control means 2224. The transmit means 2258, receive means 2220 and control means 2224 may be configured to perform one or more of the functions described in connection with FIG. 1 above. FIG. 20 above illustrates one example of a concrete apparatus structure of FIG. 22. Other various structures may be implemented to realize one or more of the functions of FIG. 1. For example, a DSP may be realized by software.

Figure 23:
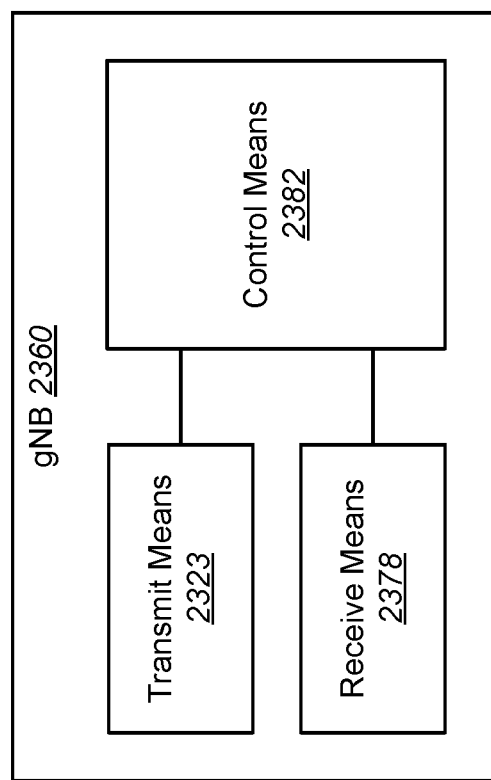
FIG. 23 is a block diagram illustrating one implementation of a gNB in which systems and methods for supporting multiple numerologies in a single UL/DL grant may be implemented

FIG. 23 is a block diagram illustrating one implementation of a gNB 2360 in which systems and methods for supporting multiple numerologies in a single grant may be implemented. The gNB 2360 includes transmit means 2317, receive means 2378 and control means 2382. The transmit means 2317, receive means 2378 and control means 2382 may be configured to perform one or more of the functions described in connection with FIG. 1 above. FIG. 21 above illustrates one example of a concrete apparatus structure of FIG. 23. Other various structures may be implemented to realize one or more of the functions of FIG. 1. For example, a DSP may be realized by software.

Figure 24:
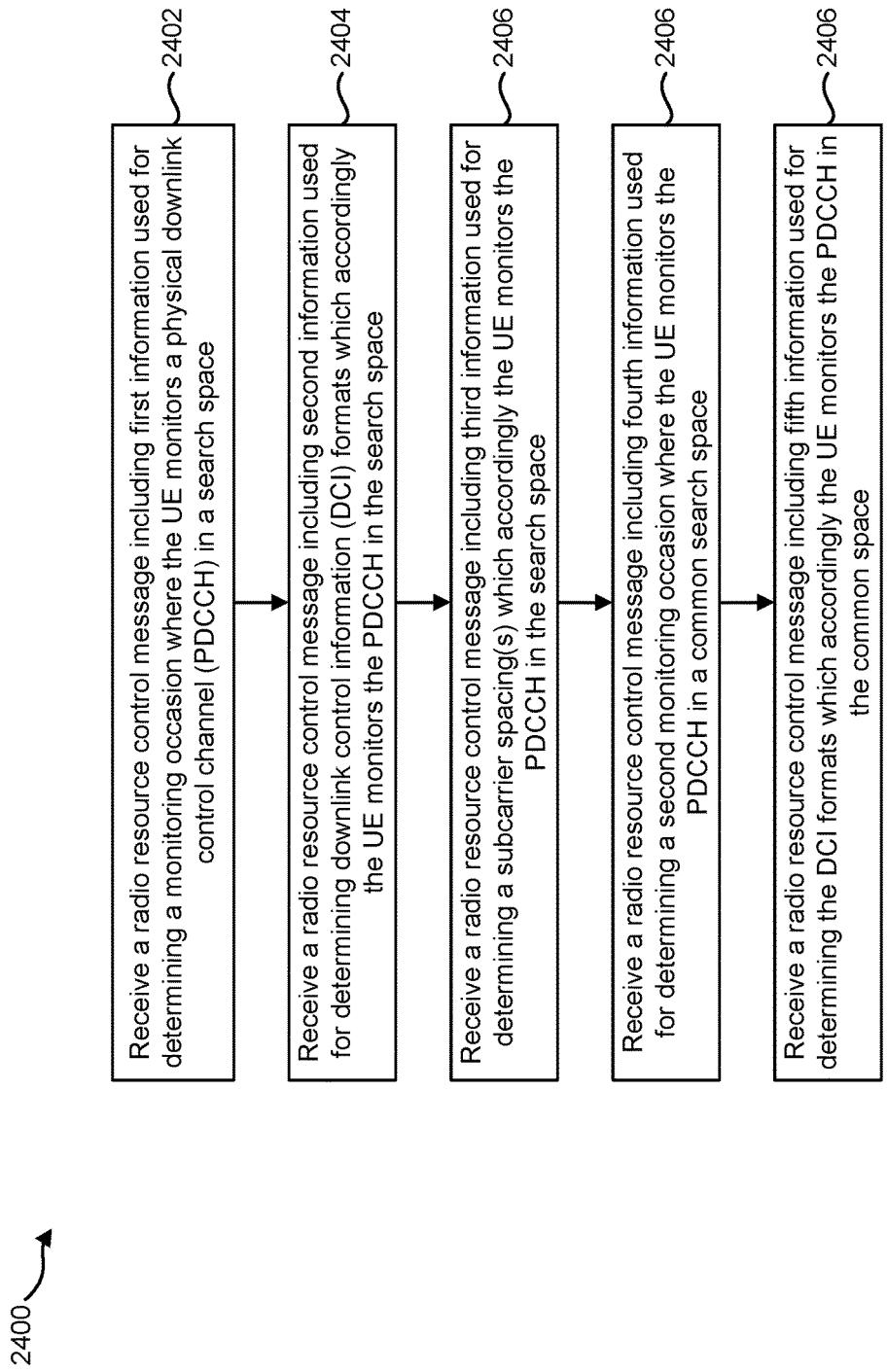
FIG. 24 is a flow diagram illustrating a communication method of a user equipment (UE)

FIG. 24 is a flow diagram illustrating a communication method 2400 of a user equipment (UE) 102. The UE 102 may receive 2402 a radio resource control message including first information used for determining a monitoring occasion where the UE 102 monitors a physical downlink control channel (PDCCH) in a search space. The search space may be a UE-specific search space. The monitoring occasion may include a slot and/or a symbol.

The UE 102 may receive 2404 a radio resource control message including second information used for determining downlink control information (DCI) formats which accordingly the UE 102 monitors the PDCCH in the search space. The DCI formats may include a DCI format used for scheduling of a physical uplink shared channel (PUSCH) and/or a DCI format used for scheduling of a physical downlink shared channel (PDSCH).

The UE 102 may receive 2406 a radio resource control message including third information used for determining a subcarrier spacing(s) which accordingly the UE 102 monitors the PDCCH in the search space.

The UE 102 may receive 2408 a radio resource control message including fourth information used for determining a second monitoring occasion where the UE 102 monitors the PDCCH in a common search space. The second monitoring occasion may include a slot and/or a symbol.

The UE 102 may receive 2410 a radio resource control message including fifth information used for determining the DCI formats which accordingly the UE 102 monitors the PDCCH in the common search space.

Figure 25:
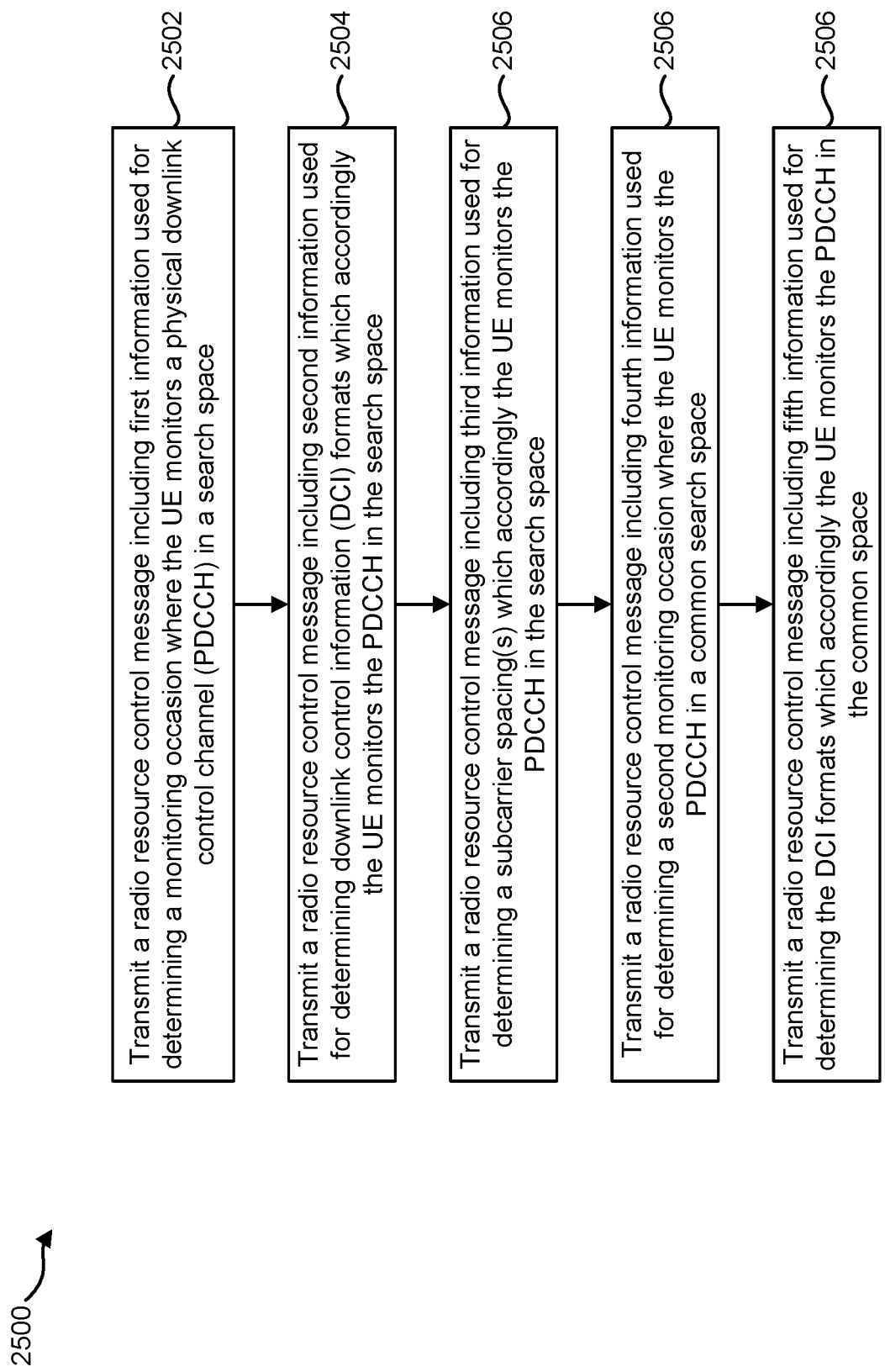
FIG. 25 is a flow diagram illustrating a communication method of a base station apparatus.

FIG. 25 is a flow diagram illustrating a communication method 2500 of a base station apparatus 160. The base station apparatus 160 may transmit 2502 a radio resource control message including first information used for determining a monitoring occasion where the UE 102 monitors a physical downlink control channel (PDCCH) in a search space. The search space may be a UE-specific search space. The monitoring occasion may include a slot and/or a symbol.

The base station apparatus 160 may transmit 2504 a radio resource control message including second information used for determining downlink control information (DCI) formats which accordingly the UE 102 monitors the PDCCH in the search space. The DCI formats may include a DCI format used for scheduling of a physical uplink shared channel (PUSCH) and/or a DCI format used for scheduling of a physical downlink shared channel (PDSCH).

The base station apparatus 160 may transmit 2506 a radio resource control message including third information used for determining a subcarrier spacing(s) which accordingly the UE 102 monitors the PDCCH in the search space.

The base station apparatus 160 may transmit 2508 a radio resource control message including fourth information used for determining a second monitoring occasion where the UE 102 monitors the PDCCH in a common search space. The second monitoring occasion may include a slot and/or a symbol.

The base station apparatus 160 may transmit 2510 a radio resource control message including fifth information used for determining the DCI formats which accordingly the UE 102 monitors the PDCCH in the common search space.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) comprising:
a receiving circuitry and a determining circuitry, wherein the receiving circuitry is configured to:
receive, by a radio resource control message, first information used for configuring a monitoring occasion for a UE-specific search space where the UE monitors a physical downlink control channel (PDCCH) in the UE-specific search space; and
receive, by the radio resource control message, second information used for configuring downlink control information (DCI) formats in accordance with which the UE monitors the PDCCH in the UE-specific search space,
the determining circuitry is configured to determine the monitoring occasion for the UE-specific search space based on the first information,
the monitoring occasion for the UE-specific search space corresponds to a position of a slot and a position of a symbol,
the DCI formats comprise a DCI format used for scheduling of a physical uplink shared channel (PUSCH) in one cell and a DCI format used for scheduling of a physical downlink shared channel (PDSCH) in one cell,
the receiving circuitry is further configured to:
receive, by the radio resource control message, third information used for configuring a monitoring occasion for a common search space where the UE monitors a PDCCH in the common search space; and
receive, by the radio resource control message, fourth information used for configuring a DCI format in accordance with which the UE monitors the PDCCH in the common search space, the DCI format being a DCI format with cyclic redundancy check scrambled by a temporary cell-radio network temporary identifier (Temporary C-RNTI), the DCI format being used for scheduling of a PUSCH, wherein
the monitoring occasion for the common search space corresponds to a position of a slot and a position of a symbol.

2. A base station apparatus comprising:
a transmitting circuitry and a generating circuitry, wherein the transmitting circuitry is configured to:
transmit, to a user equipment (UE), by a radio resource control message, first information used for configuring a monitoring occasion for a UE-specific search space where the UE monitors a physical downlink control channel (PDCCH) in the UE-specific search space; and
transmit, to the UE, by the radio resource control message, second information used for configuring downlink control information (DCI) formats in accordance with which the UE monitors the PDCCH in the UE-specific search space, the generating circuitry is configured to generate the first information and the second information, the monitoring occasion for the UE-specific search space corresponds to a position of a slot and a position of a symbol, and the DCI formats comprise a DCI format used for scheduling of a physical uplink shared channel (PUSCH) in one cell and a DCI format used for scheduling of a physical downlink shared channel (PDSCH) in one cell the transmitting circuitry is further configured to:
- transmit, to the UE, by the radio resource control message, third information used for configuring a monitoring occasion for a common search space where the UE monitors a PDCCH in the common search space; and
- transmit, to the UE, by the radio resource control message, fourth information used for configuring a DCI format in accordance with which the UE monitors the PDCCH in the common search space, the DCI format being a DCI format with cyclic redundancy check scrambled by a temporary cell-radio network temporary identifier (Temporary C-RNTI), the DCI format being used for scheduling of a PUSCH, wherein the monitoring occasion for the common search space corresponds to a position of a slot and a position of a symbol.

3. A communication method of a user equipment (UE) comprising:

receiving, by a radio resource control message, first information used for configuring a monitoring occasion for a UE-specific search space where the UE monitors a physical downlink control channel (PDCCH) in the UE-specific search space; and receiving, by the radio resource control message, second information used for configuring downlink control information (DCI) formats in accordance with which the UE monitors the PDCCH in the UE-specific search space, wherein the monitoring occasion for the UE-specific search space corresponds to a position of a slot and a position of a symbol, and the DCI formats comprise a DCI format used for scheduling of a physical uplink shared channel (PUSCH) in one cell and a DCI format used for scheduling of a physical downlink shared channel (PDSCH) in one cell, the method further comprising:

receiving, by the radio resource control message, third information used for configuring a monitoring occasion for a common search space where the UE monitors a PDCCH in the common search space; and receiving, by the radio resource control message, fourth information used for configuring a DCI format in accordance with which the UE monitors the PDCCH in the common search space, the DCI format being a DCI format with cyclic redundancy check scrambled by a temporary cell-radio network temporary identifier (Temporary C-RNTI), the DCI format being used for scheduling of a PUSCH, wherein the monitoring occasion for the common search space corresponds to a position of a slot and a position of a symbol.

4. A communication method of a base station apparatus comprising:

transmitting, to a user equipment (UE), by a radio resource control message, first information used for configuring a monitoring occasion for a UE-specific search space where the UE monitors a physical downlink control channel (PDCCH) in the UE-specific search space; and transmitting, to the UE, by the radio resource control message, second information used for configuring downlink control information (DCI) formats in accordance with which the UE monitors the PDCCH in the UE-specific search space, wherein the monitoring occasion for the UE-specific search space corresponds to a position of a slot and a position of a symbol, and the DCI formats comprise a DCI format used for scheduling of a physical uplink shared channel (PUSCH) in one cell and a DCI format used for scheduling of a physical downlink shared channel (PDSCH) in one cell, the method further comprising:

transmitting, to the UE, by the radio resource control message, third information used for configuring a monitoring occasion for a common search space where the UE monitors a PDCCH in the common search space; and transmitting, to the UE, by the radio resource control message, fourth information used for configuring a DCI format in accordance with which the UE monitors the PDCCH in the common search space, the DCI format being a DCI format with cyclic redundancy check scrambled by a temporary cell-radio network temporary identifier (Temporary C-RNTI), the DCI format being used for scheduling of a PUSCH, wherein the monitoring occasion for the common search space corresponds to a position of a slot and a position of a symbol.

* * * * *